US011173477B2

United States Patent
Zhong et al.

(10) Patent No.: US 11,173,477 B2
(45) Date of Patent: Nov. 16, 2021

(54) CATALYSTS FOR ELECTROCHEMICAL CO$_2$ REDUCTION AND ASSOCIATED METHODS

(71) Applicants: The Governing Council of the University of Toronto, Toronto (CA); TOTAL SE, Courbevoie (FR)

(72) Inventors: Miao Zhong, Toronto (CA); Chuanhao Wang, Toronto (CA); Yimeng Min, Toronto (CA); Alexander Ip, Toronto (CA); Edward Sargent, Toronto (CA)

(73) Assignees: THE GOVERNING COUNCIL OF THE UNIVERSITY OF TORONTO, Toronto (CA); TOTAL SE, Courbevoie (FR)

( * ) Notice: Subject to any disclaimer, the term of this patent is extended or adjusted under 35 U.S.C. 154(b) by 0 days.

(21) Appl. No.: 17/262,701

(22) PCT Filed: Jul. 15, 2019

(86) PCT No.: PCT/EP2019/069040
§ 371 (c)(1),
(2) Date: Jan. 22, 2021

(87) PCT Pub. No.: WO2020/020691
PCT Pub. Date: Jan. 30, 2020

(65) Prior Publication Data
US 2021/0162390 A1 Jun. 3, 2021

Related U.S. Application Data

(60) Provisional application No. 62/701,980, filed on Jul. 23, 2018.

(51) Int. Cl.
*B01J 35/00* (2006.01)
*B01J 35/10* (2006.01)
(Continued)

(52) U.S. Cl.
CPC ....... *B01J 35/0033* (2013.01); *B01J 35/0006* (2013.01); *B01J 35/1057* (2013.01);
(Continued)

(58) Field of Classification Search
CPC .............. B01J 35/0006; B01J 35/0033; B01J 35/1057; B01J 35/1061; B01J 35/1066; C25B 3/01; C25B 3/25
See application file for complete search history.

(56) References Cited

U.S. PATENT DOCUMENTS 6,998,366 B2 * 2/2006 Haake ............... B01J 25/00 502/244
7,094,729 B2 * 8/2006 Adkins ............... B01J 25/00 502/301
(Continued)

FOREIGN PATENT DOCUMENTS

AU   2016305184 A1   2/2018

OTHER PUBLICATIONS

International Search Report issued in Application No. PCT/EP2019/069040, dated Oct. 18, 2019; 3 pages.
(Continued)

*Primary Examiner* — Cam N. Nguyen
(74) *Attorney, Agent, or Firm* — Locklar PLLC

(57) ABSTRACT

The invention relates to an electrocatalyst for reduction of CO$_2$ to produce multi-carbon compounds, comprising a multi-metal material comprising a primary metal being copper and at least one enhancer metal selected from germanium, gallium, tin, silicon, silver, gold, zinc and aluminium. The invention also relates to a process for electrochemical production of a multi-carbon compound from CO$_2$ using such an electrocatalyst.

20 Claims, 40 Drawing Sheets

(51) Int. Cl.
C25B 3/01 (2021.01)
C25B 3/25 (2021.01)
(52) U.S. Cl.
CPC ....... *B01J 35/1061* (2013.01); *B01J 35/1066* (2013.01); *C25B 3/01* (2021.01); *C25B 3/25* (2021.01); *B01J 2523/17* (2013.01); *B01J 2523/31* (2013.01)

(56) References Cited

U.S. PATENT DOCUMENTS

| | | | |
|---|---|---|---|
| 7,682,724 B2* | 3/2010 | Morgenstern | B01J 25/02 429/424 |
| 10,161,051 B2* | 12/2018 | Palmore | C25B 3/25 |
| 2015/0056385 A1 | 2/2015 | Shizaka et al. | |
| 2018/0057950 A1 | 3/2018 | Co et al. | |

OTHER PUBLICATIONS

International Preliminary Report on Patentability issued in Application No. PCT/EP2019/069040, dated Jul. 2, 2020; 5 pages.
Abild-Pedersen, et al., "CO adsorption energies on metals with correction for high coordination adsorption sites—A density functional study"; M. P., Surf. Sci., (2007), vol. 601, pp. 1747-1753.
Bernhardsson, E. & Freider, E. Luigi, a Python package that builds complex pipelines of batch jobs (2012), 18 pages.
Cao-Thang Dinh et al., "C02 electroreduction to ethylene via hydroxide-mediated copper catalysis at an abrupt interface", Science, (May 18, 2018), vol. 360, No. 6390, pp. 783-787.
Yano, H. et al., "Selective electrochemical reduction of CO2 to ethylene at a three-phase interface on copper(I) halide-confined Cu-mesh electrodes in acidic solutions of potassium halides", J. Electroanal. Chem., (2004), vol. 565, pp. 287-293.
Gao, S. et al., "Partially oxidized atomic cobalt layers for carbon dioxide electroreduction to liquid fuel", Nature, (2016), vol. 529, pp. 68-71.
Hjorth Larsen, A et al., "The atomic simulation environment—a Python library for working with atoms", J. Phys. Condens. Matter, (2017), vol. 29, 273002, 31 pages.
G. Kresse and D. Joubert, "From ultrasoft pseudopotentials to the projector augmented-wave method", Phys. Rev. B, (1999), vol. 59, 18 pages.
Hammer, B., Hansen, L. B. & Norskov, "Improved adsorption energetics within density-functional theory using revised Perdew-Burke-Ernzerhof functionals"; J. Phys. Rev. B 59, 7413-7421 (1999).
Hori, Y. et al., "Selective formation of C2 compounds from electrochemical reduction of CO2 at a series of copper single crystal electrodes", J. Phys. Chem. B, (2002), vol. 106, pp. 15-17.
Jain, A. et al., "Commentary: The Materials Project: A materials genome approach to accelerating materials innovation"; APL Materials, (2013), vol. 1, pp. 1-11.
Jain, A. et al., "FireWorks: a dynamic workflow system designed for highthroughput applications"; Concurr Comp-Pract E, (2015), vol. 27, 23 pages.
Kresse, G.Hafner, "Ab. initio molecular dynamics for liquid metals"; J., Phys. Rev. B, (1993), vol. 47, pp. 558-561.
P. E. Blochl, "Projector augmented-wave method", Phys. Rev. B, (1994), vol. 50, 27 pages.
Kresse, G., Furthmuller J., "Efficiency of ab-initio total energy calculations for metals and semiconductors using a plane-wave basis set" J., Comp. Mater. Sci., (1996), vol. 6, pp. 15-50.
Kresse, G., Furthmuller, J., "Efficient iterative schemes for ab initio total-energy calculations using a plane-wave basis set", Phy. Rev. B, (1996), vol. 54, 18 pages.
Xiao, H. et al., "Cu metal embedded in oxidized matrix catalyst to promote CO2 activation and CO dimerization for electrochemical reduction of CO2", Proc. Natl. Acad. Sci., (2017), vol. 114, pp. 6685-6688.

Kortlever, R. et al., "Catalysts and reaction pathways for the electrochemical reduction of carbon dioxide", J. Phys. Chem. Lett., (2015), vol. 6, pp. 4073-4082.
Liu, X. et al., "Understanding trends in electrochemical carbon dioxide reduction rates", Nat. Commun., (2017), vol. 8, 7 pages.
Lin, S. et al., "Covalent organic frameworks comprising cobalt porphyrins for catalytic CO2 reduction in water", Science, (2015), vol. 349, pp. 1208-1213.
Li, C. et al., "Electroreduction of carbon monoxide to liquid fuel on oxide-derived nanocrystalline copper", Nature, (2014), vol. 508, pp. 504-507.
Li, Y. C. et al., "Electrolysis of CO2 to syngas in bipolar membrane-based electrochemical cells", ACS Energy Lett., (2016), vol. 1, pp. 1149-1153.
Li, Y. et al., "Structure-sensitive CO2 electroreduction to hydrocarbons on ultrathin 5-fold twinned copper nanowires", Nano Lett., (2017), vol. 17, pp. 1312-1317.
Lum, Y. et al., "Optimizing C—C coupling on oxide-derived copper catalysts for electrochemical CO2 reduction", J. Phys. Chem. C, (2017), vol. 121, pp. 14191-14203.
Monkhorst, H. J.Pack, J. D., "Special points for Brillouin-zone integrations", Phys. Rev. B, (1976), vol. 13, 5 pages.
Mistry, H. et al., "Highly selective plasma-activated copper catalysts for carbon dioxide reduction to ethylene", Nat. Commun., (2016), vol. 7, 9 pages.
Montoya, J. H. et al., "A high-throughput framework for determining adsorption energies on solid surfaces", npj Computational Materials, (2017), vol. 14, 4 pages.
Norskov, J. K.Studt, F.Abild-Pedersen, F.Bligaard, "Fundamental Concepts in Heterogeneous Catalysis"; T., Angew. Chem. In. Ed., (2015), vol. 54, pp. 10404-10405.
Ong, S. P. et al., "Python Materials Genomics (pymatgen): A robust, open-souice python library for materials analysis"; Comp. Mater. Sci., (2013), vol. 68, pp. 314-319.
Olson, R. S. et al., In Proc. of the European Conference on the Applications of Evolutionary Computation. Springer International Publishing, "Automating biomedical data science through tree-based pipeline optimization" (2016), 16 pages.
Pedregosa, F. et al., "Scikit-learn: Machine Learning in Python"; J. Mach. Learn. Res., (2011), vol. 12, pp. 2825-2830.
Perdew, J. P.Burke, K.Ernzerhof, M., "Generalized gradient approximation made simple", Phys. Rev. Lett., (1996), vol. 77, p. 3865.
Peterson, A. A. et al., "How copper catalyzes the electroreduction of carbon dioxide into hydrocarbon fuels", Energy Environ. Sci., (2010), vol. 3, pp. 1311-1315.
Qi, L. et al., "A selective and efficient electrocatalyst for carbon dioxide reduction", Nat. Commun., (2014), vol. 5, 6 pages.
Studt, F. et al., "CO and CO2 Hydrogenation to Methanol Calculated Using the BEEF-vdW Functional"; Catal. Lett., (2013), vol. 143, pp. 71-73.
Schreier, M. et al., "Solar conversion of CO2 to CO using Earth-abundant electrocatalysts prepared by atomic layer modification of CuO", Nat. Energy, (2017), vol. 2, 9 pages.
Tran, K. & Ulissi, Z., "Active learning across intermetallics to guide discovery of electrocatalysts for CO2 reduction and H2 evolution"; Submitted (2018); Nature Catalysis vol. 1, pp. 696-703.
Van Der Maaten, L., "Accelerating t-SNE using tree-based algorithms", J. Mach. Learn. Res., (2014), vol. 15, pp. 3221-3245.
Kristin A. Persson et al., "Prediction of solid-aqueous equilibria: Scheme to combine first-principles calculations of solids with experimental aqueous states", Phys. Rev. B, (2012), vol. 85, 12 pages.
Xiao, H. et al., "Atomistic mechanisms underlying selectivities in C1 and C2 products from electrochemical reduction of CO on Cu (111)", J. Am. Chem. Soc., (2016), vol. 139, pp. 130-136.
De Luna, P. et al., "Catalyst electro-redeposition controls morphology and oxidation state for selective carbon dioxide reduction"; Nat. Catalysis; vol. 1, pp. 103-110 (2018).
Jeanty, P. et al., "Upscaling and continuous operation of electrochemical CO2 to CO conversion in aqueous solutions on silver gas diffusion electrodes"; J. CO Util. 24, pp. 454-462 (2018).

(56) References Cited

OTHER PUBLICATIONS

Davis, L. E. et al. "Handbook of Auger electron spectroscopy"; Physical Electronics Industries; 2nd edition (1976); 143 pages.

* cited by examiner c d

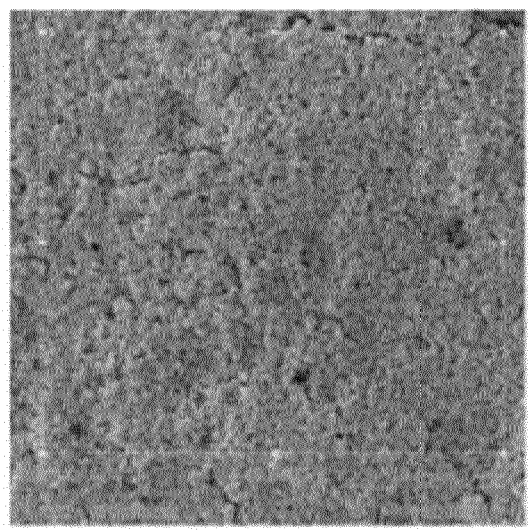
Figure 14a
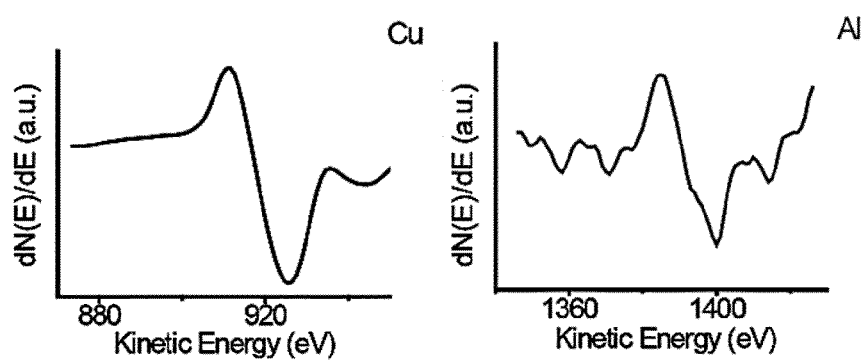
Figure 14b
---
Atomic Concentration Table (%)
---
| Al | Cu |
|---|---|
| 4.53 | 95.47 |
Figure 14c

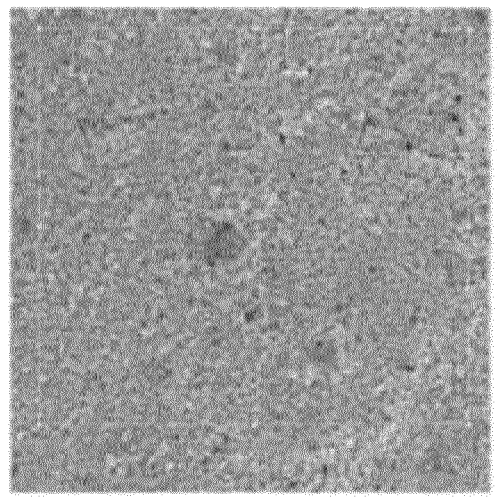
Figure 15a
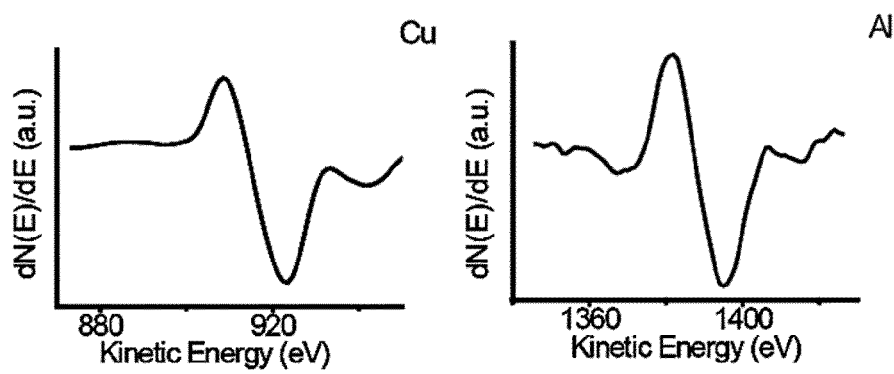
Figure 15b
```
C        ---------------------------
         Atomic Concentration Table (%)
         ---------------------------
            Al       Cu
          24.67    75.33
```
Figure 15c

| Element | At.No. | Netto | Mass [%] | Mass Norm. [%] | Atom [%] | abs. Error [%] (1 sigma) | rel. Error [%] (1 sigma) |
|---|---|---|---|---|---|---|---|
| Aluminium | 13 | 17053 | 1,54 | 1,52 | 3,44 | 0,10 | 6,54 |
| Copper | 29 | 463104 | 99,23 | 97,91 | 94,37 | 2,68 | 2,70 |
| Oxygen | 8 | 2983 | 0,58 | 0,57 | 2,19 | 0,13 | 21,64 |
| | | Sum | 101,34 | 100,00 | 100,00 | | |

| Element | At.No. | Netto | Mass [%] | Mass Norm. [%] | Atom [%] | abs. Error [%] (1sigma) | rel. Error [%] (1sigma) |
|---|---|---|---|---|---|---|---|
| Aluminium | 8 | 20715 | 3,38 | 6,86 | 21,92 | 0,46 | 13,52 |
| Potassium | 19 | 39801 | 1,48 | 3,00 | 3,93 | 0,07 | 4,77 |
| Copper | 29 | 253279 | 43,68 | 88,64 | 71,32 | 1,19 | 2,73 |
| Oxygen | 13 | 15434 | 0,74 | 1,50 | 2,83 | 0,06 | 8,32 |
| | | Sum | 49,27 | 100,00 | 100,00 | | |

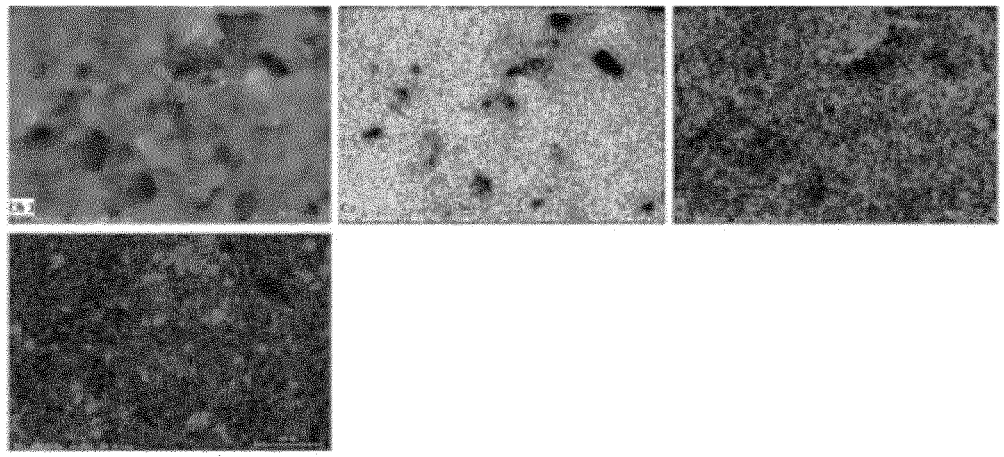
Figure 19a
| Element | At.No. | Netto | Mass [%] | Mass Norm. [%] | Atom [%] | abs. Error [%] (1sigma) | rel. Error [%] (1sigma) |
|---|---|---|---|---|---|---|---|
| Aluminium | 13 | 35772 | 1,35 | 1,36 | 3,12 | 0,09 | 6,69 |
| Copper | 29 | 1466727 | 97,75 | 98,20 | 96,10 | 2,63 | 2,69 |
| Chlorine | 17 | 22834 | 0,44 | 0,45 | 0,78 | 0,04 | 9,09 |
| | | Sum | 99,54 | 100,00 | 100,00 | | |
Figure 19b
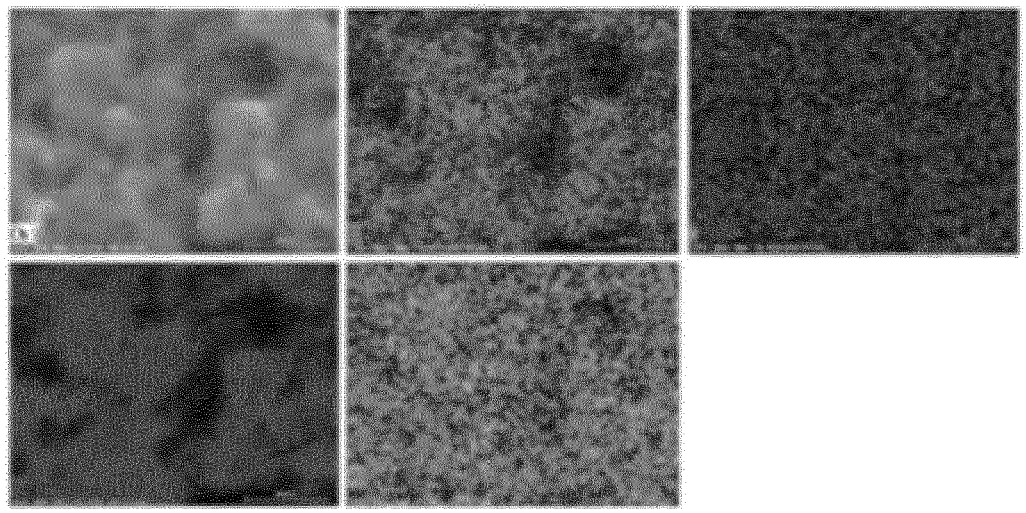
Figure 20a

| Element | At.No. | Netto | Mass [%] | Mass Norm. [%] | Atom [%] | abs. Error [%] (1sigma) | rel. Error [%] (1sigma) |
|---|---|---|---|---|---|---|---|
| Aluminium | 8 | 92426 | 2,34 | 4,45 | 15,05 | 0,29 | 12,38 |
| Potassium | 19 | 269218 | 1,55 | 2,94 | 4,08 | 0,07 | 4,64 |
| Copper | 29 | 1819307 | 47,83 | 90,91 | 77,46 | 1,30 | 2,72 |
| Oxygen | 13 | 109292 | 0,89 | 1,70 | 3,41 | 0,07 | 7,58 |
| | | Sum | 52,62 | 100,00 | 100,00 | | |

| Element | At.No. | Netto | Mass [%] | Mass Norm. [%] | Atom [%] | abs. Error [%] (1sigma) | rel. Error [%] (1sigma) |
|---|---|---|---|---|---|---|---|
| Carbon | 6 | 41873 | 0,00 | 0,00 | 0,00 | 0,00 | 10,00 |
| Oxygen | 8 | 25509 | 1,80 | 1,87 | 6,63 | 0,25 | 13,89 |
| Aluminium | 13 | 50583 | 1,83 | 1,90 | 3,99 | 0,11 | 6,18 |
| Potassium | 19 | 93234 | 1,96 | 2,03 | 2,95 | 0,08 | 4,33 |
| Copper | 29 | 1202041 | 89,79 | 93,13 | 83,20 | 2,42 | 2,70 |
| Fluorine | 9 | 24975 | 1,04 | 1,08 | 3,23 | 0,16 | 14,93 |
| | | Sum | 96,42 | 100,00 | 100,00 | | |

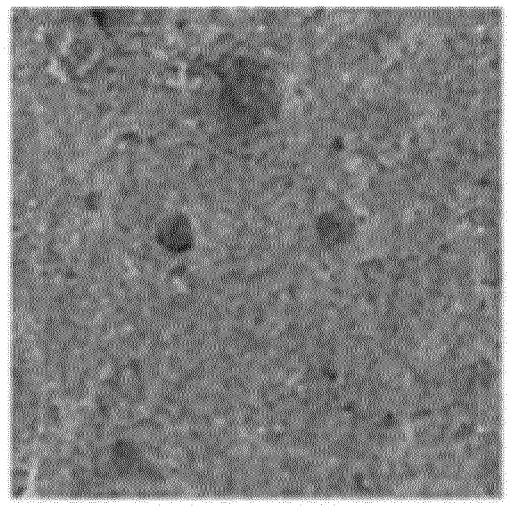
Figure 22a
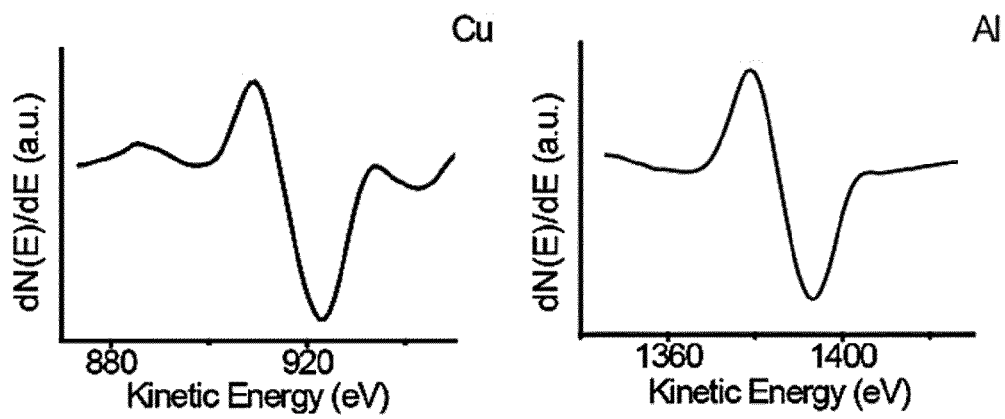
Figure 22b
C
Atomic Concentration Table (%)
| Al | Cu |
|---|---|
| 80.82 | 19.18 |
Figure 22c

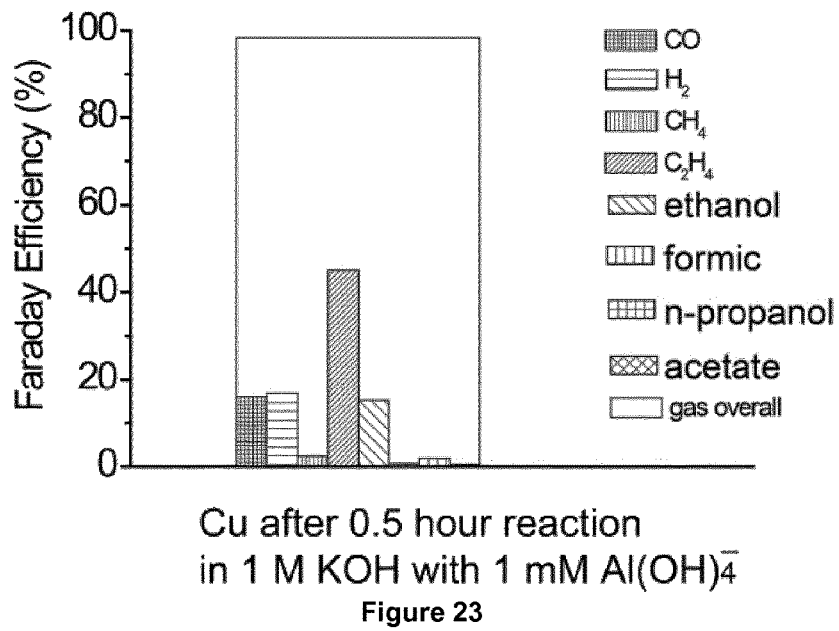
Cu after 0.5 hour reaction
in 1 M KOH with 1 mM Al(OH)$_4^-$
Figure 23
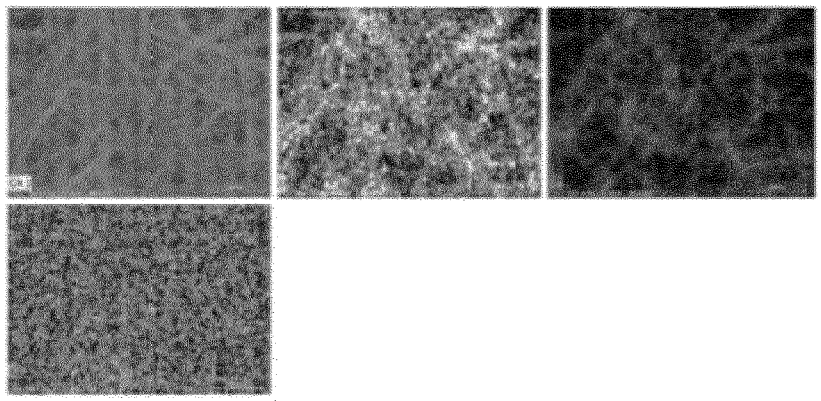
Figure 24a
| Element | At.No. | Netto | Mass [%] | Mass Norm. [%] | Atom [%] | abs. Error [%] (1sigma) | rel. Error [%] (1sigma) |
|---|---|---|---|---|---|---|---|
| Carbon | 6 | 846382 | 80,53 | 80,53 | 89,75 | 8,34 | 10,47 |
| Oxygen | 8 | 17384 | 5,12 | 5,12 | 4,29 | 0,69 | 13,52 |
| Fluorine | 9 | 30720 | 4,48 | 4,48 | 3,15 | 0,57 | 12,84 |
| Potassium | 19 | 218163 | 5,37 | 5,37 | 1,84 | 0,19 | 3,50 |
| Copper | 29 | 39800 | 4,44 | 4,44 | 0,94 | 0,15 | 3,29 |
| Aluminium | 13 | 2984 | 0,07 | 0,07 | 0,03 | 0,03 | 43,81 |
| | | Sum | 100,00 | 100,00 | 100,00 | | |
Figure 24b

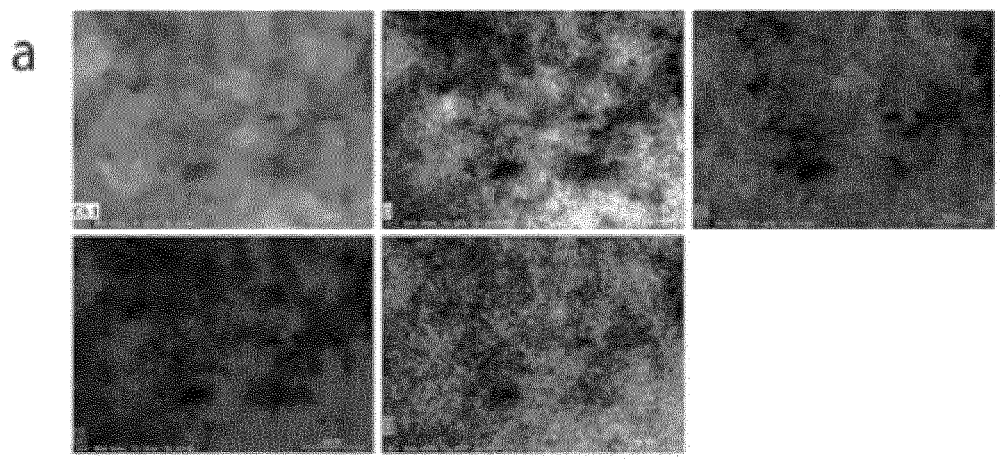
Figure 27a
| Element | At.No. | Netto | Mass [%] | Mass Norm. [%] | Atom [%] | abs. Error [%] (1sigma) | rel. Error [%] (1sigma) |
|---|---|---|---|---|---|---|---|
| Oxygen | 8 | 107765 | 12,72 | 18,26 | 41,28 | 1,45 | 11,41 |
| Aluminium | 13 | 277822 | 9,69 | 13,91 | 18,64 | 0,49 | 5,03 |
| Chlorine | 17 | 74403 | 2,29 | 3,28 | 3,35 | 0,10 | 4,47 |
| Copper | 29 | 310355 | 44,95 | 64,52 | 36,71 | 1,23 | 2,73 |
| Potassium | 19 | 548 | 0,02 | 0,03 | 0,02 | 0,00 | 5,74 |
| | | Sum | 69,67 | 100,00 | 100,00 | | |
Figure 27c
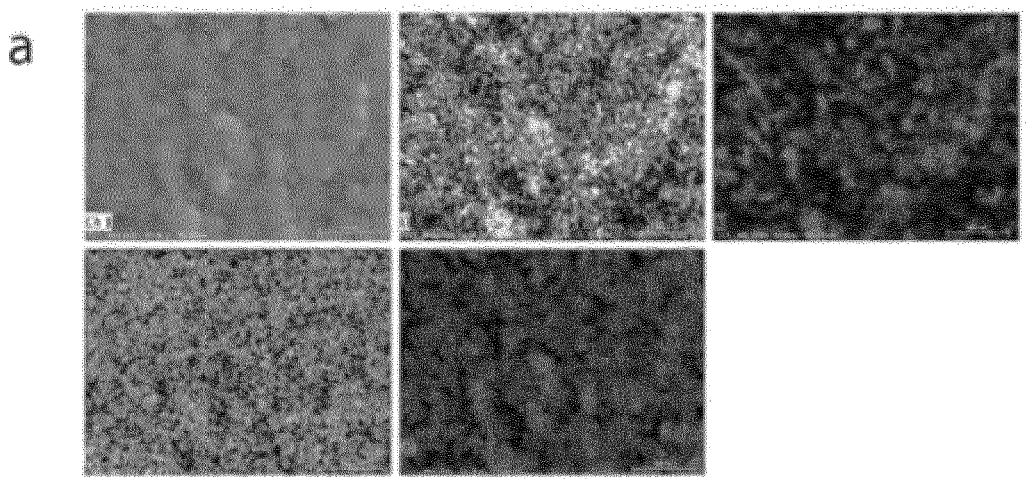
Figure 28a

| Element | At.No. | Netto | Mass [%] | Mass Norm. [%] | Atom [%] | abs. Error [%] (1sigma) | rel. Error [%] (1sigma) |
|---|---|---|---|---|---|---|---|
| Oxygen | 8 | 146245 | 3,31 | 5,15 | 14,91 | 0,39 | 11,80 |
| Aluminium | 13 | 1208215 | 7,24 | 11,29 | 19,36 | 0,37 | 5,11 |
| Potassium | 19 | 1581265 | 6,86 | 10,69 | 12,66 | 0,23 | 3,39 |
| Copper | 29 | 2405097 | 46,77 | 72,87 | 53,08 | 1,27 | 2,72 |
| | | Sum | 64,18 | 100,00 | 100,00 | | |

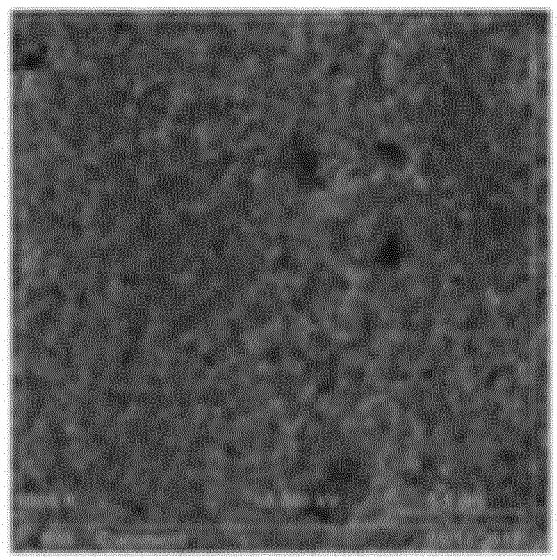
Figure 30a
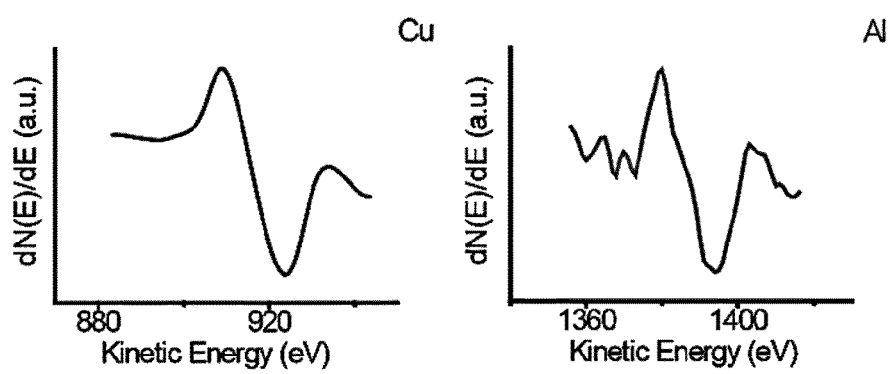
Figure 30b
---
Atomic Concentration Table (%)
---
| Al | Cu |
|---|---|
| 10.88 | 89.12 |
Figure 30c

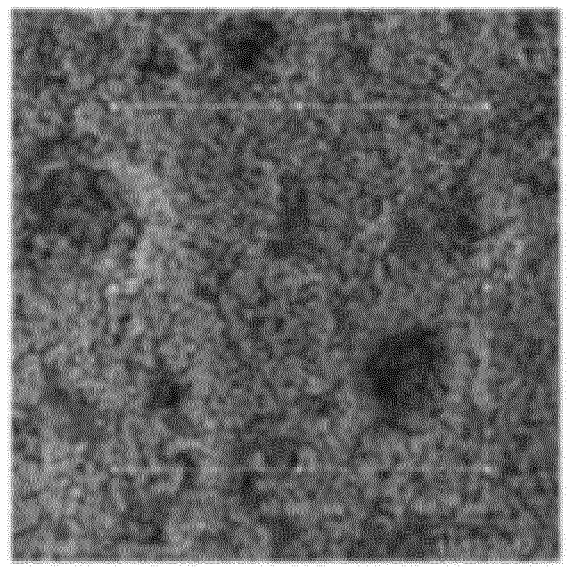
Figure 31a
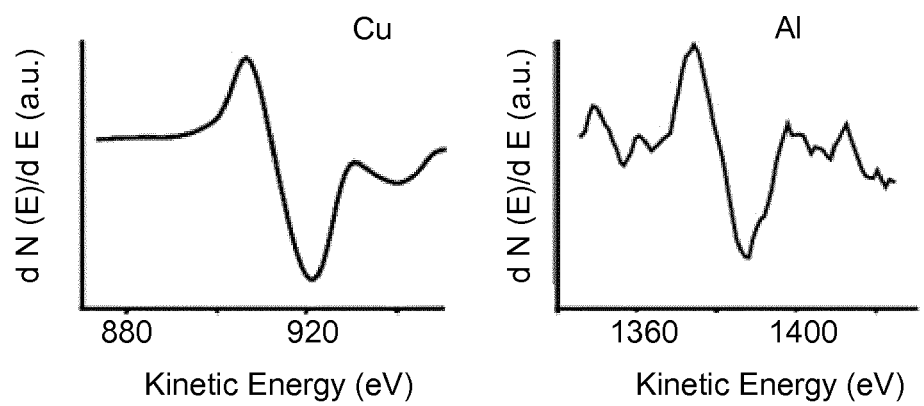
Figure 31b
---
Atomic Concentration Table (%)
---
| Al | Cu |
|----|----|
| 9.05 | 90.95 |
Figure 31c Auger spectroscopic results

|  | Sample 1 | Sample 2 | Sample 3 | Sample 4 |
|---|---|---|---|---|
| Al:Cu | ~5:95 | ~10:90 | ~33:67 | ~48:52 |

CATALYSTS FOR ELECTROCHEMICAL CO₂ REDUCTION AND ASSOCIATED METHODS

CROSS-REFERENCE TO RELATED APPLICATIONS

This application claims the benefit of PCT/EP2019/069040 filed Jul. 15, 2019, which claims priority from U.S. 62/701,980 filed Jul. 23, 2018, which are incorporated herein by reference in their entireties for all purposes.

TECHNICAL FIELD

The technical field generally relates to catalytic methods for $CO_2$ reduction, and more particularly to electrocatalysts composed of de-alloyed multi-metallic material and associated methods of manufacture and use in electrochemical $CO_2$ reduction.

BACKGROUND

The efficient electrochemical conversion of carbon dioxide ($CO_2$) into valuable carbon-based fuels and compounds is desirable and technology that enhances such conversion can, for example, enable the storage of intermittent renewable electricity as well as net reductions of greenhouse gas emissions. Copper has been the predominant electrocatalyst for the production of multi-carbon products. However, achieving high selectivity and productivity to certain desired chemicals (e.g., ethylene, a highly demanded industrial feedstock) has failed to meet requirements of practical operation (e.g., current density over 250 mA cm$^{-2}$, applied cell voltage below 3 V, Faradaic efficiency to one certain desired product at least above 70%).

There is a need for improved techniques and catalyst materials for efficient electrochemical $CO_2$ reduction and related methods and systems of producing chemical compounds.

SUMMARY

Multi-metal electrocatalysts for reduction of $CO_2$ to produce multi-carbon compounds can include Cu and at least one metal selected from Ge, Ga, Sn, Si, Ag, Au, Zn and Al. With preference, they include a Cu—Al material that may be de-allowed and formed as a catalytic layer on a gas diffusion membrane. The multi-metal Cu—Al material can include 1 wt % to 50 wt % Al and 50 wt % to 99 wt % Cu, for example. The Al can be ion-implanted into the Cu or Al can be evaporated into the Cu and remains after chemical etching. The electrocatalyst can have a surface region that is nanoporous. Other multi-metal electrocatalyst compositions are also possible. The electrocatalysts can have various properties, structural features, chemical compositions and their chemical states as will be described in detail further below.

The electrocatalysts can be implemented in electrocatalytic reduction of $CO_2$ into at least one multi-carbon compound, such as ethylene. The electrocatalytic reduction of $CO_2$ can be performed in an alkaline medium, such as potassium hydroxide.

The electrocatalysts can be manufactured by vapour-phase deposition of Al onto a Cu surface and chemically etching the metallic alloy to produce a de-alloyed Cu—Al material, or by ion-implanting Al into Cu, for example.

The electrocatalysts and associated methods and uses have been found to provide advantageous functionality related to the production of electrocatalytic reduction of $CO_2$ into multi-carbon compounds.

Therefore, according to a first aspect, the invention provides for an electrocatalyst for reduction of $CO_2$ to produce multi-carbon compounds, remarkable in that the electrocatalyst comprises a multi-metal material comprising a primary metal and at least one enhancer metal selected from germanium (Ge), gallium (Ga), tin (Sn), silicon (Si), silver (Ag), gold (Au), zinc (Zn) and aluminium (Al).

With preference, the invention provides for an electrocatalyst for reduction of $CO_2$ to produce multi-carbon compounds, remarkable in that the electrocatalyst comprises a multi-metal material comprising a primary metal being copper (Cu) and at least one enhancer metal selected from germanium (Ge), gallium (Ga), tin (Sn), silicon (Si), silver (Ag), gold (Au), zinc (Zn) and aluminium (Al).

In a preferred embodiment, the invention provides for an electrocatalyst for reduction of $CO_2$ to produce multi-carbon compounds, remarkable in that the electrocatalyst comprises a multi-metal Cu—Al material. With preference, the multi-metallic Cu—Al material consists of Cu and Al.

Surprisingly, the Inventors have found a new $CO_2$ electroreduction Cu-based catalyst, such as comprising a Cu—Al multi-metal material with varying ratios of Al concentrations on surface, that shows superior $CO_2$ electroreduction activity to valuable multi-carbon products (e.g. ethylene).

The inventors then developed a physical vapor deposition and chemical etching process to scalably fabricate nanoporous Cu—Al catalysts that enable highly selective production of ethylene with a record $CO_2$-to-ethylene Faradaic efficiency of 80% at an unprecedently high applied current density of 600 mA cm$^{-2}$ (−1.8 to −2.1 V vs. RHE) in a flow cell system. This result vastly improves the $CO_2$-to-ethylene selectivity and stability with a fairly high half-cell electricity-to-ethylene power conversion efficiency of 30% which readily meets the requirements of practical operation.

The inventors find out that Cu—Al alloys provide multiple sites and surface orientations that exhibit optimal CO adsorption energies near the top of the activity volcano plot for $CO_2$ reduction. In situ X-ray absorption further reveals how Cu and Al enable a favourable Cu coordination environment that enhances C—C dimerization, the rate-determining step from $CO_2$ to C2 products.

With preference, the one or more following features can be used to further define the multi-metal Cu—Al material:
  The multi-metal Cu—Al material is a de-alloyed Cu—Al material.
  The multi-metal Cu—Al material comprises from 1 wt % to 50 wt % of Al based on the total weight of the multi-metal Cu—Al material, preferably from 2 wt % to 40 wt % of Al, more preferably from 3 wt % to 30 wt % of Al.
  The multi-metal Cu—Al material comprises from 50 wt % to 99 wt % of Cu, based on the total weight of the multi-metal Cu—Al material, preferably from 80 wt % to 98 wt %, more preferably from 70 wt % to 97 wt % Cu.

In an embodiment, the multi-metal Cu—Al material comprises Cu doped with Al. In another embodiment, the multi-metal Cu—Al material comprises Al doped with Cu.

In a preferred embodiment, the multi-metal Cu—Al material is formed as a catalytic layer; with preference:
  the electrocatalyst comprises a gas diffusion membrane; and/or
  the catalytic layer is formed directly on a gas diffusion membrane; and/or the catalytic layer has a thickness between 1 nm and 5000 nm as determined by cross-sectional scanning electron microscopy; preferably 10 to 5000 nm.

The invention uses thermal evaporation or co-sputtering to deposit the catalyst layer on the gas diffusion membrane. For the thermal evaporation, the thickness of the catalyst layer is monitored with a film-thickness sensor during the deposition. For the co-sputtering, the depositing rate of each catalyst material is first measured by depositing it on flat Si substrates under the same deposition conditions used for depositing the catalyst layer on the gas diffusion membrane. Once the deposition rate of each material is known, the film thickness can be controlled by its deposition time.

The thickness of the catalytic layer can also be determined by cross-sectional scanning electron microscopy (SEM).

One or more of the following features can be used to better define the catalyst layer:
- The catalyst layer has a thickness ranging between 10 and 1500 nm as determined by cross-sectional scanning electron microscopy (SEM)
- The catalyst layer has a thickness of at least 15 nm as determined by cross-sectional scanning electron microscopy (SEM), preferably at least 50 nm, and more preferably of at least 100 nm.
- The catalyst layer has a thickness of at most 1200 nm as determined by cross-sectional scanning electron microscopy (SEM), preferably of at most 1000 nm, and more preferably of at most and 500 nm.

According to the invention the Cu—Al catalyst can be of two types:
- In a first embodiment, the multi-metal Cu—Al material used as Cu—Al catalyst is produced by first depositing Cu—Al alloy on a gas diffusion layer and then de-alloying the Cu—Al alloy by chemical etching. After de-alloying, the multi-metal Cu—Al catalyst is in a porous structure. A certain amount of Al (1-50 wt % Al, 3-30 wt % Al in the optimal case) is present on the catalyst surface.
- In a second embodiment, the multi-metal Cu—Al material used as Cu—Al catalyst is produced by first depositing a Cu catalyst layer on a gas diffusion layer and then ion-implanting Al into the Cu layer to make a Cu—Al surface.

In a preferred embodiment, the Cu and Al in the multi-metal Cu—Al material are morphologically stable after five hours of electroreduction reaction in alkaline electrolyte.

With preference, Al concentration in the multi-metal Cu—Al material is stable after five hours of electroreduction reaction in alkaline electrolyte.

The multi-metal Cu—Al catalyst is both morphologically and compositionally stable after five hours of electroreduction reaction in the alkaline electrolyte. The Cu—Al material shows a very similar porous morphology with pore diameters of 5-50 nm before and after the chemical reaction in the alkaline electrolyte. The Cu and Al concentrations on the Cu—Al catalyst surface is almost unchanged (concentration variation within 5 wt %) before and after the chemical reaction.

In a preferred embodiment, the multi-metal Cu—Al material comprises a surface region having a thickness between 1 nm and 3 nm as determined by Auger electron spectroscopy.

With preference, one or more of the following is true:
- At least the surface region consists of Cu and Al.
- At least the surface region comprises an Al content of 1 wt % to 50 wt % and a Cu content of 50 wt % to 99 wt %, or comprises an Al content of 3 wt % to 30 wt % and a Cu content of 70 wt % to 97 wt %.
- At least the surface region is nanoporous; with preference, at least the surface region has pores that have pore diameters ranging from 1 nm to 100 nm, or from 5 nm to 20 nm as determined HRTEM and HAADF analysis.
- At least the surface region has a homogeneous distribution of Al and Cu.

In a preferred embodiment, the Cu in at least the surface region is Cu (111); with preference, the Al content in the Cu (111) is about 8 wt % to about 15 wt %, or about 11 wt % to about 13 wt %.

In another embodiment, the Cu in at least the surface region is Cu (100); with preference, the Al content in the Cu (111) is about 3 wt % to about 15 wt %.

With preference, the electrocatalyst of the first aspect, comprises one or more features as defined for the catalyst according to the second and third aspect or as described herein.

According to a second aspect of the invention, the electrocatalyst for reduction of $CO_2$ to produce multi-carbon compounds, can also be defined as an electrocatalyst comprising a multi-metal material comprising Cu and an enhancer metal that modifies Cu coordination environment that enhances C—C dimerization.

With preference, enhancer metal that modifies Cu coordination environment that enhance C—C dimerization is one or more metal selected from germanium (Ge), gallium (Ga), tin (Sn), silicon (Si), silver (Ag), gold (Au), zinc (Zn) and aluminium (Al). More preferably, the enhancer metal that modifies coordination environment of the primary catalyst metal so as to enhance C—C dimerization is aluminium (Al).

The one or more following features can be used to further define the electrocatalyst according to the second aspect:
- The enhancer metal increases catalytic site density with decreased reaction energy for the C—C dimerization.
- The reaction energy for the C—C dimerization is decreased by 0.3 eV to 0.7 eV.
- The multi-metal material is a de-alloyed material.
- The multi-metal material comprises from 1 wt % to 50 wt % of the enhancer metal based on the total weight of the multi-metal material, preferably from 2 wt % to 40 wt % of the enhancer metal, more preferably from 3 wt % to 30 wt % of the enhancer metal.
- The multi-metal material comprises 50 wt % to 99 wt % of Cu based on the total weight of the multi-metal material, preferably from 60 to 98 wt % of Cu, more preferably from 70 wt % to 97 wt % of Cu.
- The multi-metal material comprises the Cu doped with the enhancer metal.
- The multi-metal material comprises the enhancer metal doped with the Cu.
- The enhancer metal is ion-implanted into the Cu.
- The enhancer metal is present in the Cu as enhancer metal evaporated into the Cu and remains after chemically etching.
- The Cu and the enhancer metal in the multi-metal material are morphologically stable after five hours of electroreduction reaction in alkaline electrolyte.
- The enhancer metal concentration in the multi-metal material is stable after five hours of electroreduction reaction in alkaline electrolyte.
- The multi-metallic material consists of the Cu and the enhancer metal.
- The enhancer metal comprises or consists of Al.

In a preferred embodiment that can be combined with all previous embodiments according to the second aspect, the multi-metal material is formed as a catalytic layer; with preference:
- the catalytic layer is formed directly on a gas diffusion membrane; and/or
- the catalytic layer has a thickness between 10 nm and 5000 nm as determined by cross-sectional scanning electron microscopy; and/or
- the multi-metal material comprises enhancer metal-terminated pores.

In a preferred embodiment that can be combined with all previous embodiments according to the second aspect, the multi-metal material comprises a surface region having a thickness between 1 nm and 3 nm as determined by Auger electron spectroscopy. With preference, one or more of the following is true:
- At least the surface region comprises an enhancer metal content of 1 wt % to 50 wt % and a Cu content of 50 wt % to 99 wt %, or comprises an enhancer metal content of 3 wt % to 30 wt % and a Cu content of 70 wt % to 97 wt %.
- At least the surface region is nanoporous; with preference, at least the surface region has pores that have pore diameter ranging from 1 nm to 100 nm as determined by HRTEM and HAADF analysis, or from 5 nm to 20 nm.
- At least the surface region has a homogeneous distribution of enhancer metal and Cu.
- The Cu in at least the surface region is Cu (111); with preference, the enhancer metal content in the Cu (111) is about 8 wt % to about 15 wt %, or about 11 wt % to about 13 wt %.
- The Cu in at least the surface region is Cu (100); with preference, the enhancer metal content in the Cu (100) is about 3 wt % to about 15 wt %.
- At least the surface region consists of the Cu and the enhancer metal.

With preference, the electrocatalyst of the second aspect, comprises one or more features as defined for the catalyst according to the first and third aspect or as described herein.

According to a third aspect of the invention, the electrocatalyst for reduction of $CO_2$ to produce multi-carbon compounds, the electrocatalyst comprising a multi-metal material comprising a primary catalyst metal and an enhancer metal that modifies coordination environment of the primary catalyst metal so as to enhance C—C dimerization.

With preference, the primary catalyst material is copper (Cu).

With preference, the enhancer metal that modifies coordination environment of the primary catalyst metal so as to enhance C—C dimerization is one or more metal selected from germanium (Ge), gallium (Ga), tin (Sn), silicon (Si), silver (Ag), gold (Au), zinc (Zn) and aluminium (Al). More preferably, the enhancer metal that modifies coordination environment of the primary catalyst metal so as to enhance C—C dimerization is aluminium (Al).

The one or more following features can be used to further define the electrocatalyst according to the third aspect:
- The enhancer metal increases catalytic site density with decreased reaction energy for the C—C dimerization; with preference, the reaction energy for the C—C dimerization is decreased by 0.3 eV to 0.7 eV.
- The multi-metal material is a de-alloyed material.
- The multi-metal material comprises from 1 wt % to 50 wt % of the enhancer metal based on the total weight of the multi-metal material, preferably from 2 wt % to 40 wt % of the enhancer metal, more preferably from 3 wt % to 30 wt % of the enhancer metal.
- The multi-metal material comprises 50 wt % to 99 wt % of the primary catalytic metal based on the total weight of the multi-metal material, preferably from 60 to 98 wt % of the primary catalytic metal, more preferably from 70 wt % to 97 wt % of the primary catalytic metal.
- The multi-metal material comprises the primary catalytic metal doped with the enhancer metal.
- The multi-metal material comprises the enhancer metal doped with the primary catalytic metal.

In a preferred embodiment that can be combined with all previous embodiments according to the third aspect, the multi-metal material is formed as a catalytic layer; with preference:
- the catalytic layer is formed directly on a gas diffusion membrane; and/or
- the catalytic layer has a thickness between 10 nm and 5000 nm as determined by cross-sectional scanning electron microscopy; and/or
- the multi-metal material comprises enhancer metal-terminated pores.

The one or more following features can be further used to further define the electrocatalyst according to the third aspect:
- the enhancer metal is ion-implanted into the primary catalytic metal.
- the enhancer metal is present in the primary catalytic metal as enhancer metal evaporated into the primary catalytic metal and remains after chemically etching.
- the primary catalytic metal and the enhancer metal in the multi-metal material are morphologically stable after five hours of electroreduction reaction in alkaline electrolyte.
- The enhancer metal concentration in the multi-metal material is stable after five hours of electroreduction reaction in alkaline electrolyte.

In a preferred embodiment that can be combined with all previous embodiments according to the third aspect, the multi-metal material comprises a surface region having a thickness between 1 nm and 3 nm as determined by Auger electron spectroscopy; with preference:
- at least the surface region comprises an enhancer metal content of 1 wt % to 50 wt % and a primary catalytic metal content of 50 wt % to 99 wt %, or comprises an enhancer metal content of 3 wt % to 30 wt % and a primary catalytic metal content of 70 wt % to 97 wt %.
- at least the surface region is nanoporous; with preference, at least the surface region has pores that have pore diameters ranging from 1 nm to 100 nm as determined by HRTEM and HAADF analysis, or from 5 nm to 20 nm.
- at least the surface region has a homogeneous distribution of enhancer metal and the primary catalytic metal.

In an embodiment, the primary catalytic metal in at least the surface region is has a (111) structure; with preference, the enhancer metal content is about 8 wt % to about 15 wt %, or about 11 wt % to about 13 wt %.

In an embodiment, the primary catalytic metal in at least the surface region has a (100) structure; with preference, the enhancer metal content is about 3 wt % to about 15 wt %.

In an embodiment, at least the surface region consists of the primary catalytic metal and the enhancer metal.

Preferably, the multi-metallic material consists of the primary catalytic metal and the enhancer metal.

In a preferred embodiment, the enhancer metal comprises or consists of Al, and/or the primary catalytic metal comprises or consists of Cu.

With preference, the electrocatalyst of the third aspect, comprises one or more features as defined for the catalyst according to the first and second aspect or as described herein.

According to a fourth aspect, the invention provides the use of the electrocatalyst as defined in any one of the first aspect, second aspect or third aspect, for electrocatalytic reduction of $CO_2$ into at least one multi-carbon compound. Preferably, the at least one multi-carbon compound comprises ethylene.

In a preferred embodiment, the electrocatalytic reduction of $CO_2$ is performed in an alkaline medium; with preference, the alkaline medium comprises potassium hydroxide.

In a further preferred embodiment, the electrocatalytic reduction of $CO_2$ is performed in a three-electrode flow-cell.

According to a fifth aspect, the invention provides a process for electrochemical production of a multi-carbon compound from $CO_2$, comprising:
  contacting $CO_2$ gas and an electrolyte with an electrode comprising the electrocatalyst as defined in any one of the first aspect, second aspect or third aspect, such that the $CO_2$ contacts the electrocatalyst;
  applying a voltage to provide a current density to cause the $CO_2$ gas contacting the electrocatalyst to be electrochemically converted into the multi-carbon compound; and
  recovering the multi-carbon compound.

The one or more following features can be further used to further define the process according to the fifth aspect:
  The current density provided in the current collection structure is predetermined for selective electrochemical conversion of the $CO_2$ into a target multi-carbon compound.
  The target multi-carbon compound is ethylene or an alcohol.
  The electrolyte comprises an alkaline compound.
  The electrolyte comprises KOH and/or other alkaline solutions.
  The process is conducted in a three-electrode flow-cell.

According to a sixth aspect, the invention provides a system for $CO_2$ electroreduction to produce multi-carbon hydrocarbons, comprising:
  an electrolytic cell configured to receive a liquid electrolyte and $CO_2$ gas;
  an anode;
  a cathode comprising an electrocatalyst as defined in any one of the first aspect, second aspect or third aspect; and
  a voltage source to provide a current density to cause the $CO_2$ gas contacting the electrocatalyst to be electrochemically converted into the multi-carbon hydrocarbon, which is optionally ethylene or an alcohol.

According to a seventh aspect, the invention provides a method of manufacturing the electrocatalyst as defined in any one of the first aspect, second aspect or third aspect comprising vapour-phase deposition followed by chemical etching or ion-implanting.

According to an eighth aspect, the invention provides a method of manufacturing an electrocatalyst for reduction of $CO_2$ to produce multi-carbon compounds, the method comprising:
  producing a metallic material comprising Cu and Al; and
  subjecting the metallic material to chemical etching to remove a portion of the Al from a surface region of the metallic alloy to produce a de-alloyed Cu—Al material.

In a preferred embodiment, the method comprises producing the metallic material comprises vapour-phase deposition of Al onto a Cu surface; with preference:
  the vapour-phase deposition comprising evaporating solid Al and forming a deposited Al layer on the Cu surface to form an evaporated Al-on-Cu material.
  the deposited Al layer has a thickness of about 50 to 150 nm as determined by cross-sectional scanning electron microscopy.
  the evaporating of the solid Al is performed at an evaporation rate of approximately 1-10 nm s$^{-1}$, 1-5 nm s$^{-1}$ or 1-2 nm s$^{-1}$.
  the evaporating of the solid Al is performed at under a base pressure of about $10^{-5}$ to $10^{-8}$ Torr ($133.32 \times 10^{-5}$ to $133.32 \times 10^{-8}$ Pa).

In a preferred embodiment, the method comprises producing the metallic material comprises vapour-phase deposition of Al onto a Cu surface; with preference:
  the chemical etching comprises immersing the evaporated Al-on-Cu material into an acidic solution to remove Al.
  the acidic solution comprises hydrochloric acid solution.
  the hydrochloric acid solution comprises from 1 to 20 wt % of hydrochloric acid, preferably from 1 to 10 wt % of hydrochloric acid, more preferably from 1 to 5 wt % hydrochloric acid.
  The method further comprising, after chemical etching, washing with water to remove the acidic solution; with preference, further comprising, after washing, air drying to remove water.
  The method further comprising, prior to producing the metallic alloy comprising the Cu and Al, depositing Cu on a gas diffusion layer (GDL).
  the Cu is deposited by thermal evaporation onto the GDL.
  the Cu forms a deposited Cu layer on the GDL.
  the deposited Cu layer has a thickness of about 400 to 600 nm as determined by cross-sectional scanning electron microscopy.

In a preferred embodiment, producing the metallic material comprises co-evaporation of Al and Cu to form a Cu—Al alloy; with preference:
  The method further comprises depositing a layer of the Cu—Al alloy onto a gas diffusion layer (GDL) prior to the chemical etching.
  The method further comprises cooling the deposited Cu—Al alloy prior to chemical etching.
  The chemical etching comprises immersing the Cu—Al alloy in an acidic solution to remove Al; preferably, the acidic solution comprises hydrochloric acid solution, and/or the method further comprises, after chemical etching, washing with water to remove the acidic solution.

According to a ninth aspect, the invention provides a method of manufacturing an electrocatalyst for reduction of $CO_2$ to produce multi-carbon compounds, the method comprising ion-implanting Al into Cu.

The following embodiments can also be used to define the invention:

In an embodiment 1, the invention provides an electrocatalyst for reduction of $CO_2$ to produce multi-carbon compounds, the electrocatalyst comprising a multi-metal Cu—Al material.

In a further embodiment 2, the electrocatalyst of embodiment 1, wherein the multi-metal Cu—Al material is a de-alloyed Cu—Al material.

In a further embodiment 3, the electrocatalyst of embodiment 1 or 2, wherein the multi-metal Cu—Al material comprises 1 wt % to 50 wt % Al, or 3 wt % to 30 wt % Al.

In a further embodiment 4, the electrocatalyst of any one of embodiments 1 to 3, wherein the multi-metal Cu—Al material comprises 50 wt % to 99 wt % Cu, or 70 wt % to 97 wt % Cu.

In a further embodiment 5, the electrocatalyst of any one of embodiments 1 to 4, wherein the multi-metal Cu—Al material comprises Cu doped with Al.

In a further embodiment 6, the electrocatalyst of any one of embodiments 1 to 4, wherein the multi-metal Cu—Al material comprises Al doped with Cu.

In a further embodiment 7, the electrocatalyst of any one of embodiments 1 to 6, wherein the multi-metal Cu—Al material is formed as a catalytic layer.

In a further embodiment 8, the electrocatalyst of claim 7, wherein the catalytic layer is formed directly on a gas diffusion membrane.

In a further embodiment 9, the electrocatalyst of claim 7 or 8, wherein the catalytic layer has a thickness between 1 nm and 5000 nm.

In a further embodiment 10, the electrocatalyst of any one of embodiments 1 to 9, wherein the multi-metal Cu—Al material comprises Al-terminated pores.

In a further embodiment 11, the electrocatalyst of any one of embodiments 1 to 10, wherein the Al is ion-implanted into the Cu.

In a further embodiment 12, the electrocatalyst of any one of embodiments 1 to 10, wherein the Al is present in the Cu as Al that has been evaporated into the Cu and remains after chemically etching.

In a further embodiment 13, the electrocatalyst of any one of embodiments 1 to 12, wherein the Cu and Al in the multi-metal Cu—Al material are morphologically stable after five hours of electroreduction reaction in alkaline electrolyte.

In a further embodiment 14, the electrocatalyst of any one of embodiments 1 to 13, wherein Al concentration in the multi-metal Cu—Al material is stable after five hours of electroreduction reaction in alkaline electrolyte.

In a further embodiment 15, the electrocatalyst of any one of embodiments 1 to 14, wherein the multi-metal Cu—Al material comprises a surface region having a thickness between 1 nm and 3 nm.

In a further embodiment 16, the electrocatalyst of claim 15, wherein at least the surface region comprises an Al content of 1 wt % to 50 wt % and a Cu content of 50 wt % to 99 wt %, or comprises an Al content of 3 wt % to 30 wt % and a Cu content of 70 wt % to 97 wt %.

In a further embodiment 17, the electrocatalyst of claim 15 or 16, wherein at least the surface region is nanoporous.

In a further embodiment 18, the electrocatalyst of claim 17, wherein at least the surface region has pores that have pore sizes of 1 nm to 100 nm, or of 5 nm to 20 nm.

In a further embodiment 19, the electrocatalyst of any one of embodiments 15 to 18, wherein at least the surface region has a homogeneous distribution of Al and Cu.

In a further embodiment 20, the electrocatalyst of any one of embodiments 15 to 19, wherein the Cu in at least the surface region is Cu (111).

In a further embodiment 21, the electrocatalyst of claim 20, wherein the Al content in the Cu (111) is about 8 wt % to about 15 wt %, or about 11 wt % to about 13 wt %.

In a further embodiment 22, the electrocatalyst of any one of embodiments 15 to 19, wherein the Cu in at least the surface region is Cu (100).

In a further embodiment 23, the electrocatalyst of claim 22, wherein the Al content in the Cu (111) is about 3 wt % to about 15 wt %.

In a further embodiment 24, the electrocatalyst of any one of embodiments 15 to 23, wherein at least the surface region consists of Cu and Al.

In a further embodiment 25, the electrocatalyst of any one of embodiments 1 to 24, wherein the multi-metallic Cu—Al material consists of Cu and Al.

In an embodiment 26, the invention provides an electrocatalyst for reduction of $CO_2$ to produce multi-carbon compounds, the electrocatalyst comprising a multi-metal material comprising Cu and an enhancer metal that modifies Cu coordination environment that enhances C—C dimerization.

In a further embodiment 27, the electrocatalyst of claim 26, wherein the enhancer metal increases catalytic site density with decreased reaction energy for the C—C dimerization.

In a further embodiment 28, the electrocatalyst of claim 27, wherein the reaction energy for the C—C dimerization is decreased by 0.3 eV to 0.7 eV.

In a further embodiment 29, the electrocatalyst of any one of embodiments 26 to 28, wherein the multi-metal material is a de-alloyed material.

In a further embodiment 30, the electrocatalyst of any one of embodiments 26 to 29, wherein the multi-metal material comprises 1 wt % to 50 wt % of the enhancer metal, or 3 wt % to 30 wt % of the enhancer metal.

In a further embodiment 31, the electrocatalyst of any one of embodiments 26 to 30, wherein the multi-metal material comprises 50 wt % to 99 wt % Cu, or 70 wt % to 97 wt % Cu.

In a further embodiment 32, the electrocatalyst of any one of embodiments 26 to 31, wherein the multi-metal material comprises the Cu doped with the enhancer metal.

In a further embodiment 33, the electrocatalyst of any one of embodiments 26 to 32, wherein the multi-metal material comprises the enhancer metal doped with the Cu.

In a further embodiment 34, the electrocatalyst of any one of embodiments 26 to 33, wherein the multi-metal material is formed as a catalytic layer.

In a further embodiment 35, the electrocatalyst of claim 34, wherein the catalytic layer is formed directly on a gas diffusion membrane.

In a further embodiment 36, the electrocatalyst of claim 34 or 35, wherein the catalytic layer has a thickness between 1 nm and 5000 nm.

In a further embodiment 37, the electrocatalyst of any one of embodiments 34 to 36, wherein the multi-metal material comprises enhancer metal-terminated pores.

In a further embodiment 38, the electrocatalyst of any one of embodiments 26 to 37, wherein the enhancer metal is ion-implanted into the Cu.

In a further embodiment 39, the electrocatalyst of any one of embodiments 26 to 37, wherein the enhancer metal is present in the Cu as enhancer metal evaporated into the Cu and remains after chemically etching.

In a further embodiment 40, the electrocatalyst of any one of embodiments 26 to 39, wherein the Cu and the enhancer metal in the multi-metal material are morphologically stable after five hours of electroreduction reaction in alkaline electrolyte.

In a further embodiment 41, the electrocatalyst of any one of embodiments 26 to 40, wherein enhancer metal concentration in the multi-metal material is stable after five hours of electroreduction reaction in alkaline electrolyte.

In a further embodiment 42, the electrocatalyst of any one of embodiments 26 to 41, wherein the multi-metal material comprises a surface region having a thickness between 1 nm and 3 nm.

In a further embodiment 43, the electrocatalyst of claim 42, wherein at least the surface region comprises an enhancer metal content of 1 wt % to 50 wt % and a Cu content of 50 wt % to 99 wt %, or comprises an enhancer metal content of 3 wt % to 30 wt % and a Cu content of 70 wt % to 97 wt %.

In a further embodiment 44, the electrocatalyst of claim 42 or 43, wherein at least the surface region is nanoporous.

In a further embodiment 45, the electrocatalyst of claim 44, wherein at least the surface region has pores that have pore sizes of 1 nm to 100 nm, or of 5 nm to 20 nm.

In a further embodiment 46, the electrocatalyst of any one of embodiments 42 to 45, wherein at least the surface region has a homogeneous distribution of enhancer metal and Cu.

In a further embodiment 47, the electrocatalyst of any one of embodiments 42 to 46, wherein the Cu in at least the surface region is Cu (111).

In a further embodiment 48, the electrocatalyst of claim 47, wherein the enhancer metal content in the Cu (111) is about 8 wt % to about 15 wt %, or about 11 wt % to about 13 wt %.

In a further embodiment 49, the electrocatalyst of any one of embodiments 42 to 46, wherein the Cu in at least the surface region is Cu (100).

In a further embodiment 50, the electrocatalyst of claim 49, wherein the enhancer metal content in the Cu (111) is about 3 wt % to about 15 wt %.

In a further embodiment 51, the electrocatalyst of any one of embodiments 42 to 50, wherein at least the surface region consists of the Cu and the enhancer metal.

In a further embodiment 52, the electrocatalyst of any one of embodiments 26 to 51, wherein the multi-metallic material consists of the Cu and the enhancer metal.

In a further embodiment 53, the electrocatalyst of any one of embodiments 26 to 52, wherein the enhancer metal comprises or consists of Al.

In an embodiment 54, the invention provides an electrocatalyst for reduction of $CO_2$ to produce multi-carbon compounds, the electrocatalyst comprising a multi-metal material comprising a primary catalyst metal and an enhancer metal that modifies coordination environment of the primary catalyst metal so as to enhance C—C dimerization.

In a further embodiment 55, the electrocatalyst of claim 54, wherein the enhancer metal increases catalytic site density with decreased reaction energy for the C—C dimerization.

In a further embodiment 56, the electrocatalyst of claim 55, wherein the reaction energy for the C—C dimerization is decreased by 0.3 eV to 0.7 eV.

In a further embodiment 57, the electrocatalyst of any one of embodiments 54 to 56, wherein the multi-metal material is a de-alloyed material.

In a further embodiment 58, the electrocatalyst of any one of embodiments 54 to 57, wherein the multi-metal material comprises 1 wt % to 50 wt % of the enhancer metal, or 3 wt % to 30 wt % of the enhancer metal.

In a further embodiment 59, the electrocatalyst of any one of embodiments 54 to 58, wherein the multi-metal material comprises 50 wt % to 99 wt % of the primary catalytic metal, or 70 wt % to 97 wt % of the primary catalytic metal.

In a further embodiment 60, the electrocatalyst of any one of embodiments 54 to 59, wherein the multi-metal material comprises the primary catalytic metal doped with the enhancer metal.

In a further embodiment 61, the electrocatalyst of any one of embodiments 54 to 59, wherein the multi-metal material comprises the enhancer metal doped with the primary catalytic metal.

In a further embodiment 62, the electrocatalyst of any one of embodiments 54 to 61, wherein the multi-metal material is formed as a catalytic layer.

In a further embodiment 63, the electrocatalyst of claim 62, wherein the catalytic layer is formed directly on a gas diffusion membrane.

In a further embodiment 64, the electrocatalyst of claim 62 or 63, wherein the catalytic layer has a thickness between 1 nm and 5000 nm.

In a further embodiment 65, the electrocatalyst of any one of embodiments 62 to 64, wherein the multi-metal material comprises enhancer metal-terminated pores.

In a further embodiment 66, the electrocatalyst of any one of embodiments 54 to 65, wherein the enhancer metal is ion-implanted into the primary catalytic metal.

In a further embodiment 67, the electrocatalyst of any one of embodiments 54 to 65, wherein the enhancer metal is present in the primary catalytic metal as enhancer metal evaporated into the primary catalytic metal and remains after chemically etching.

In a further embodiment 68, the electrocatalyst of any one of embodiments 54 to 67, wherein the primary catalytic metal and the enhancer metal in the multi-metal material are morphologically stable after five hours of electroreduction reaction in alkaline electrolyte.

In a further embodiment 69, the electrocatalyst of any one of embodiments 54 to 68, wherein enhancer metal concentration in the multi-metal material is stable after five hours of electroreduction reaction in alkaline electrolyte.

In a further embodiment 70, the electrocatalyst of any one of embodiments 54 to 69, wherein the multi-metal material comprises a surface region having a thickness between 1 nm and 3 nm.

In a further embodiment 71, the electrocatalyst of claim 70, wherein at least the surface region comprises an enhancer metal content of 1 wt % to 50 wt % and a primary catalytic metal content of 50 wt % to 99 wt %, or comprises an enhancer metal content of 3 wt % to 30 wt % and a primary catalytic metal content of 70 wt % to 97 wt %.

In a further embodiment 72, the electrocatalyst of claim 70 or 71, wherein at least the surface region is nanoporous.

In a further embodiment 73, the electrocatalyst of claim 72, wherein at least the surface region has pores that have pore sizes of 1 nm to 100 nm, or of 5 nm to 20 nm.

In a further embodiment 74, the electrocatalyst of any one of embodiments 70 to 73, wherein at least the surface region has a homogeneous distribution of enhancer metal and the primary catalytic metal.

In a further embodiment 75, the electrocatalyst of any one of embodiments 70 to 74, wherein the primary catalytic metal in at least the surface region is has a (111) structure.

In a further embodiment 76, the electrocatalyst of claim 75, wherein the enhancer metal content is about 8 wt % to about 15 wt %, or about 11 wt % to about 13 wt %.

In a further embodiment 77, the electrocatalyst of any one of embodiments 70 to 76, wherein the primary catalytic metal in at least the surface region has a (100) structure.

In a further embodiment 78, the electrocatalyst of claim 49, wherein the enhancer metal content is about 3 wt % to about 15 wt %.

In a further embodiment 79, the electrocatalyst of any one of embodiments 70 to 78, wherein at least the surface region consists of the primary catalytic metal and the enhancer metal.

In a further embodiment 80, the electrocatalyst of any one of embodiments 54 to 79, wherein the multi-metallic material consists of the primary catalytic metal and the enhancer metal.

In a further embodiment 81, the electrocatalyst of any one of embodiments 54 to 80, wherein the enhancer metal comprises or consists of Al.

In a further embodiment 82, the electrocatalyst of any one of embodiments 54 to 81, wherein the primary catalytic metal comprises or consists of Cu.

In a further embodiment 83, the electrocatalyst of any one of embodiments 54 to 82, comprising one or more features as defined in any one of embodiments 1 to 53 or as described herein.

In an embodiment 84, the invention provides the use of the electrocatalyst as defined in any one of embodiments 1 to 83 for electrocatalytic reduction of $CO_2$ into at least one multi-carbon compound.

In a further embodiment 85, the use of claim 84, wherein the at least one multi-carbon compound comprises ethylene.

In a further embodiment 86, the use of claim 84 or 85, wherein the electrocatalytic reduction of $CO_2$ is performed in an alkaline medium.

In a further embodiment 87, the use of claim 86, wherein the alkaline medium comprises potassium hydroxide.

In a further embodiment 88, the use of any one of embodiments 84 to 87, wherein the electrocatalytic reduction of $CO_2$ is performed in a three-electrode flow-cell.

In an embodiment 89, the invention provides a process for electrochemical production of a multi-carbon compound from $CO_2$, comprising:
  contacting $CO_2$ gas and an electrolyte with an electrode comprising the electrocatalyst as defined in any one of embodiments 1 to 83, such that the $CO_2$ contacts the electrocatalyst;
  applying a voltage to provide a current density to cause the $CO_2$ gas contacting the electrocatalyst to be electrochemically converted into the multi-carbon compound; and
  recovering the multi-carbon compound.

In a further embodiment 90, the process of claim 89, wherein the current density provided in the current collection structure is predetermined for selective electrochemical conversion of the $CO_2$ into a target multi-carbon compound.

In a further embodiment 91, the process of claim 89 or 90, wherein the target multi-carbon compound is ethylene or an alcohol.

In a further embodiment 92, the process of any one of embodiments 89 to 91, wherein the electrolyte comprises an alkaline compound.

In a further embodiment 93, the process of any one of embodiments 89 to 92, wherein the electrolyte comprises KOH and/or other alkaline solutions.

In a further embodiment 94, the process of any one of embodiments 89 to 93, conducted in a three-electrode flow-cell.

In an embodiment 95, the invention provides a system for $CO_2$ electroreduction to produce multi-carbon hydrocarbons, comprising:

an electrolytic cell configured to receive a liquid electrolyte and $CO_2$ gas;
an anode;
a cathode comprising an electrocatalyst as defined in any one of embodiments 1 to 83; and
a voltage source to provide a current density to cause the $CO_2$ gas contacting the electrocatalyst to be electrochemically converted into the multi-carbon hydrocarbon, which is optionally ethylene or an alcohol.

In an embodiment 96, the invention provides a method of manufacturing the electrocatalyst of any one of embodiments 1 to 83 comprising vapour-phase deposition followed by chemical etching or ion-implanting.

In an embodiment 97, the invention provides a method of manufacturing an electrocatalyst for reduction of $CO_2$ to produce multi-carbon compounds, the method comprising:
  producing a metallic material comprising Cu and Al; and
  subjecting the metallic material to chemical etching to remove a portion of the Al from a surface region of the metallic alloy to produce a de-alloyed Cu—Al material.

In a further embodiment 98, the method of claim 97, wherein producing the metallic material comprises vapour-phase deposition of Al onto a Cu surface.

In a further embodiment 99, the method of claim 98, wherein the vapour-phase deposition comprising evaporating solid Al and forming a deposited Al layer on the Cu surface to form an evaporated Al-on-Cu material.

In a further embodiment 100, the method of claim 99, wherein the deposited Al layer has a thickness of about 50 to 150 nm.

In a further embodiment 101, the method of claim 99 or 100, wherein the evaporating of the solid Al is performed at an evaporation rate of approximately 1-10 nm s$^{-1}$, 1-5 nm s$^{-1}$ or 1-2 nm s$^{-1}$.

In a further embodiment 102, the method of claim 101, wherein the evaporating of the solid Al is performed at under a base pressure of about $10^{-5}$ to $10^{-8}$ Torr.

In a further embodiment 103, the method of any one of embodiments 98 to 102, wherein the chemical etching comprises immersing the evaporated Al-on-Cu material into an acidic solution to remove Al.

In a further embodiment 104, the method of claim 103, wherein the acidic solution comprises hydrochloric acid solution.

In a further embodiment 105, the method of claim 103 or 104, wherein the hydrochloric acid solution comprises about 1-20 wt % or 1-5 wt % hydrochloric acid.

In a further embodiment 106, the method of any one of embodiments 103 to 105, further comprising, after chemical etching, washing with water to remove the acidic solution.

In a further embodiment 107, the method of claim 106, further comprising, after washing, air drying to remove water.

In a further embodiment 108, the method of any one of embodiments 98 to 107, further comprising, prior to producing the metallic alloy comprising the Cu and Al, depositing Cu on a gas diffusion layer (GDL).

In a further embodiment 109, the method of claim 108, wherein the Cu is deposited by thermal evaporation onto the GDL.

In a further embodiment 110, the method of claim 108 or 109, wherein the Cu forms a deposited Cu layer on the GDL.

In a further embodiment 111, the method of claim 110, wherein the deposited Cu layer has a thickness of about 400 to 600 nm.

In a further embodiment 112, the method of claim 97, wherein producing the metallic material comprises co-evaporation of Al and Cu to form a Cu—Al alloy.

In a further embodiment 113, the method of claim 112, further comprising depositing a layer of the Cu—Al alloy onto a gas diffusion layer (GDL) prior to the chemical etching.

In a further embodiment 114, the method of claim 113, further comprising cooling the deposited Cu—Al alloy prior to chemical etching.

In a further embodiment 115, the method of any one of embodiments 112 to 114, wherein the chemical etching comprises immersing the Cu—Al alloy in an acidic solution to remove Al.

In a further embodiment 116, the method of claim 115, wherein the acidic solution comprises hydrochloric acid solution.

In a further embodiment 117, the method of claim 115 or 116, further comprising, after chemical etching, washing with water to remove the acidic solution.

In an embodiment 118, the invention provides a method of manufacturing an electrocatalyst for reduction of $CO_2$ to produce multi-carbon compounds, the method comprising ion-implanting Al into Cu.

DESCRIPTION OF FIGURES

FIG. 14: Auger electron spectroscopic analysis of an ion-implanted Al-on-Cu catalyst. a, Auger secondary electron microscopic image. b, Auger spectroscopic narrow-scan spectra. c, Concentrations of Cu and Al.

FIG. 15: Auger electron spectroscopic analysis of an evaporated-etched Al-on-Cu catalyst. a, Auger secondary electron microscopic image. b, Auger spectroscopic narrow-scan spectra.
c, Concentrations of Cu and Al.

FIG. 19: EDX analysis of an evaporated-etched Al-on-Cu sample before $CO_2$ electroreduction. a, EDX mapping. b, Elemental concentrations. Chlorine is observed on the surface due to the use of HCl solution in the etching process.

FIG. 22: Auger electron spectroscopic analysis of a pure Cu catalyst after 0.5-hour $CO_2$ electroreduction at 600 mA cm$^{-2}$ in 1 M KOH with 1 mM Al(OH)$^-$. a, Auger secondary electron microscopic image. b, Auger spectroscopic narrow-scan spectra. c, Concentrations of Cu and Al.

FIG. 23: $CO_2$ electroreduction performance. Faradaic efficiencies for gaseous products with a pure Cu catalyst at a constant current density of 600 mA cm$^{-2}$ in 1 M KOH with the presence of 1 mM Al(OH)$_4^-$ obtained from Chronopotentiometry tests.

FIG. 24: EDX analysis of a pure Cu after immersing in 1 M KOH with 1 mM Al(OH)$_4^-$ for 0.5 hour. a, EDX mapping. b, Elemental concentrations. The invention manually selected Al and it was automatically marked in red by EDX software (Esprit 2.1) with a large error of 43.81%, indicating Al was actually out of the EDX detecting limit. As shown in the SEM image in FIG. 19a, the morphology was also drastically changed. Most of Cu dissolved into 1 M KOH leaving thin Cu(OH)$_2$ nanowires to be dissolved.

FIG. 27: EDX analysis in SEM of the as-prepared de-alloyed Cu—Al catalyst before $CO_2$ electroreduction. a, EDX mapping. b, Elemental concentrations. Chlorine was detected because of the use of a 5 wt % HCl solution in the etching process to prepare a de-alloyed Cu–Al catalyst.

FIG. 28: EDX analysis in SEM of a de-alloyed Cu—Al catalyst after 5 hours $CO_2$ electroreduction. a, EDX mapping. b, Elemental concentrations. Potassium was detected because of the use of KOH electrolyte in $CO_2$ electroreduction.

FIG. 30: Auger electron spectroscopic analysis of an as-prepared de-alloyed Cu—Al catalyst. a, Auger secondary electron microscopic image. b, Auger spectroscopic narrow-scan spectra. c, Concentrations of Cu and Al.

FIG. 31: Auger electron spectroscopic analysis of a de-alloyed Cu—Al catalyst after 5 hours $CO_2$ electroreduction at 600 mA cm$^{-2}$. a, Auger secondary electron microscopic image. b, Auger spectroscopic narrow-scan spectra. c, Concentrations of Cu and Al.

Half-cell power conversion efficiency=$V_{theoretic}$× $\eta_{Faradaic\ efficiency}/V_{real}$, where $V_{theoretic}$=1.15 (V) and $V_{real}$=(1.23−$V_{applied}$) (V).

Figure 36:
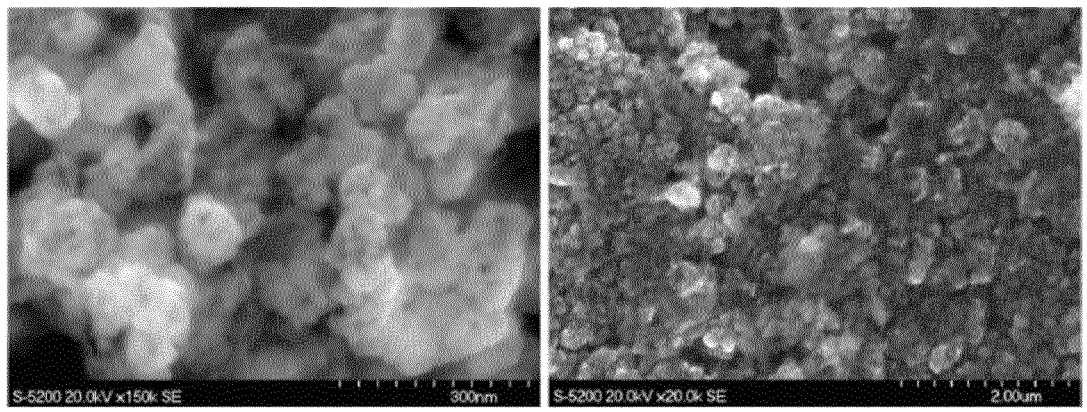

FIG. 36: SEM images of a de-alloyed Cu—Al catalyst soaked in 10 mM CuCl2 for 10 minutes. 10 minutes is an optimal time that the invention used to roughly maintain nanoporosity while replacing surface Cu with Al by the displacement reaction of 2Al+3CuCl$_2$→2AlCl$_3$+3Cu. The invention also found that nanopores were gradually blocked by the precipitated Cu with a prolonged CuCl$_2$ treatment.

Figure 37A:
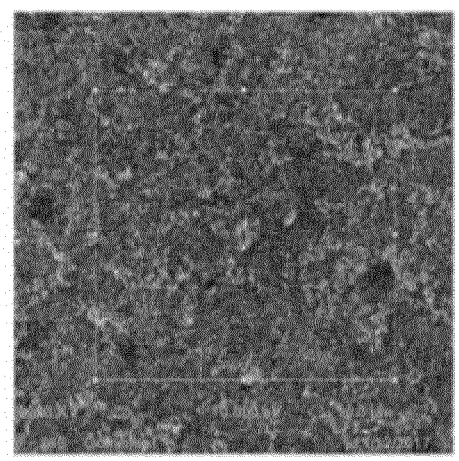
Figure 37B:
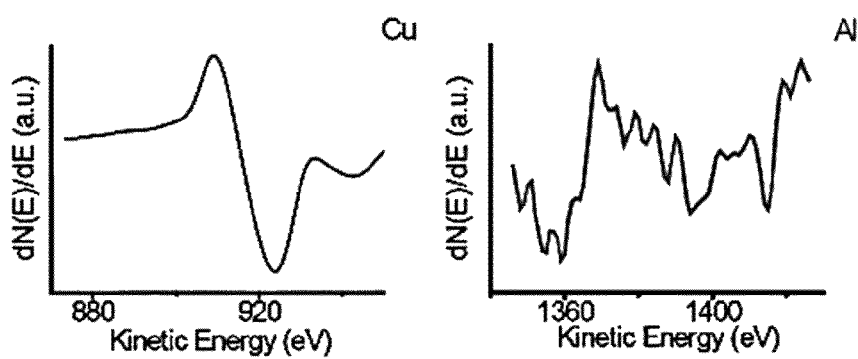

FIG. 37: Auger electron spectroscopic analysis of a de-alloyed Cu—Al catalyst soaked in 10 mM CuCl$_2$ solution for 0.5 hour. a, Auger secondary electron microscopic image. b, Auger spectroscopic narrow-scan spectra. c, Concentrations of Cu and Al. The Al concentration calculated from Al narrow-scan spectrum is already close to the AES detecting limit.

Figures 37C, 38:
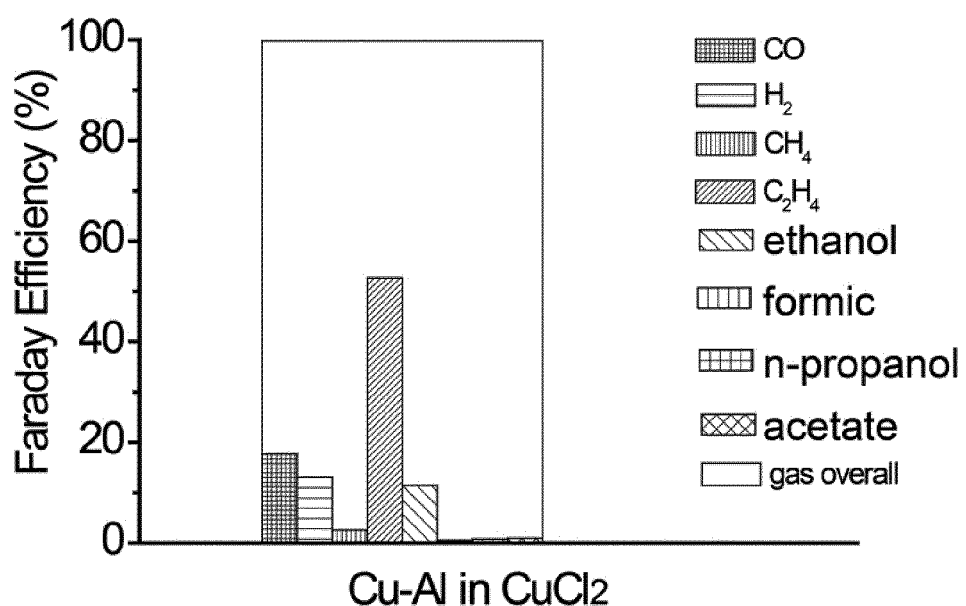

FIG. 38: $CO_2$ electroreduction performance. Faradaic efficiencies for all products at an applied current density of 600 mA cm$^{-2}$ obtained with of a de-alloyed Cu—Al catalyst after soaking in 10 mM CuCl$_2$ solution for 10 minutes.

DETAILED DESCRIPTION

Techniques described herein relate to enhanced catalyst materials that can be used for electrochemical $CO_2$ reduction and the production of multi-carbon compounds, and also to methods of manufacturing such catalyst materials.

Figure 1A:
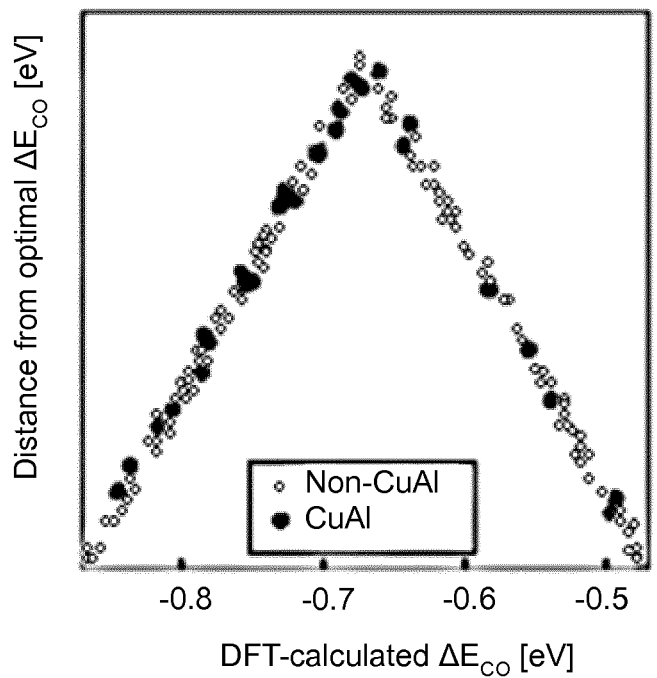
FIG. 1: Screening of Cu and Cu based compounds using computational methods. a, DFT-calculated CO adsorption energies ($\Delta E_{CO}$) of the surfaces. Energies are plotted on a volcano-shaped scaling relationship. Random noise was added to the ($\Delta E_{CO}$) values to distinguish different points more effectively. b, t-SNE representation of 3,494 adsorption sites that the method performed DFT calculations on. All Cu—Al clusters are labelled numerically. c, Representative coordination sites for each of the clusters labelled in the t-SNE diagram.
Figure 1B:
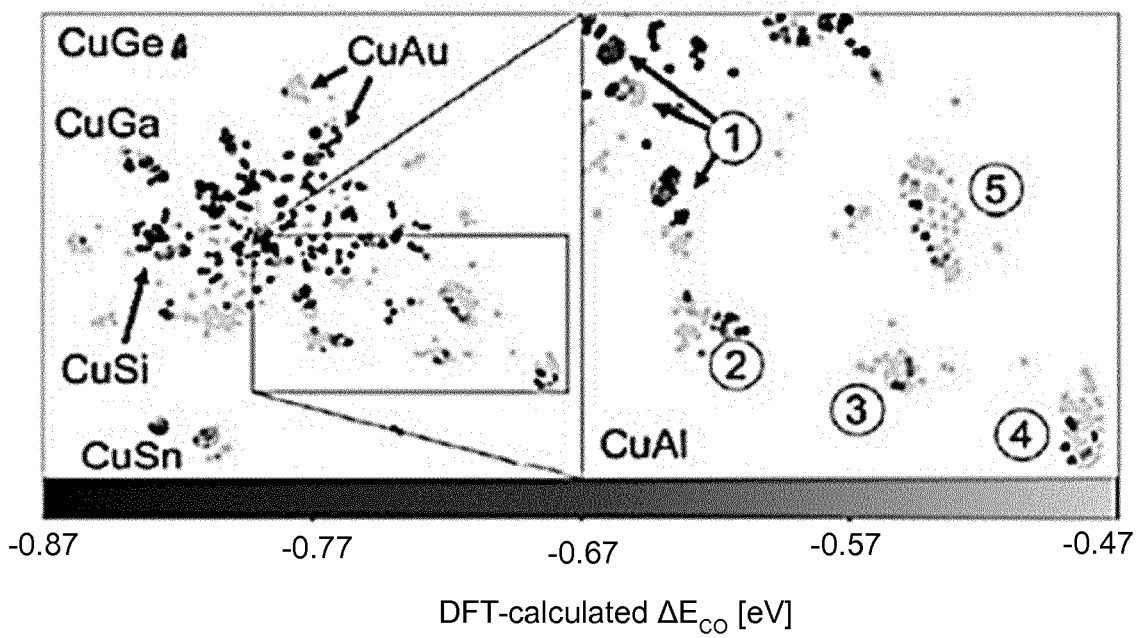
Figure 1C:
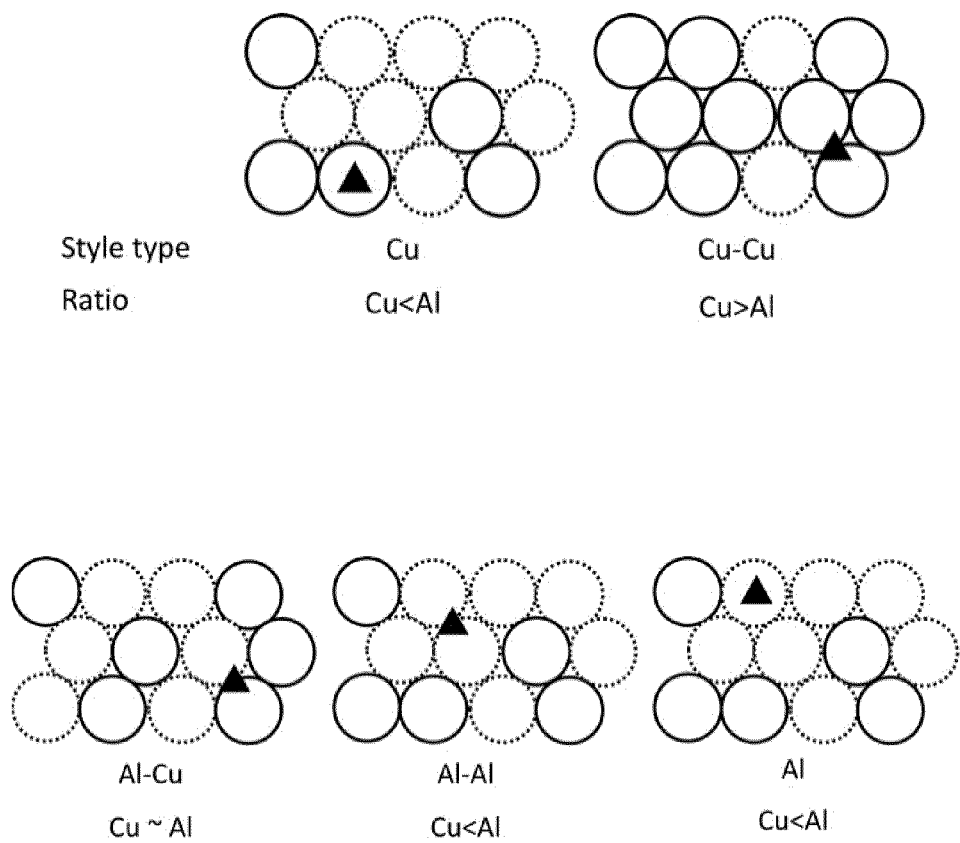

FIG. 1 highlights that Cu—Al shows improved CO binding energy for better C—C dimerization. FIG. 5 reveals that ion-implanting Al into Cu shows a better $CO_2$-electrolysis performance than that of pure Cu. FIG. 6 shows that de-alloyed Cu—Al catalysts has a better $CO_2$-electrolysis performance than that of pure Cu.

The Electrocatalyst

The invention provides an electrocatalyst for reduction of $CO_2$ to produce multi-carbon compounds. According to the invention, the electrocatalyst comprises a multi-metal material comprising a primary catalyst material and an enhancer material. The enhancer material is selected to modify the coordination of the primary catalyst material in order to enhance the C—C dimerization. The multi-carbon compounds preferably comprise, or consist of, ethylene.

According to a preferred embodiment of the invention, the primary catalyst material is copper (Cu); and/or the enhancer material is aluminium (Al).

Therefore, in a preferred embodiment of the invention the electrocatalyst comprises, or consist of, a multi-metal Cu—Al material. Indeed, the new Cu—Al based electrocatalyst materials according to the invention demonstrate highly activity for electrochemical reduction of carbon dioxide to chemicals (e.g., ethylene).

In a preferred embodiment, in the multi-metal material, the primary catalyst material, preferably comprising Cu or consisting of Cu, is predominant. Thus, the multi-metal material comprises from 50 wt % to 99 wt % of the primary catalyst material, based on the total weight of the multi-metal material, preferably from 60 wt % to 98 wt % of the primary catalyst material, more preferably from 65 wt % to 97 wt % of the primary catalyst material, even more preferably from 70 wt % to 96 wt % of the primary catalyst material.

In a preferred embodiment, the multi-metal material the enhancer material, preferably comprising Al or consisting of Al, is present in a weight percentage that is inferior to the weight percentage of the primary catalyst material. Thus, the multi-metal material comprises from 1 wt % to 50 wt % of the enhancer material, based on the total weight of the multi-metal material, preferably from 2 wt % to 40 wt % of the enhancer material, more preferably from 3 wt % to 35 wt % of the enhancer material, even more preferably from 4 wt % to 30 wt % of the enhancer material.

In another embodiment, the multi-metal material is formed as a catalytic layer. Therefore, the invention provides an electrocatalyst comprising a catalytic layer and a gas diffusion membrane; wherein the catalytic layer has a thickness ranging from 10 nm to 5000 nm as determined by cross-sectional scanning electron microscopy; preferably from 2 nm to 2500 nm; more preferably from 3 nm to 1000 nm. With preference, the catalytic layer is formed directly on the gas diffusion membrane.

The gas diffusion membrane comprises a carbon-based material and/or is hydrophobic. In an embodiment, the gas diffusion membrane includes a hydrophobic polymer-based support such as polytetrafluoroethylene or similar polymers.

In an embodiment, the electrocatalyst described herein can be used as a catalyst layer in a composite multilayered electrocatalyst (CME) that includes a polymer-based gas-diffusion layer, a current collection structure, and the catalyst layer, sandwiched in between. The current collection structure can include a carbon nanoparticle layer applied against the catalyst layer, and a graphite layer applied against the nanoparticle layer. In one possible implementation of the CME, it includes hydrophobic polymer-based support such as polytetrafluoroethylene (PTFE); a Cu—Al or other multi-metal catalyst material deposited on top; a layer of carbon-based nanoparticles (NPs) atop the catalyst; and an ensuing layer of graphite as the electron conductive layer. In this configuration, the PTFE layer, which can be substantially pure PTFE or similar polymer, acts as a more stable hydrophobic gas-diffusion layer that prevents flooding from the catalyst; carbon NPs and graphite stabilize the metal catalyst surface; the graphite layer both serves as overall support and current collector. In an alternative implementation, the CME includes a hydrophobic polymer-based layer; the multi-metal electrocatalyst deposited on top; and then a layer of conductive material such as graphite deposited on top of the catalyst layer. In this configuration, the stabilization material (e.g., carbon nanoparticles) are not present as a distinct layer in between the graphite and the catalyst layers. Other features of the CME and related $CO_2RR$ methods as described in the article Cao-Thang Dinh & al. "CO2 electroreduction to ethylene via hydroxide-mediated copper catalysis at an abrupt interface" Science 18 May 2018 Vol. 360, Issue 6390, pp. 783-787 (DOI: 10.1126/science.aas 9100) can be used in combination with the electrocatalyst and methods described herein.

According to a preferred embodiment, the multi-metal material is a de-alloyed material. Thus, in case of a multi-metal Cu—Al material, it is a de-alloyed Cu—Al material.

The structure of the multi-metal material can be as follow:
the multi-metal material comprises enhancer material-terminated pores; or
the enhancer material is ion-implanted into the primary catalyst material; or
the enhancer material is present in the primary catalyst material as the enhancer material that has been evaporated into the primary catalyst material and remains after chemically etching In an embodiment, the electrocatalyst is layered, and comprises an internal region and a surface region. The internal region may consist of the primary catalyst material or both of the primary catalyst material and the enhancer material. If the internal region consists of both the primary and enhance materials, their weight percentages can be varied from 1%-99% for each.

The surface region of the electrocatalyst has preferably a thickness ranging between 0.5 nm to 3.5 nm as determined by Auger electron spectroscopy, preferably ranging from 1 nm to 3 nm; more preferably ranging from 1.5 to 2.5 nm.

In a preferred embodiment, at least in the surface portion of the multi-metal material, the primary catalyst material, preferably comprising Cu or consisting of Cu, is predominant. Thus, at least the surface portion of the multi-metal material comprises from 50 wt % to 99 wt % of the primary catalyst material, based on the total weight of the surface portion of the multi-metal material, preferably from 60 wt % to 98 wt % of the primary catalyst material, more preferably from 65 wt % to 97 wt % of the primary catalyst material, even more preferably from 70 wt % to 96 wt % of the primary catalyst material.

In a preferred embodiment, at least in the surface portion of the multi-metal material, the enhancer material, preferably comprising Al or consisting of Al, is present in a weight percentage that is inferior to the weight percentage of the primary catalyst material. Thus, at least the surface portion of the multi-metal material comprises from 1 wt % to 50 wt % of the enhancer material, based on the total weight of the surface portion of the multi-metal material, preferably from 2 wt % to 40 wt % of the enhancer material, more preferably from 3 wt % to 35 wt % of the enhancer material, even more preferably from 4 wt % to 30 wt % of the enhancer material.

In a preferred embodiment, at least the surface region comprises an Al content of 1 wt % to 50 wt % and a Cu content of 50 wt % to 99 wt %, or comprises an Al content of 3 wt % to 30 wt % and a Cu content of 70 wt % to 97 wt %.

In a preferred embodiment, at least the surface region consists of Cu and Al; with preference, the multi-metal material consists of Cu and Al.

In a preferred embodiment, at least the surface region of the multi-metal material is nanoporous. In another embodiment, at least 50 wt % of the multi-metal material is nanoporous based on the total weight of the multi-metal material, preferably 95 wt % of the multi-metal material is nanoporous.

The multi-metal material comprises pores having a pore diameter ranging from 1 nm to 100 nm as determined by HRTEM and HAADF analysis, preferably from 2 nm to 80 nm; more preferably from 3 nm to 60 nm, even more preferably from 4 nm to 40 nm and most preferably from 5 nm to 20 nm.

In a preferred embodiment, at least the surface region has a homogeneous distribution of Al and Cu, which means that at least the Al on the surface region is uniformly distributed within the Cu—Al material, i.e. no aggregated metallic Al nanocluster or other metallic Al nanomorphology on the surface.

In an embodiment, the Cu in at least the surface region is Cu (100); with preference, the Al content in the Cu (100) is about 3 wt % to about 15 wt %

In another embodiment, the Cu in at least the surface region is Cu (111); with preference, the Al content in the Cu (111) is about 8 wt % to about 15 wt %, or about 11 wt % to about 13 wt %.

Method to Manufacture the Electrocatalyst

The electrocatalyst is preferably manufactured by physical vapour deposition and chemical etching processes. In another embodiment, the electrocatalyst is manufactured by ions implanting.

Methods of manufacturing Cu—Al based electrocatalysts have been developed and, in some implementations, use physical vapour deposition and chemical etching processes, which facilitates scalable fabrication of nanoporous Cu—Al catalysts. When manufactured by vapour deposition and chemical etching processes, the method comprises the following steps:
  producing a metallic material, i.e. a multi-metal material, comprising Cu and Al; and
  subjecting the metallic material; i.e. a multi-metal material, to chemical etching to remove a portion of the Al from a surface region of the metallic alloy to produce a de-alloyed multi-metal Cu—Al material.

The step of producing a metallic material, i.e. a multi-metal material, comprising Cu and Al preferably comprises vapour-phase deposition of Al onto a Cu surface; such as evaporating solid Al and forming a deposited Al layer on the Cu surface to form an evaporated Al-on-Cu material, wherein the deposited Al layer has a thickness ranging from 20 to 200 nm as determined by cross-sectional scanning electron microscopy, preferably from 50 to 150 nm, more preferably from 60 to 100 nm.

With preference, the step of evaporating of the solid Al is performed at an evaporation rate ranging from 1 to 10 nm s$^{-1}$, preferably from 1 to 5 nm s$^{-1}$, more preferably from 1 to 2 nm s$^{-1}$.

More preferably, the step of evaporating of the solid Al is performed under a base pressure ranging from $10^{-5}$ to $10^{-8}$ Torr i.e. 133.32×$10^{-5}$ to 133.32×$10^{-8}$ Pa.

According to the invention, the chemical etching comprises immersing the evaporated Al-on-Cu material into an acidic solution to remove Al.

With preference, the acidic solution comprises hydrochloric acid solution; preferably, the hydrochloric acid solution comprises from 1 to 20 wt % of hydrochloric acid based on the total weight of the hydrochloric acid solution, preferably from 1 to 18 wt %, more preferably from 1 to 15 wt %, even more preferably from 1 to 12 wt %, most preferably from 1 to 10 wt %, even most preferably from 1 to 8 wt % or from 1 to 5 wt % of hydrochloric acid.

Preferably, the method comprises, after chemical etching, washing with water to remove the acidic solution; with preference, the method further comprises, after washing, air drying to remove water.

In a preferred embodiment, the method further comprises, prior to producing the metallic alloy comprising the Cu and Al, depositing Cu on a gas diffusion layer (GDL); with preference, the Cu is deposited by thermal evaporation onto the GDL Preferably, the Cu forms a deposited Cu layer on the GDL; wherein the deposited Cu layer has a thickness ranging from 300 to 1000 nm as determined by cross-sectional scanning electron microscopy, preferably from 350 to 800 nm, more preferably from 400 to 600 nm and even more preferably from 450 to 550 nm.

In an embodiment, the step of producing a multi-metal material comprising Cu and Al comprises co-evaporation of Al and Cu to form a Cu—Al alloy; with preference the multi-metal material comprising Cu and Al form a layer having a thickness ranging from 200 to 1000 nm as determined by cross-sectional scanning electron microscopy, preferably from 250 to 800 nm, more preferably from 300 to 500 nm.

With preference, the method further comprise depositing a layer of the Cu—Al alloy onto a gas diffusion layer (GDL) prior to the chemical etching; more preferably, the method comprises cooling the deposited Cu—Al alloy prior to chemical etching.

With preference, the chemical etching comprises immersing the Cu—Al alloy in an acidic solution to remove Al; with preference, the acidic solution comprises hydrochloric acid solution. More preferably, after chemical etching, washing with water to remove the acidic solution.

In another embodiment the method of manufacturing an electrocatalyst for reduction of $CO_2$ to produce multi-carbon compounds, the method comprising ion-implanting Al into Cu. That is, a Cu catalyst layer is made with a desired thickness on a gas diffusion layer first, and then, Al is ion-implanted into Cu to make a Cu—Al surface.

In some implementations, the Cu—Al based electrocatalysts enable highly selective production of ethylene with a record $CO_2$-to-$C_2H_4$ Faradaic efficiency of 80% at an unprecedently high applied current density of 600 mA cm$^{-2}$ (−1.8 to −2.1 V vs. RHE) in a flow cell system. This result vastly improves the $CO_2$-to-$C_2H_4$ selectivity and stability with a fairly high half-cell electricity-to-ethylene power conversion efficiency of 30% which readily meets the requirements of practical operation. Embodiments of the de-alloyed nanoporous Cu—Al catalysts achieve a $CO_2$-to-$C_2H_4$ Faradaic efficiency of 80% at an applied current density of 600 mA cm$^{-2}$ with an applied cathodic potential between −1.8 to −2.1 V vs. RHE (corresponding to a full-cell voltage of 3.03 to 3.33 V in the ideal case considering a 1.23 V on the OER side).

The rapid increase in global energy demand and the need to replace fossil fuels with renewable sources necessitate vast chemical storage of intermittent solar and wind electricity. The electrochemical reduction of $CO_2$ to valuable chemical feedstocks represents a promising means of utilizing $CO_2$ and renewable energy combined. Until now, copper has been the predominant electrocatalyst for the production of multi-carbon products, but it has certain drawbacks.

Accelerated discovery of potential catalysts was performed. The results suggested that copper-rich Cu—Al alloys provide multiple sites and surface orientations that exhibit optimal CO adsorption energies near the top of the activity volcano plot for $CO_2$ reduction. Experimentally, the invention showed that incorporating, e.g., 4-28%, of Al on Cu surfaces increases their Faradaic efficiency (FE) in $C_2H_4$ electroproduction from about 35% (with pure Cu) to over 60% (with Al incorporated Cu).

The invention further developed a scalable physical vapour deposition and chemical etching process to fabricate nanoporous Cu—Al catalysts that electrochemically reduced $CO_2$ to $C_2H_4$ with a record FE of 80% at a current density of 600 mA cm$^{-2}$ (−1.8 to −2.1 V vs. RHE) in 1 M KOH electrolyte in a flow cell system. An average $C_2H_4$ FE of 75%±4% was obtained over 17 de-alloyed distinct Cu—Al samples under the same current density of 600 mA cm$^{-2}$.

In situ X-ray absorption revealed how Cu and Al enable a favourable Cu coordination environment that enhances C—C dimerization. The findings suggest new avenues by which multi-metallic systems can be devised that go beyond the limitations of conventional single-metal electrocatalysts.

It will be appreciated from the overall description and the experimentation section in particular that the catalyst materials, as well as the associated methods described herein, can have a number of optional features, variations, and applications.

EXAMPLES & EXPERIMENTATION

The present invention enabled accelerated discovery of Cu—Al motifs for highly active $CO_2$ electroreduction to ethylene.

While copper has been the predominant electrocatalyst for the production of multi-carbon products, analyses using Density Functional Theory (DFT) screened potential catalytic materials and suggested that copper-rich Cu—Al alloys provide multiple sites and surface orientations that exhibit optimal CO adsorption energies near the top of the activity volcano plot for $CO_2$ reduction. Experimentally, the invention shows that incorporating 4-28% of Al on Cu surfaces increases their Faradaic efficiency in $C_2H_4$ electroproduction. The invention further developed a simple and scalable physical vapour deposition and chemical etching process to fabricate nanoporous Cu—Al catalysts that electrochemically reduced $CO_2$ to $C_2H_4$ with a record Faradaic efficiency of 80% at a current density of 600 mA cm$^{-2}$ (−1.8 to −2.1 V vs. RHE) in 1 M KOH electrolyte in a flow cell system. In situ X-ray absorption reveals how Cu and Al enable a favourable Cu coordination environment that enhances C—C dimerization. The findings also suggest new avenues by which multi-metallic systems can be devised that go beyond the limitations of conventional single-metal electrocatalysts.

Figure 8:
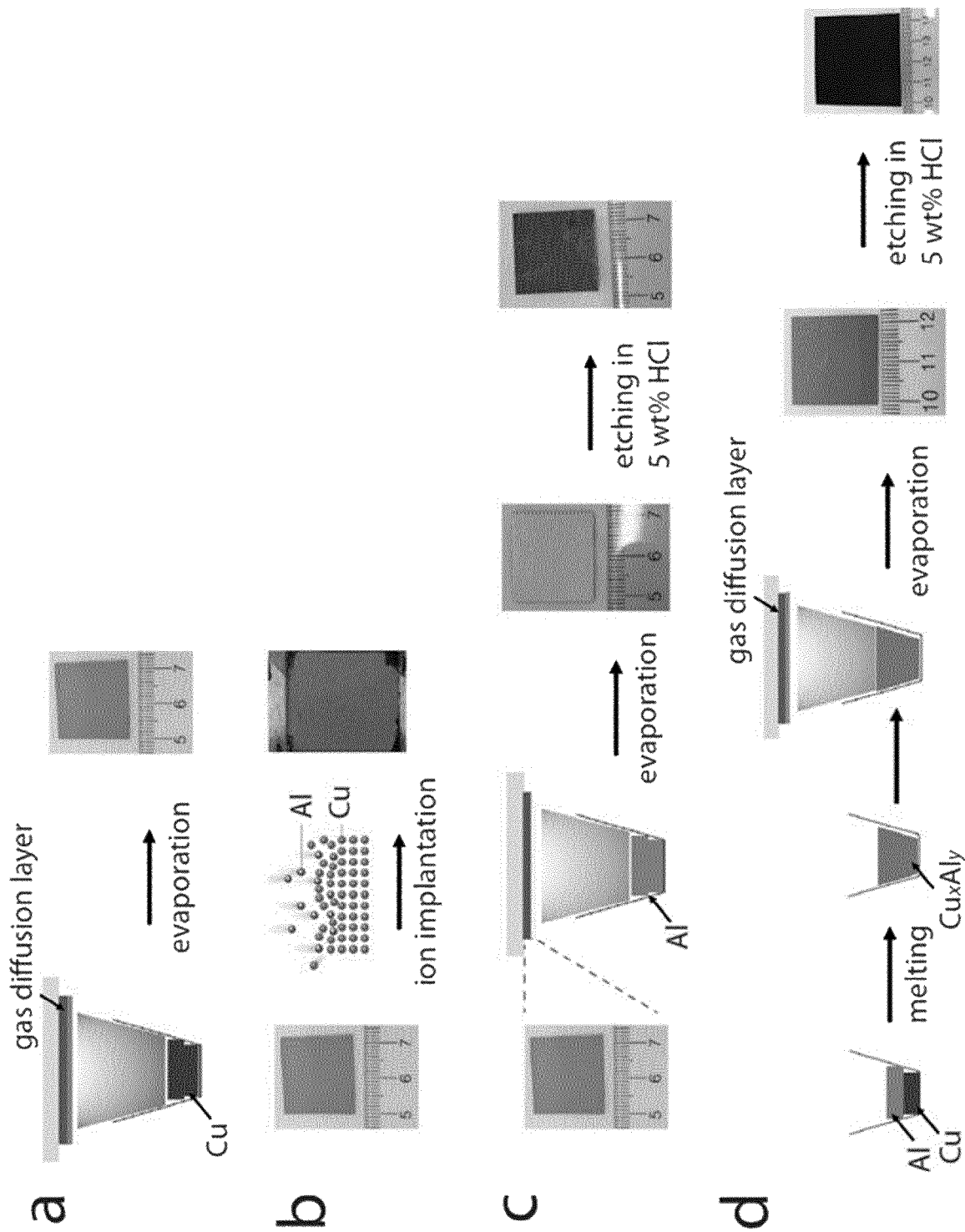
FIG. 8: Schematic for the synthesis of different catalysts on gas diffusion layers. a, evaporated Cu. b, ion-implanted Al-on-Cu. c, evaporated-etched Al-on-Cu. d, de-alloyed Cu—Al catalysts.
Figure 9:
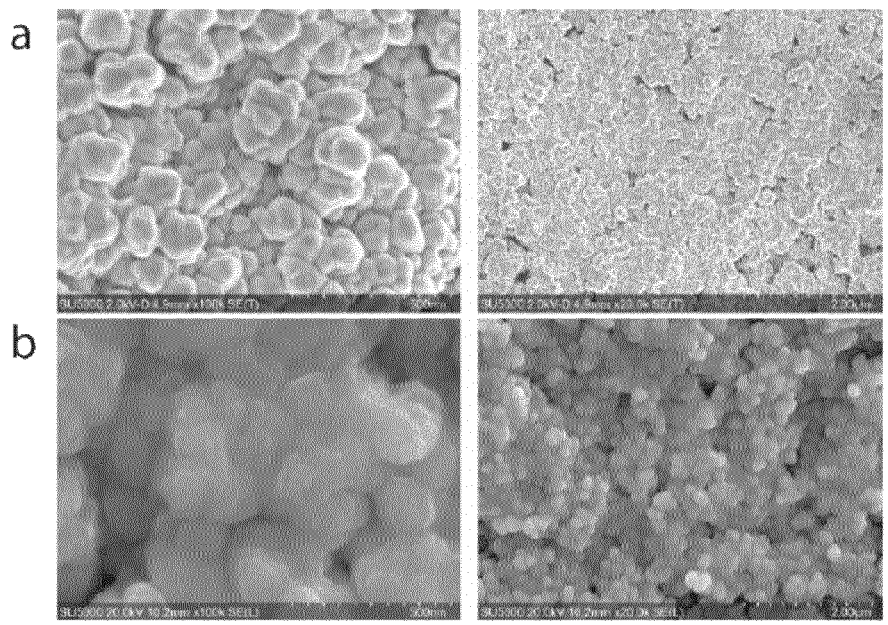
FIG. 9: Morphologies of evaporated Cu catalysts on gas diffusion layers. a, Top-view SEM images before $CO_2$ electroreduction. b, Top-view SEM images after 5 hours $CO_2$ electroreduction in 1 M KOH at an applied current density of 600 mA cm$^{-2}$ in a flow cell.
Figure 10:
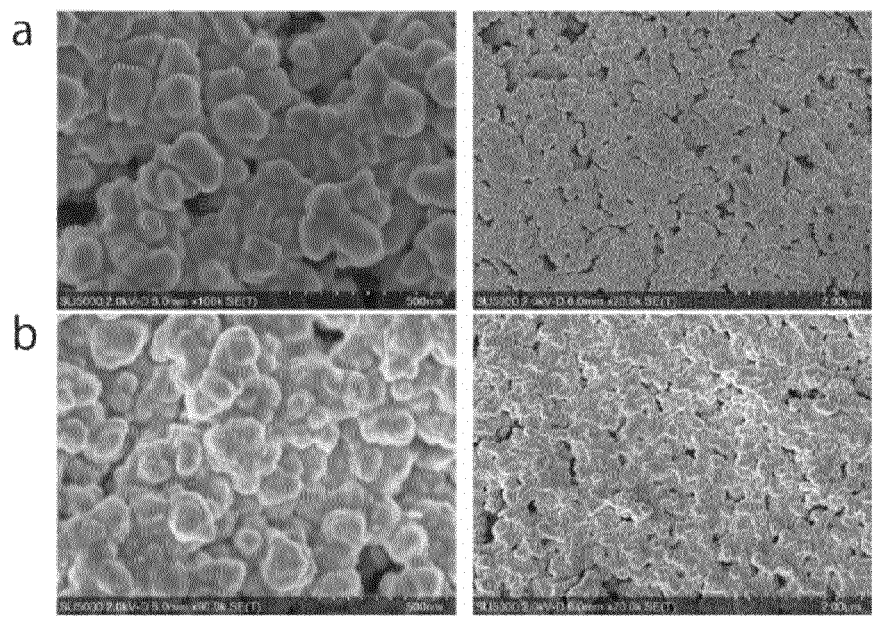
FIG. 10: Morphologies of ion-implanted Al-on-Cu catalysts on gas diffusion layers. a, Top-view SEM images before $CO_2$ electroreduction. b, Top-view SEM images after 5 h $CO_2$ electroreduction in 1 M KOH at an applied current density of 600 mA cm$^{-2}$ in a flow cell.
Figure 11:
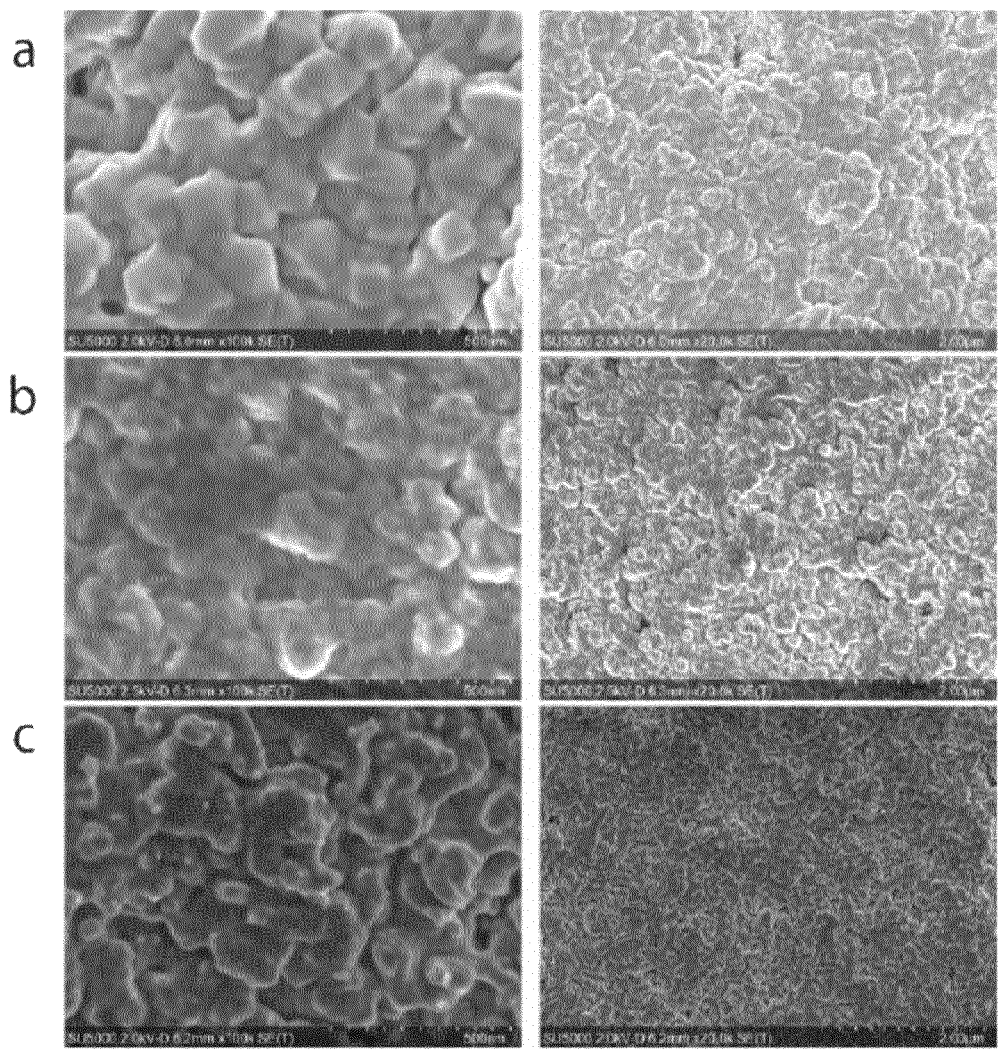
FIG. 11: Morphologies of evaporated and evaporated-etched Al-on-Cu samples on gas diffusion layers. a, Top-view SEM images of the as-evaporated Al-on-Cu samples. b, Top-view SEM images of the evaporated-etched Al-on-Cu catalyst before $CO_2$ electroreduction, c

The invention prepared experimentally a suite of model catalysts to implement these recommended directions: ion-implanted Al-on-Cu and evaporated-etched Al-on-Cu (see Methods section and FIG. 8). Each catalyst shows a morphology similar to that of an evaporated pure Cu catalyst (see FIGS. 9-11).

Figure 12:
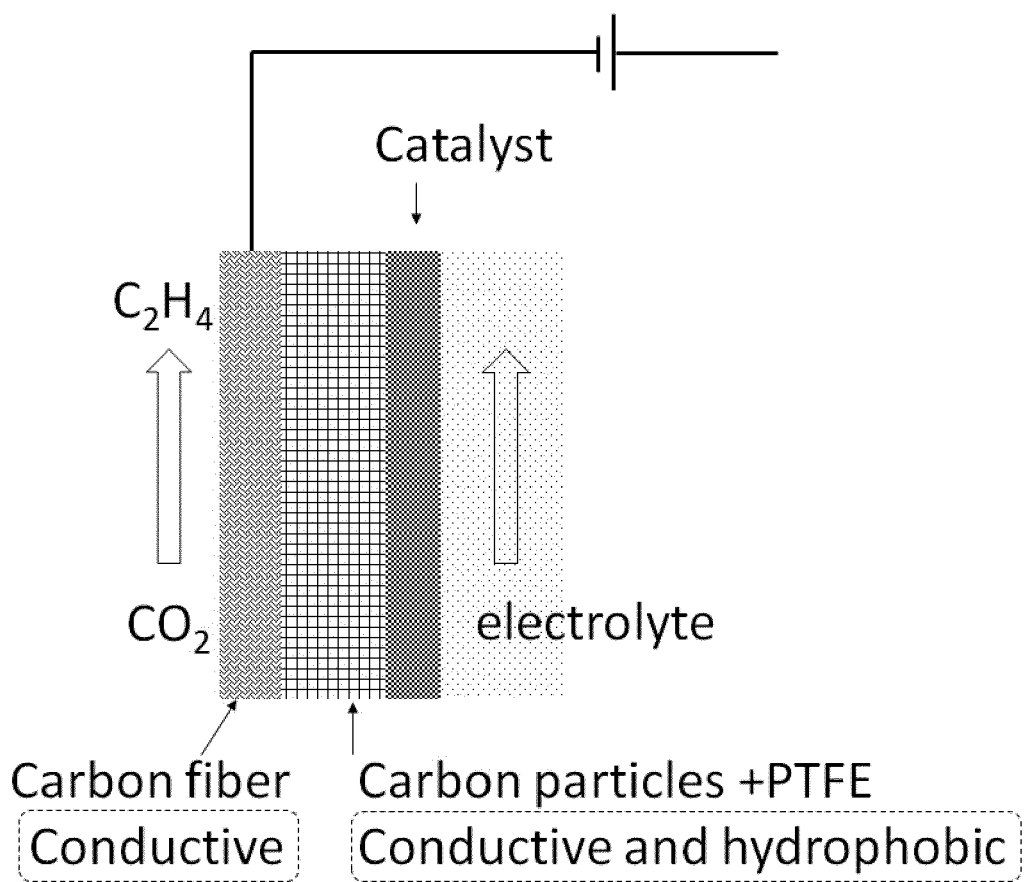
FIG. 12: Schematic of the cathode side in a flow-cell configuration.

Compared with the pure Cu catalyst, which attained a $C_2H_4$ Faradaic efficiency (FE) of 35% at a current density of 600 mA cm$^{-2}$ in a 1 M KOH electrolyte in a flow-cell configuration (see FIG. 12), both ion-implanted and evaporated-etched Al-on-Cu catalysts exhibited higher $C_2H_4$ FEs of ~60% under the same testing conditions. The CO FEs on both Cu—Al catalysts were suppressed to ~10%, one-third of that obtained using pure Cu (see FIG. 13). Incorporating Al on Cu thus increased selectivity toward $C_2H_4$. Tafel slopes of $C_2H_4$ production (see FIG. 13) for pure Cu, ion-implanted, and evaporated-etched Al-on-Cu are 180, 147 and 145 mV dec$^{-1}$, respectively, further highlighting the faster C—C dimerization kinetics with Al-on-Cu catalysts.

To estimate quantitatively the amount of Al incorporated near the Cu surface, the invention used surface-sensitive Auger electron spectroscopic (AES) analysis (see FIGS. 14, 15). AES typically provides compositional information on the top 1-3 nm of the samples and does so over a relatively large area (100 μm$^2$ in the experiments). The invention estimated Al concentrations on surfaces of 4.5% and 25% for the ion-implanted and evaporated-etched Al-on-Cu, respectively.

Figure 16A:
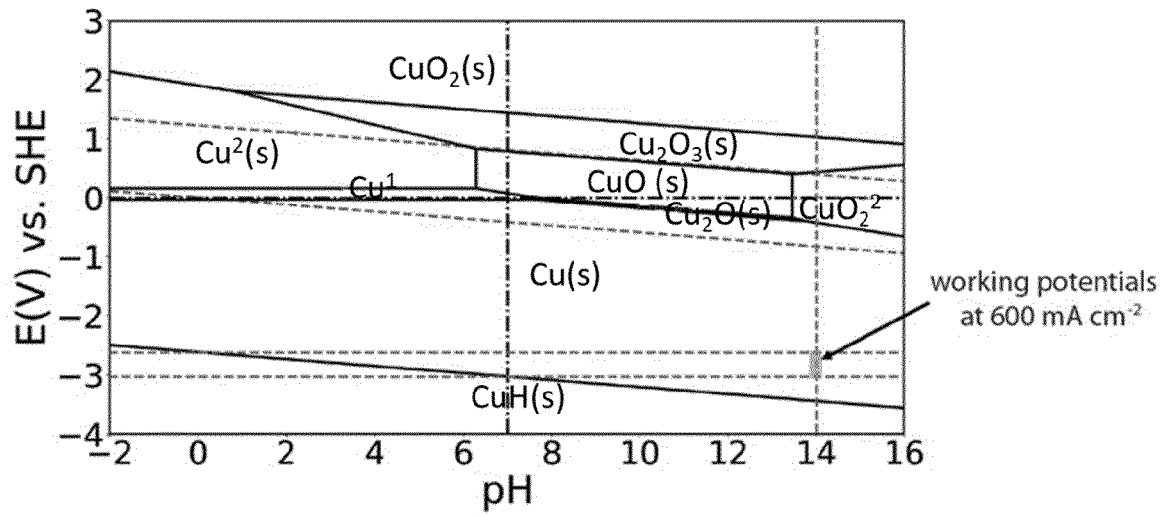
FIG. 16: Pourbaix diagrams. Pourbaix diagrams of a, Cu and b, Al at ionic concentrations of 1 µM. The potentials versus the standard hydrogen electrode (V vs. SHE) can be converted to the reversible hydrogen electrode scale (V vs. RHE) according to the Nernst equation, V vs. RHE=V vs. SHE+0.059×pH.
Figure 16B:
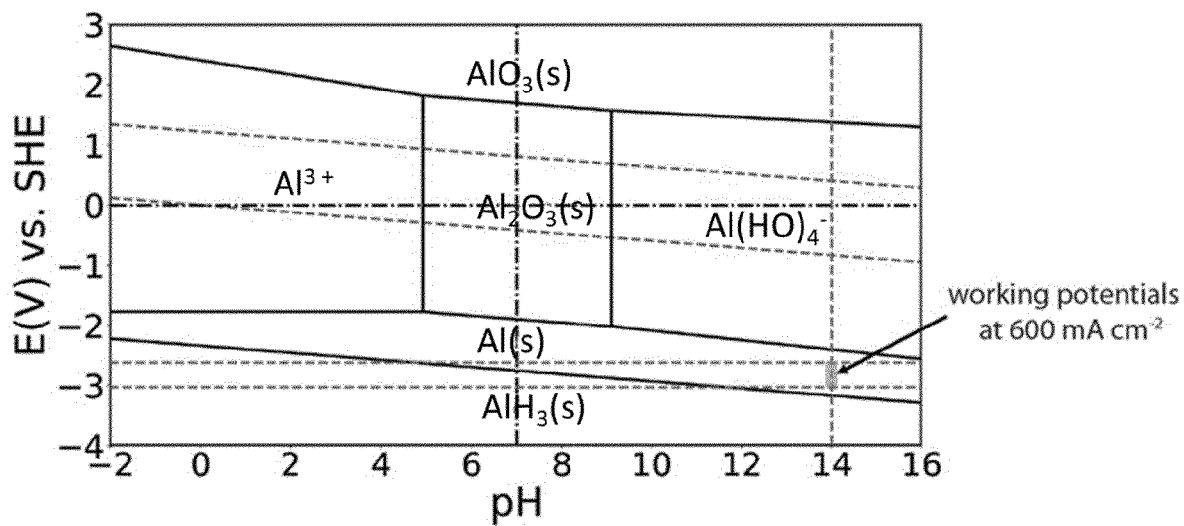
Figure 17A:
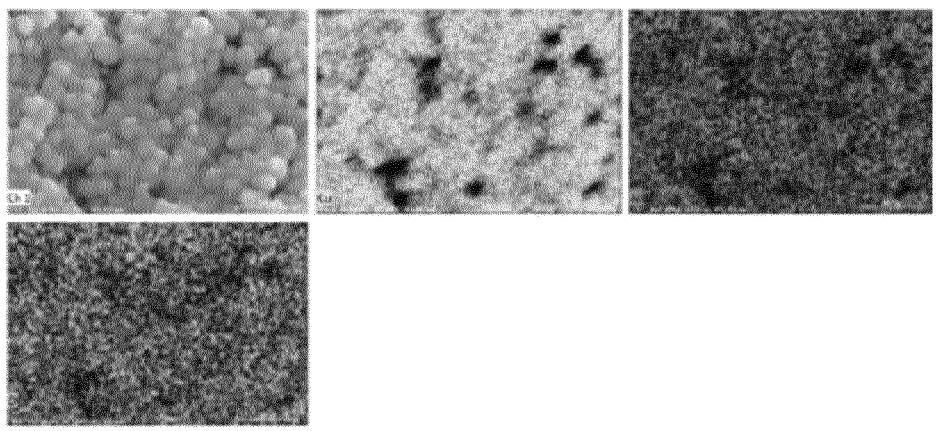
FIG. 17: EDX analysis of an as-prepared ion-implanted Al-on-Cu sample before $CO_2$ electroreduction. a, Elemental concentrations.
Figures 17B, 18A, 18B:
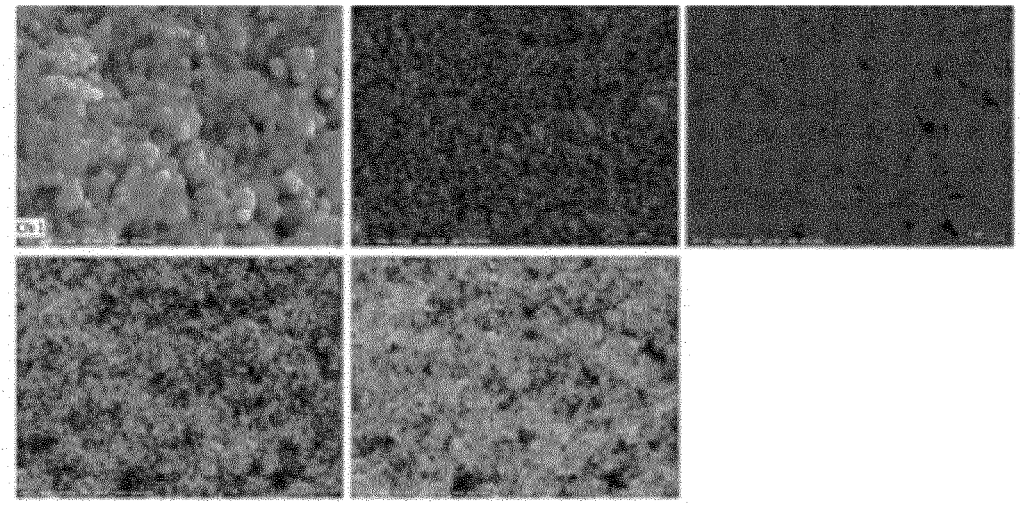
FIG. 18: EDX analysis of an ion-implanted Al-on-Cu sample after 5 hours $CO_2$ electroreduction. a, Elemental concentrations. Potassium is observed on the surface after the reaction.

Pourbaix diagrams (see FIG. 16) show that both Cu and Al are cathodically protected at potentials more negative than their oxidation potentials of −1.4 V vs. RHE in a pH 14 electrolyte. This should enable their stable use as electrocatalysts in alkaline electrolytes.

The invention performed $CO_2$ electrolysis and achieved a remarkably high current density of 600 mA cm$^{-2}$ at a cathodic potential of −1.8 vs. RHE. The $C_2H_4$ FEs of the ion-implanted and evaporated-etched Al-on-Cu catalysts were stable at ~60% over operating periods of 5 hours before the failure of the gas diffusion electrode due to mechanical flooding. SEM and EDX analyses confirmed no major change of morphologies and Al concentrations before and after 5 hours of reaction (see FIGS. 10, 11, 17-20; and FIGS. 21-24).

The invention then sought to develop an optimized and robust catalyst combining Cu and Al.

Figure 2A:
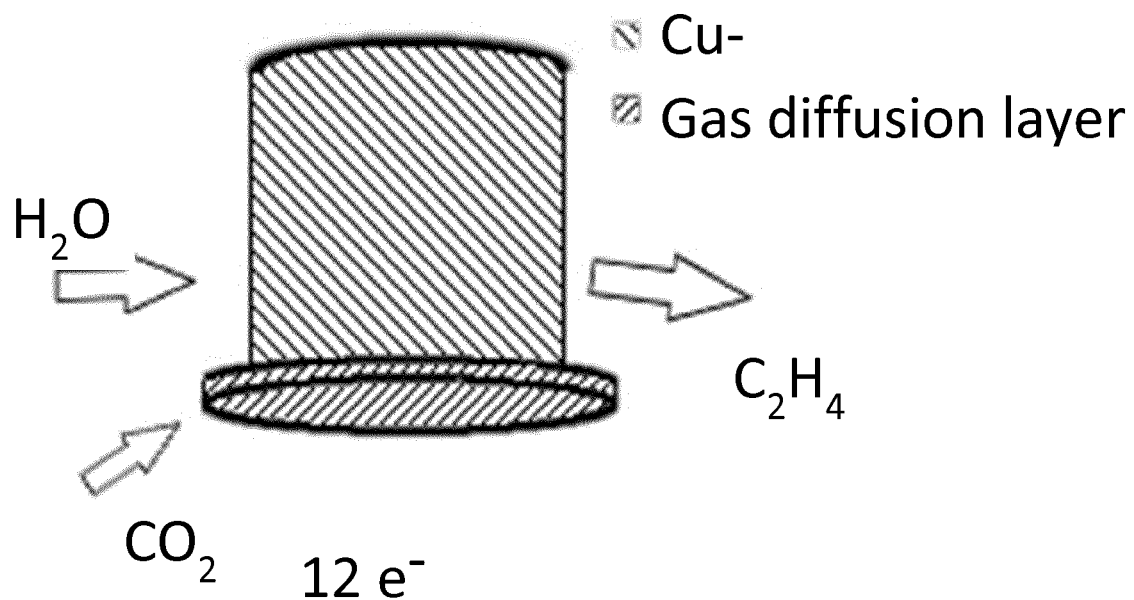
FIG. 2: Schematic and characterization of de-alloyed Cu—Al catalyst. a, Schematic of a de-alloyed nanoporous Cu—Al catalyst on a gas diffusion layer for $CO_2$ electroreduction. b, Scanning electron microscopy (SEM) and high angle angular dark field-scanning transmission electron microscopy (HAADF-STEM) images of de-alloyed Cu—Al catalyst before (left) and after (right) 5 hours $CO_2$ electroreduction at an applied current density of 600 mA cm$^{-2}$ in flow cells. The scale bars for SEM images are 500 nm (top-left) and 200 nm (top-right). The scale bars for TEM images are 200 nm (bottom-left) and 100 nm (bottom-right). c, HAADF-STEM image, and electron energy loss spectroscopy (EELS) spectra of the de-alloyed Cu—Al catalyst. #1, 2, 3 curves in the EELS spectra represent the EELS results measured at #1, 2, 3 areas in the corresponding HAADF-STEM image. Al, $Al_2O_3$, CuO, $Cu_2O$ and Cu EELS results are plotted as references. The scale bar is 5 nm.
Figure 2B:
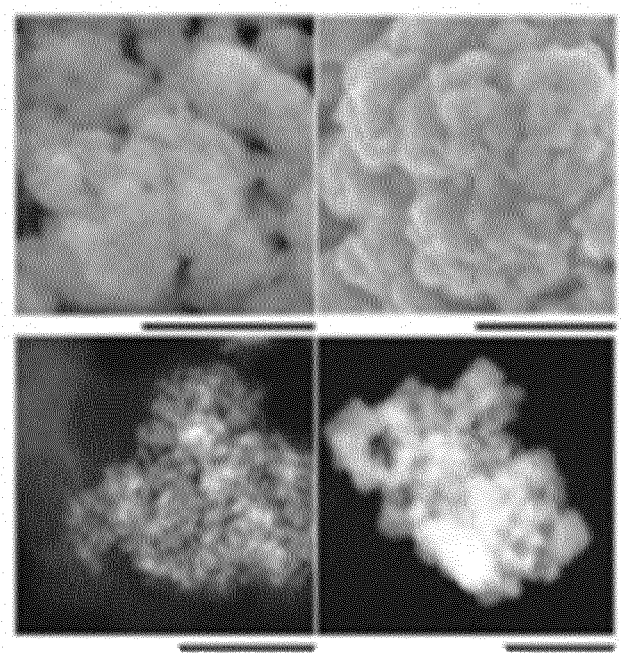
Figure 2C:
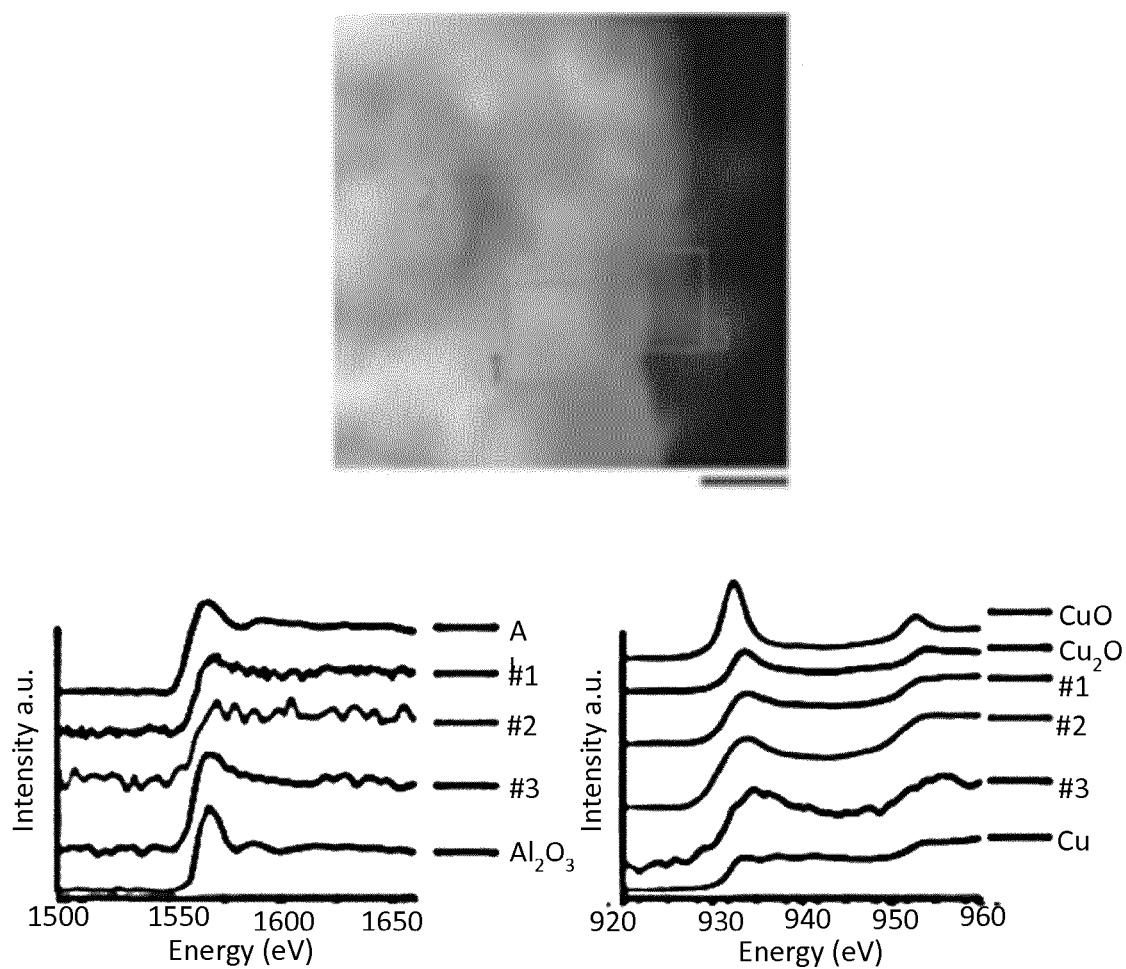
Figure 25:
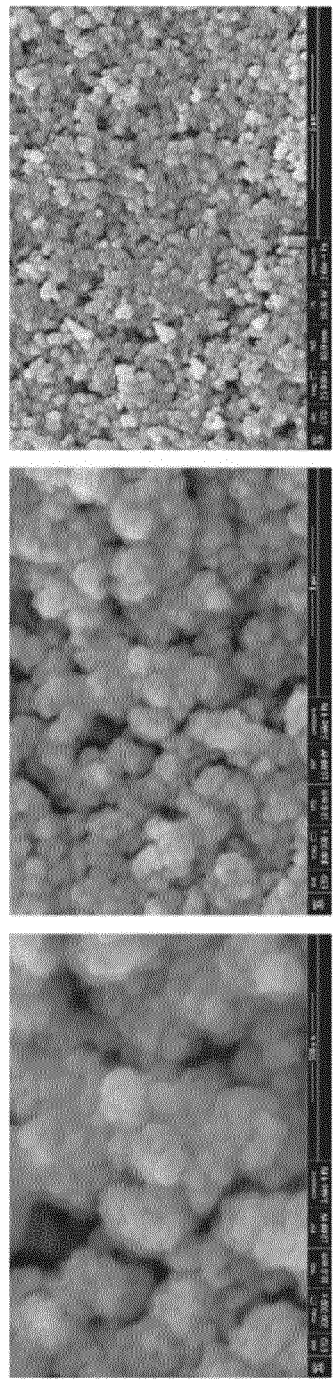
FIG. 25: Top-view SEM images of the de-alloyed Cu—Al catalyst at different magnifications.
Figure 26:
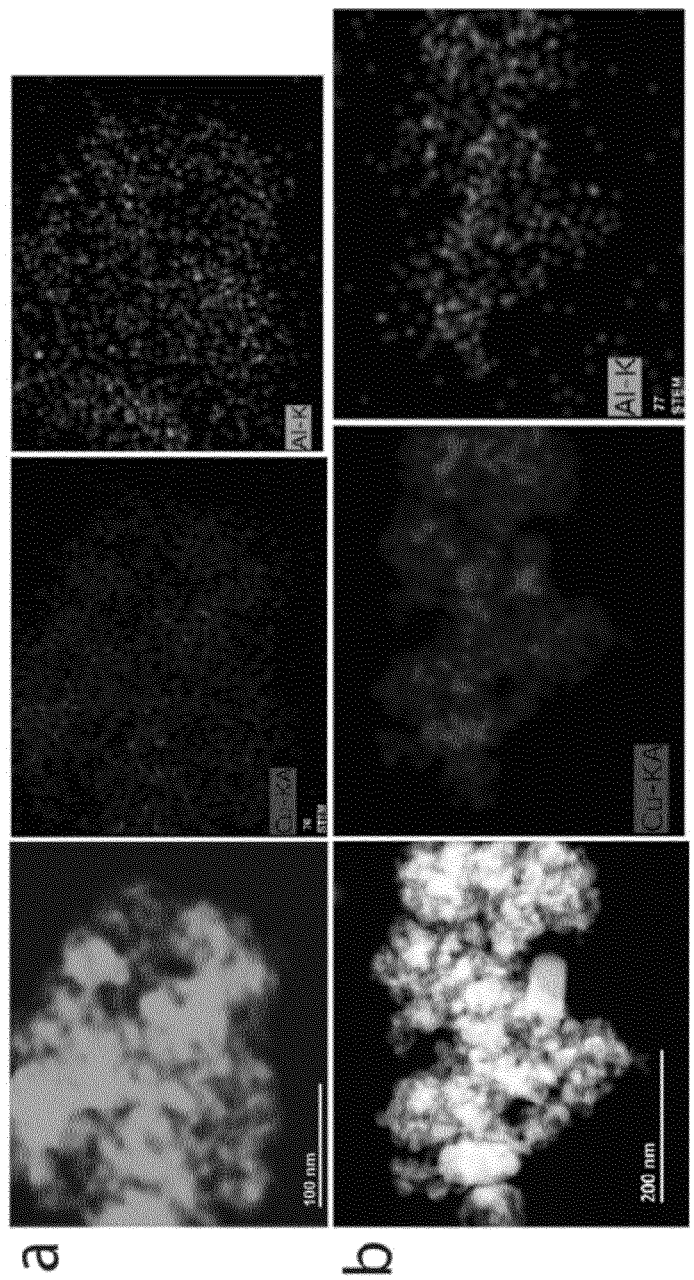
FIG. 26: EDX analyses in TEM of de-alloyed Cu—Al catalysts. a, as-prepared de-alloyed Cu—Al catalyst. b, de-alloyed Cu—Al catalyst after 5 hours $CO_2$ electroreduction in 1 M KOH at 600 mA cm$^{-2}$ in a flow-cell configuration.
Figures 28B, 29:
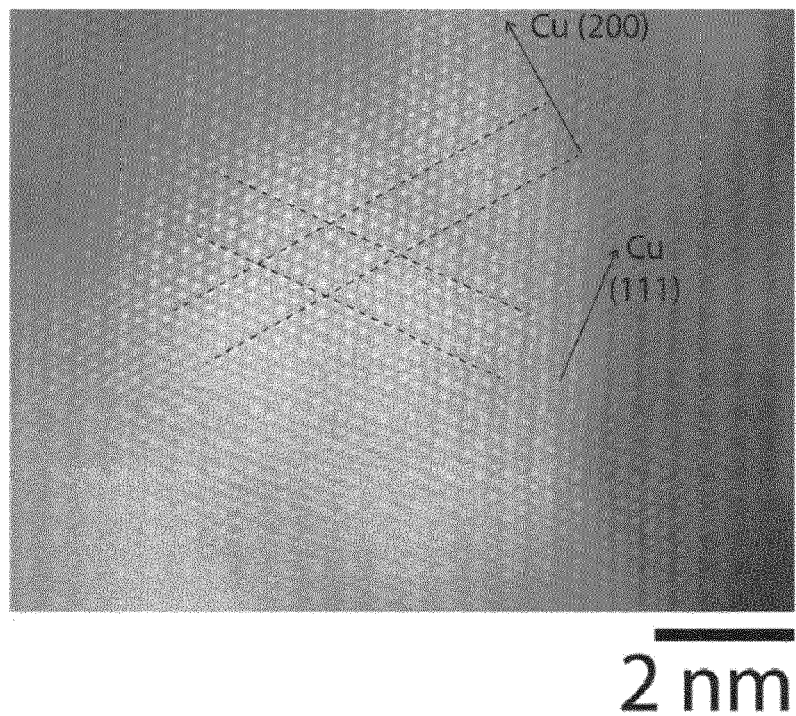
FIG. 29: STEM-ADF image of the de-alloyed Cu—Al catalyst. The observation was performed in the same area where the EELS analysis study was performed

The invention explored vapour phase deposition followed by chemical etching wherein the inventors would synthesize de-alloyed nanoporous Cu—Al catalysts. As shown in the scanning electron spectroscopy (SEM) and high angle angular dark field-scanning transmission electron microscopy (HAADF-STEM) images in FIG. 2b and FIG. 25, a nanoporous structure with pore diameters of 5-20 nm was formed. Compared to ion-implanted and evaporated-etched Al-on-Cu catalysts, the de-alloyed nanoporous Cu—Al catalysts may offer more catalytically active sites for adsorption and electroreduction of $CO_2$. Following 5 hours $CO_2$ electroreduction at a current density of 600 mA cm$^{-2}$, the morphology remained similar indicating a stable catalyst and structure (FIG. 2b). The grain size of the catalyst increased following reaction, potentially due to the surface reconstruction of Cu and Al in the electrolyte during the reaction. Energy-dispersive X-ray spectroscopy (EDX) analyses in TEM and SEM, electron energy loss spectroscopy (EELS) spectra, and elemental mapping in STEM, all confirmed a homogeneous distribution of Al and Cu in de-alloyed catalysts before and following 5 hours reaction (FIG. 2c and FIGS. 26-28). The invention performed HAADF-STEM analysis and found that Cu (111) and (200) facets were observed with interplanar spacings of 0.211 and 0.182 nm (FIG. 29). AES analysis further revealed ~9% Al on the surface following the reaction respectively (FIGS. 30, 31).

Figure 3A:
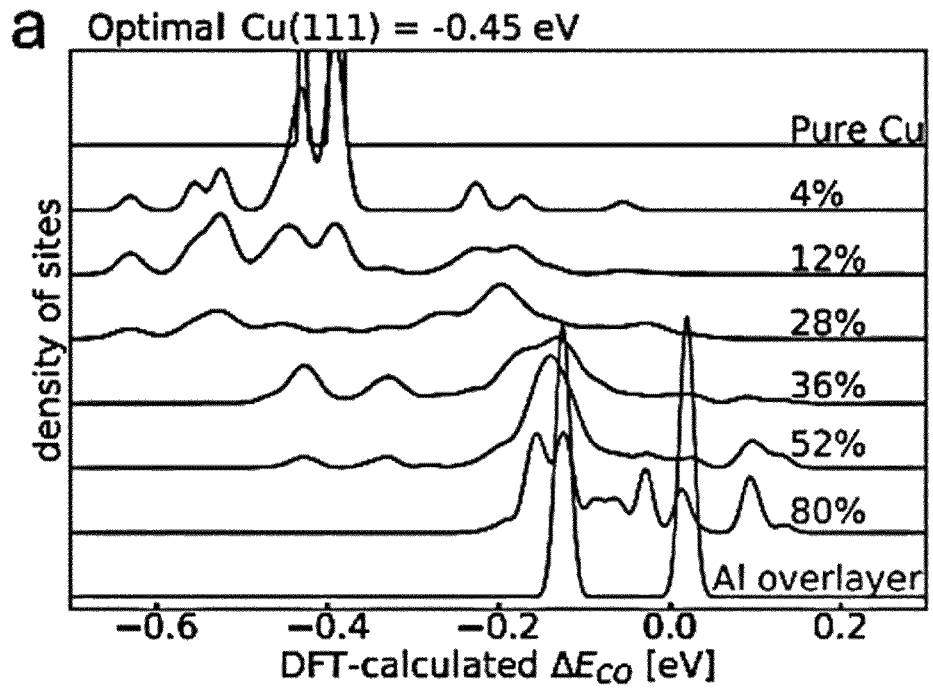
FIG. 3: Analyses of (111) and (100) facets across varying ratios of Al concentrations. a, b, The distribution of $\Delta E_{CO}$ values for the adsorption sites on Cu (111) and (100) surfaces with different amounts of Al replacement on the top layer of atoms.
Figure 3B:
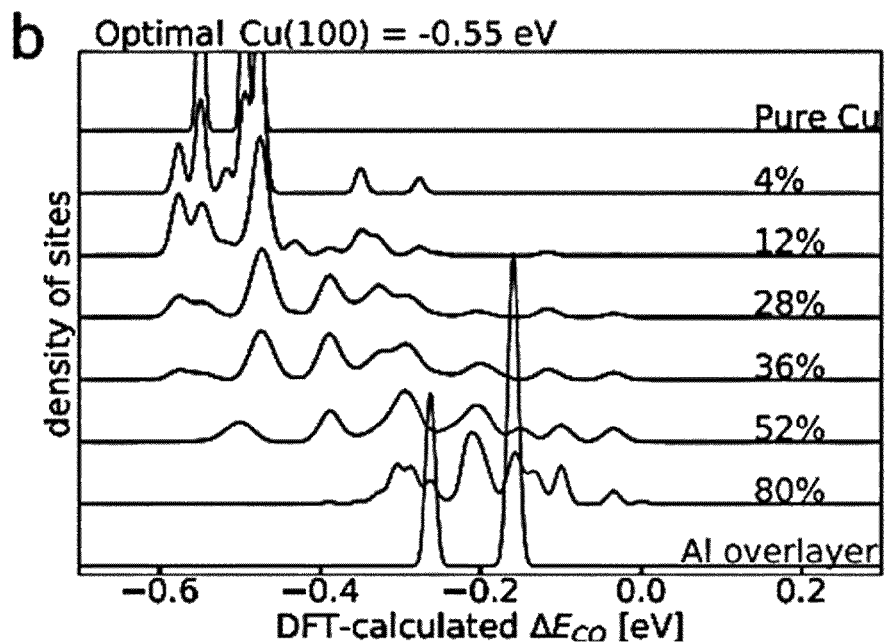

Given the presence of Cu (111) and (100) surfaces, the invention further analyzed how the ratio of Al to Cu on these surfaces affects $\Delta E_{CO}$ (FIG. 1). The resulting distributions (FIGS. 3a and 3b) show that adding ~12% Al to the Cu (111) surface maximizes the density of sites with $\Delta E_{CO}$ values near the optimum of −0.67 eV and that adding 4-12% Al maximizes the density of optimal sites for the Cu (100) surface.

Figure 32:
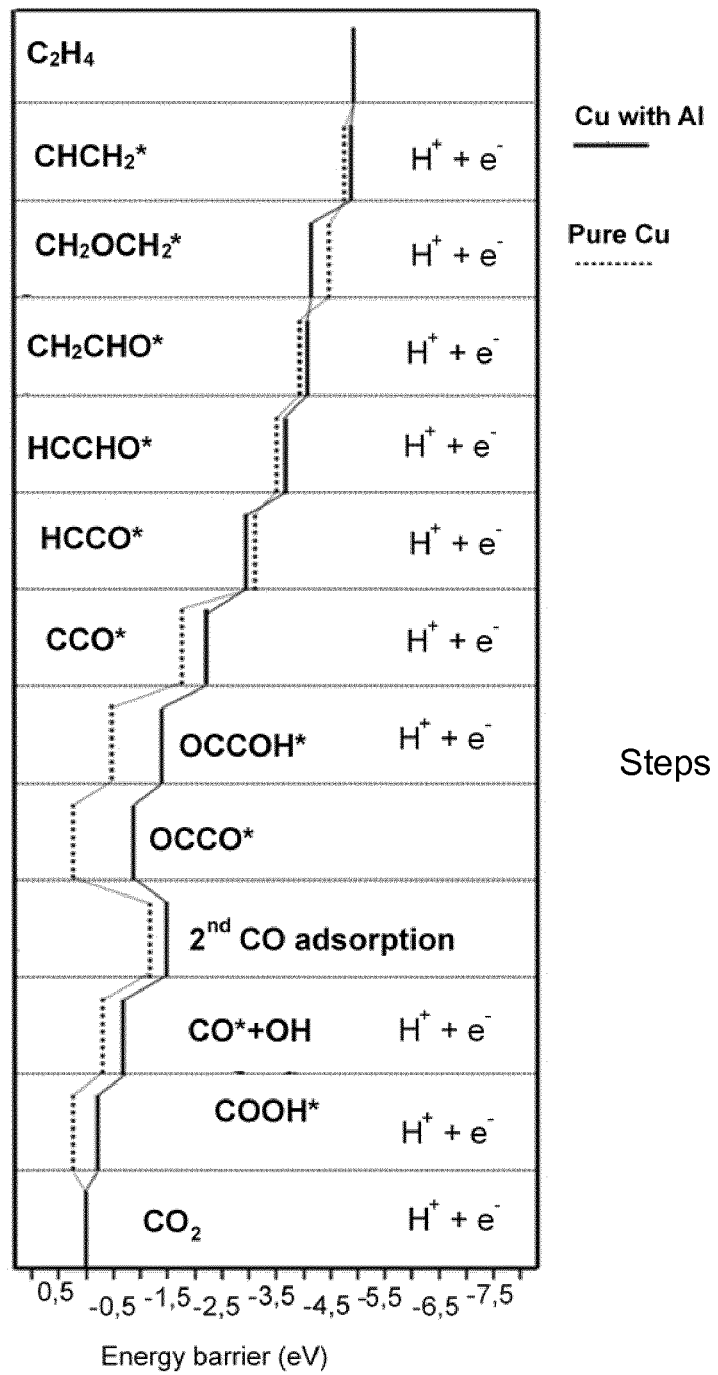
FIG. 32: Reaction Gibbs free energy diagram. Reaction Gibbs free energy diagram from adsorbed $CO_2$ to $OC_2H_4$, an intermediate to $C_2H_4$, and to $CHOCH_3$, an intermediate to $C_2H_5OH$, on the pure Cu (111) surface (blue lines) and ML predicted 12% Al incorporated Cu (111) surface (red lines). The ML predicted structure of 12% Al incorporated Cu (111) is inserted in the lower left.
Figure 33:
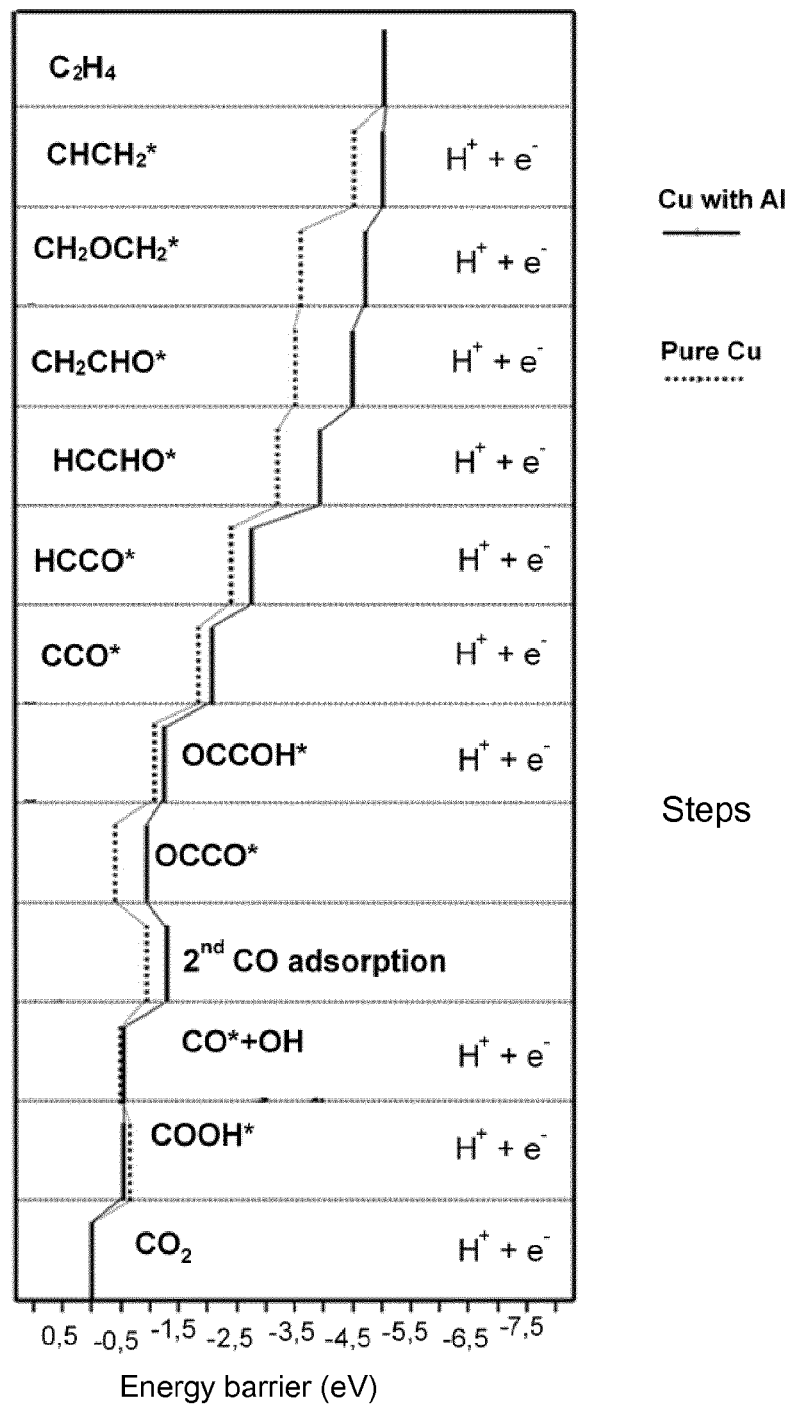
FIG. 33: Reaction Gibbs free energy diagram. Reaction Gibbs free energy diagram from adsorbed $CO_2$ to $OC_2H_4$, an intermediate to $C_2H_4$, and to $CHOCH_3$, an intermediate to $C_2H_5OH$, on the pure Cu (100) surface (blue lines) and ML predicted 4% Al incorporated Cu (100) surface (red lines). The ML predicted structure of 4% Al incorporated Cu (111) is inserted in the lower left.

The invention performed density functional theory (DFT) calculations over the best ML predicted structures to characterize the changes in energy barriers in the major steps during $CO_2$ reduction. The reaction energy in the rate-determining step of C—C bond-making decreased from 1.6 eV to 0.9 eV on Cu (111) and from 0.7 eV to 0.4 eV on Cu (100) with the benefit of Al incorporation (see FIG. 32 to FIG. 33). This is consistent with ML predictions of increased C2+ production with Al-containing Cu.

The DFT results further showed that the reaction energy barrier for forming HO(CH)CH, an intermediate of ethanol, is higher than that for forming CCH, an intermediate of $C_2H_4$ with Al-containing Cu. Water near the Al atoms may act as a proton donor for the electrochemical dehydration reduction of HOCCH to CCH instead of hydrogenation of HOCCH to HO(CH)CH. Thus, oft-produced alcohol is suppressed and the $C_2H_4$ production is promoted.

Figures 34A, 34B:
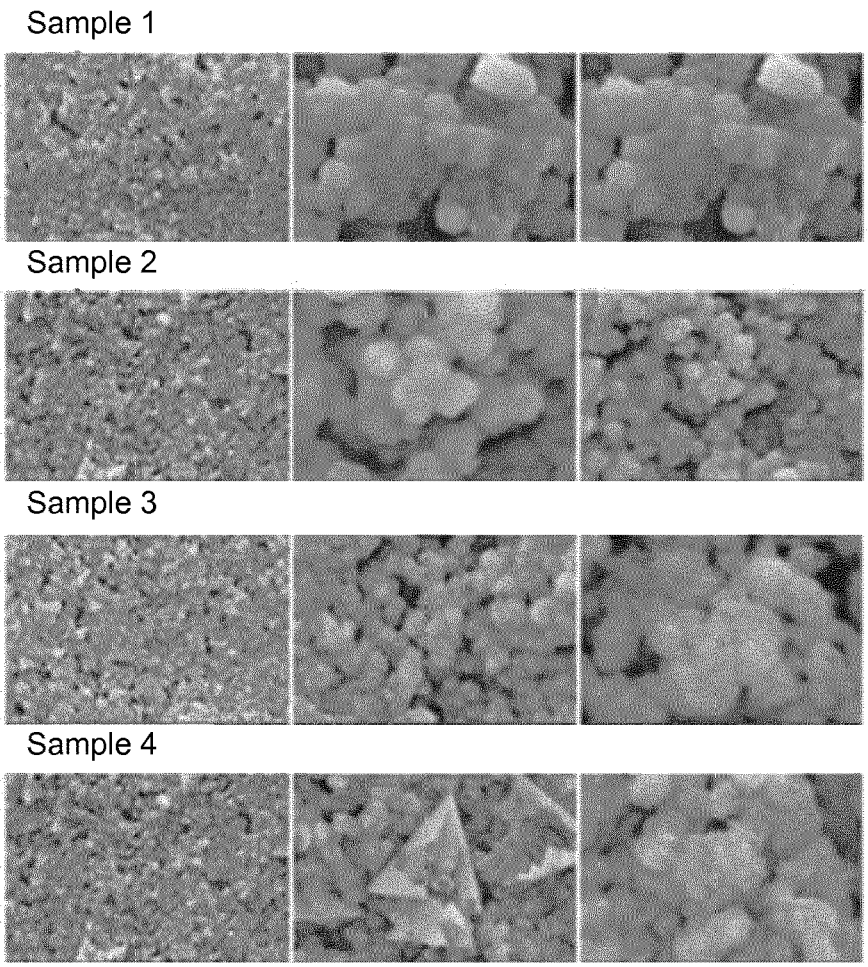
FIG. 34: De-alloyed Cu—Al with different surface Al concentrations. a, SEM images of de-alloyed Cu—Al with different etching time. b, Al concentrations on surfaces determined by surface-sensitive Auger electron spectroscopic analysis. Surface Al concentrations could be roughly varied from 4-28% by controlling the etching time. c, Faradaic efficiencies of C2+ and C2+/C1 ration with de-alloyed catalysts at different surface Al concentrations.
Figure 34C:
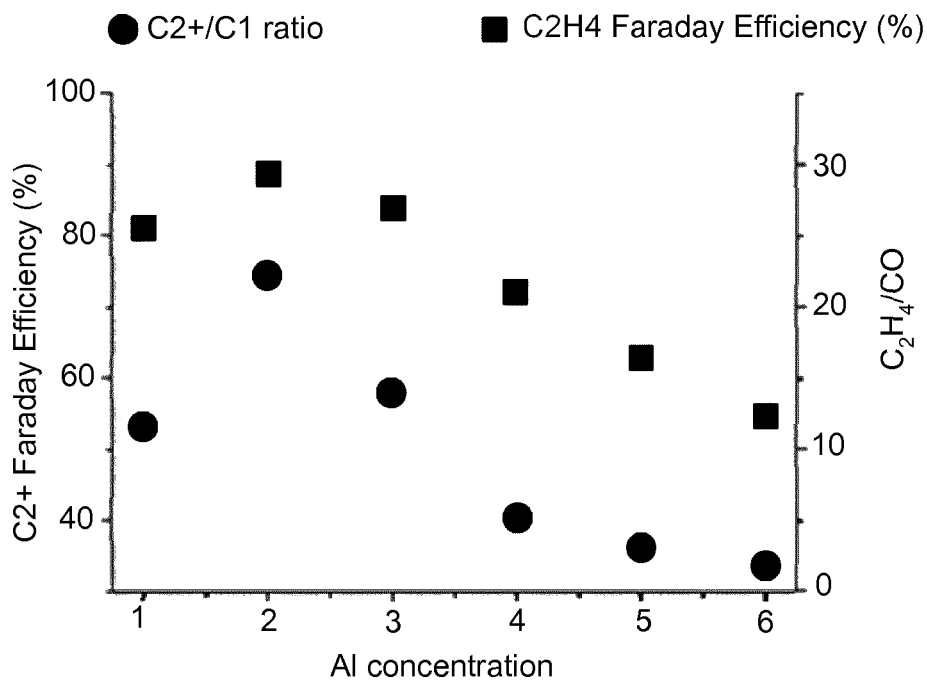

The invention tested the $CO_2$ electroreduction activity of de-alloyed Cu—Al catalysts with different Al concentrations on the surfaces. A high C2+/C1 ratio of ~30 was obtained with ~10% Al on the surface which is in line with the ML and DFT predictions (FIG. 34).

Figure 4A:
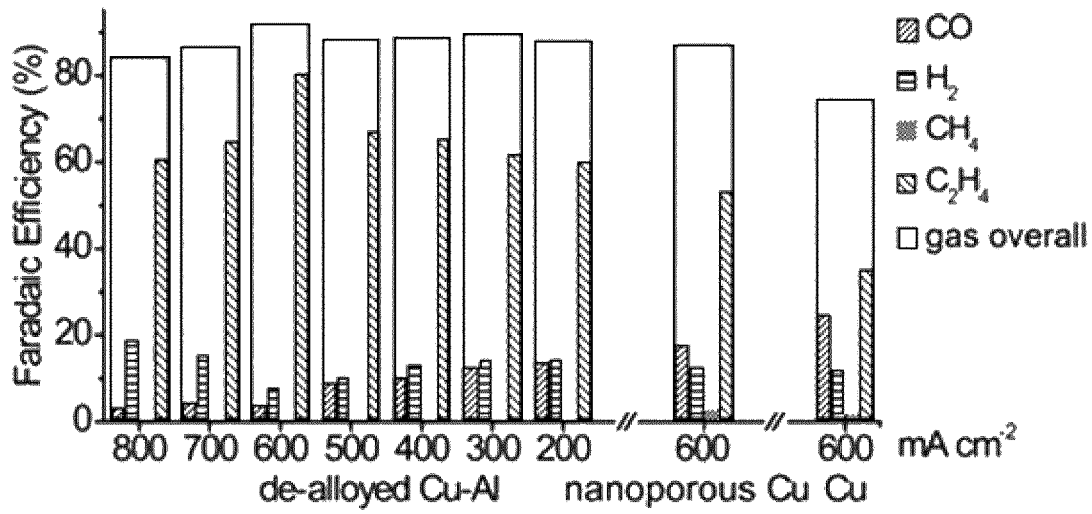
FIG. 4: $CO_2$ electroreduction performance on de-alloyed Cu—Al, porous Cu and deposited Cu catalysts. a, Faradaic efficiencies for gaseous products with de-alloyed Cu—Al catalysts at different applied current densities and with nanoporous Cu and evaporated Cu catalysts at a constant current density of 600 mA cm$^{-2}$ obtained using chronopotentiometry. b, Faradaic efficiencies for all products at an applied current density of 600 mA cm$^{-2}$ with 17 de-alloyed Cu—Al samples measured. c, Current-potential curves with de-alloyed Cu—Al, nanoporous Cu and evaporated Cu catalysts obtained from linear sweep voltammetry scans. d, $C_2H_4$ production partial current density vs. potential with de-alloyed Cu—Al, nanoporous Cu and evaporated Cu catalysts. e, The $CO_2$ electroreduction activity of a de-alloyed Cu—Al catalyst at an applied current density of 600 mA cm$^{-2}$. Left axis: potential (V vs. RHE) vs. time (s), right axis: $C_2H_4$ Faradaic efficiency (%) vs. time (s).
Figure 4B:
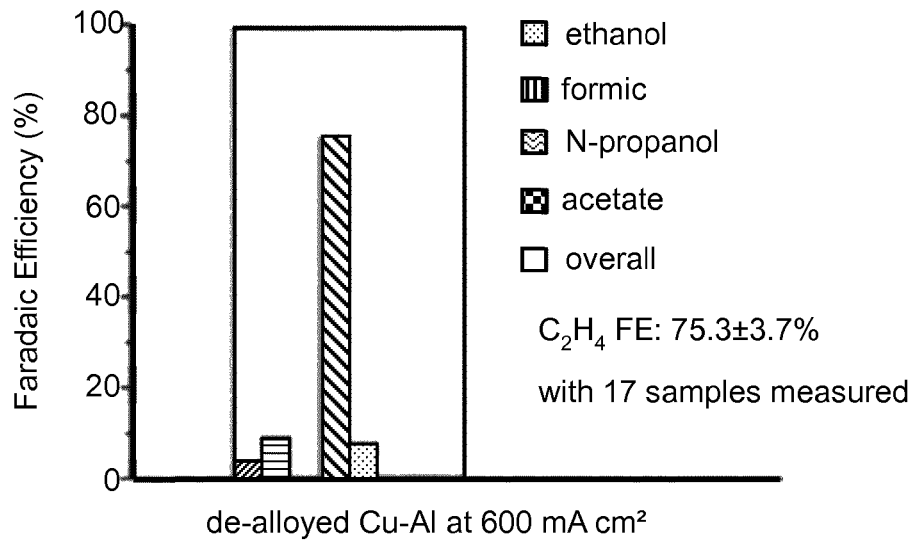
Figure 35:
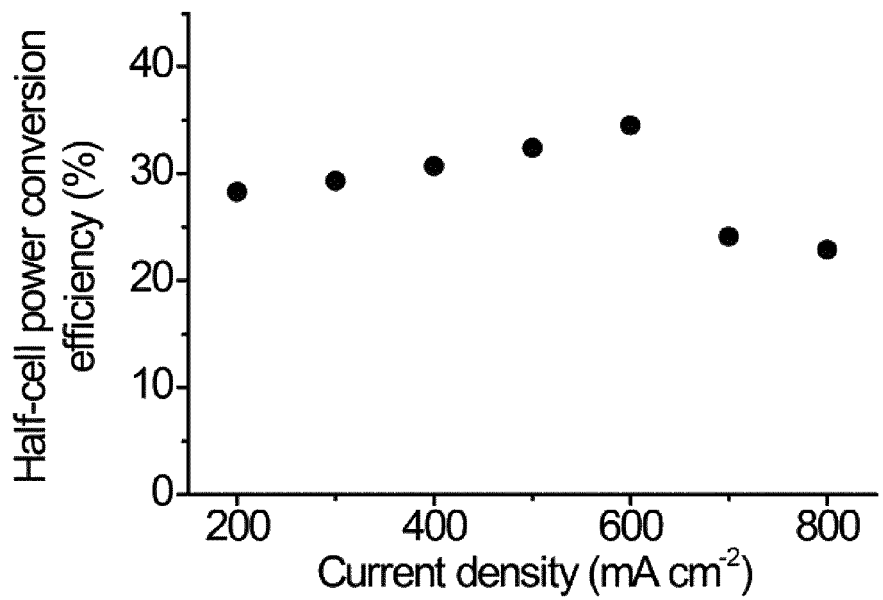
FIG. 35: Half-cell electricity-to-ethylene power conversion efficiencies with de-alloyed Cu—Al catalyst plotted at different current densities. The invention estimates the half-cell power conversion efficiency using the equation.

The invention then evaluated the $CO_2$ electroreduction performance of the de-alloyed Cu—Al catalysts with ~10% Al at the surfaces at current densities from 200 to 800 mA $cm^{-2}$ in 1 M KOH in flow cells (FIGS. 4a and 4b). To quantify FEs for each product, the invention carried out $CO_2$ electroreduction in a chronopotentiometry mode. As shown In FIG. 4a, the invention achieved $C_2H_4$ FE of 80% at a current density of 600 mA $cm^{-2}$. This is a 2-fold increase compared to the 35% FE of pure Cu measured under the same conditions. An electricity-to-ethylene half-cell power conversion efficiency (PCE) of 30% was achieved (FIG. 35), which is similar to the previously published highest half-cell PCE of ~30% using a plasma-activated copper electrocatalyst with a $C_2H_4$ FE of 60% obtained at an applied current density of ~12 mA $cm^{-2}$.

Figure 13A:
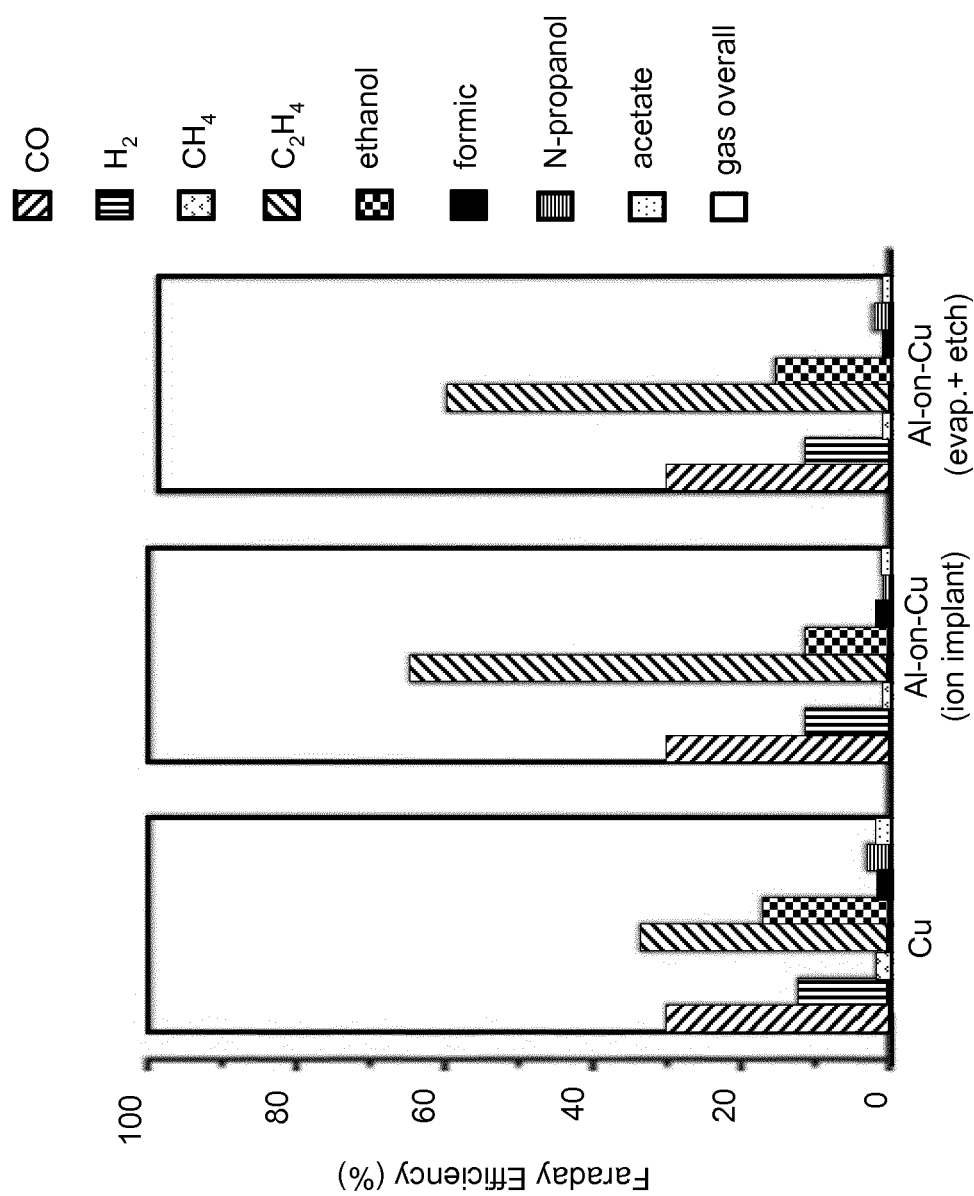
FIG. 13: $CO_2$ electroreduction performances on pure Cu, ion-implanted Al-on-Cu, and evaporated-etched Al-on-Cu catalysts. a, Faradaic efficiencies of gaseous products on pure Cu, ion-implanted, and evaporated-etched Al-on-Cu obtained from chronopotentiometry tests at an applied current density of 600 mA cm$^{-2}$. b, $C_2H_4$ production partial current density versus potential on pure Cu, ion-implanted, and evaporated-etched Al-on-Cu.
Figure 13B:
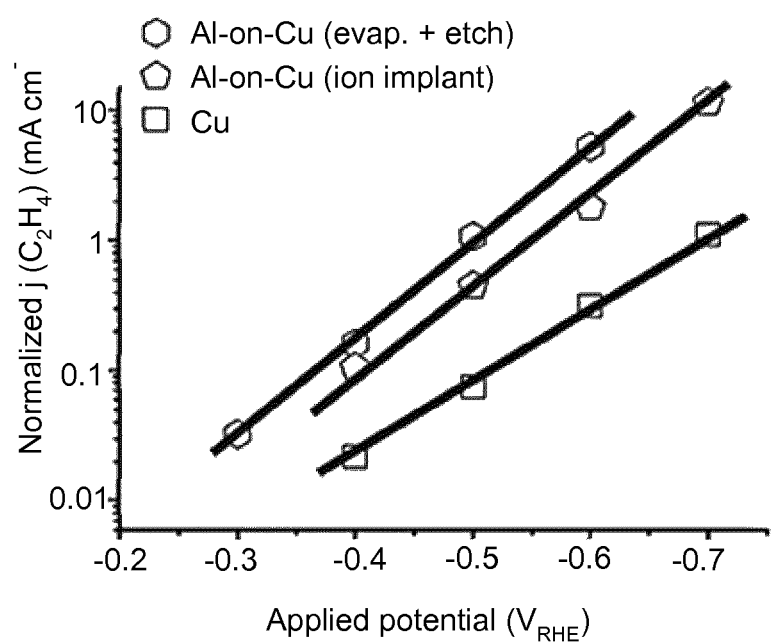

An average $C_2H_4$ FE of 75%±4% was obtained over 17 de-alloyed distinct Cu—Al samples (~10% Al on the surfaces) under the same current density of 600 mA $cm^{-2}$. The overall C2+ product was 85%-90% when the invention used the de-alloyed Al-based catalyst, appreciably higher than that the 55-60% using the flat Cu catalyst (FIG. 4b and FIG. 13).

Figure 4C:
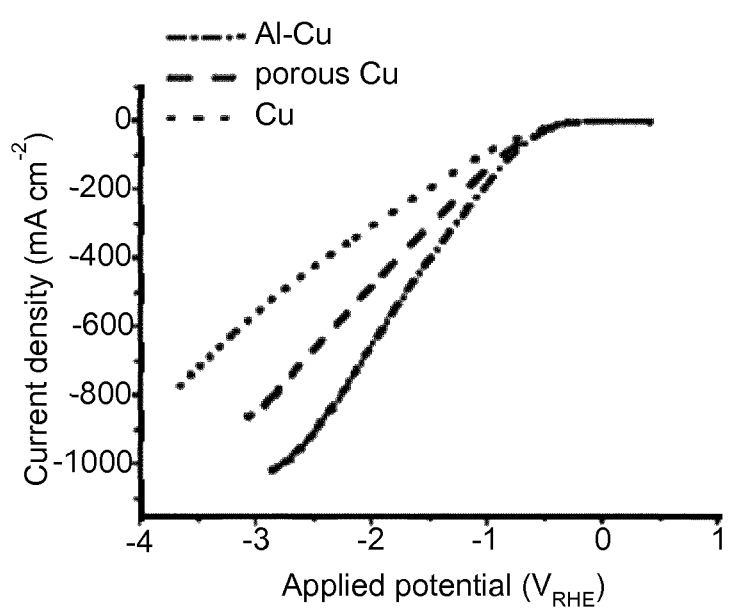
Figure 4D:
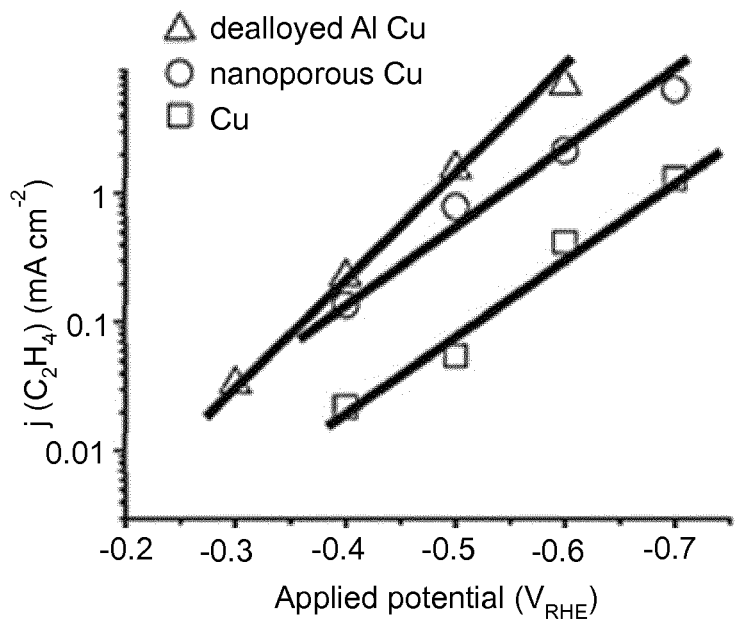
Figure 4E:
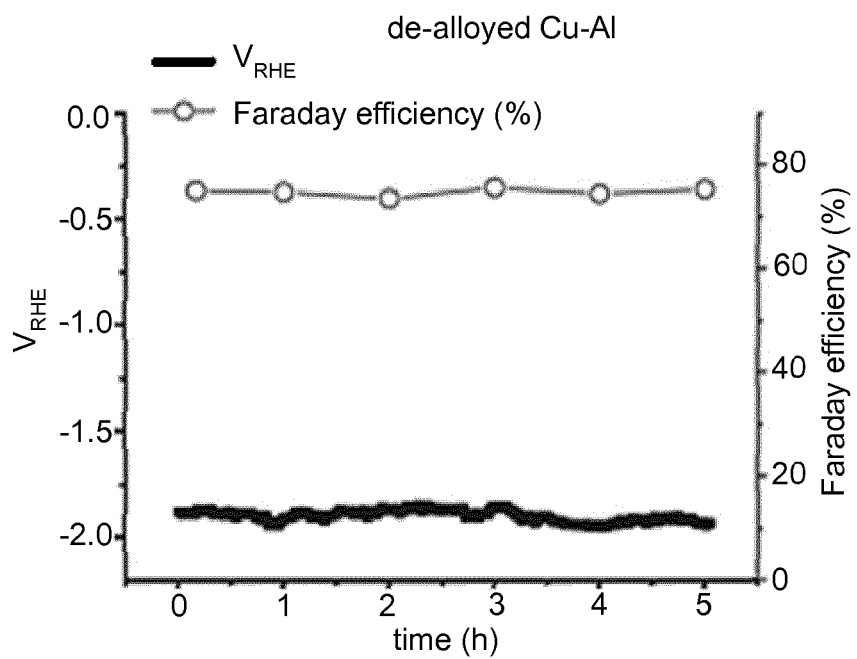
Figure 5A:
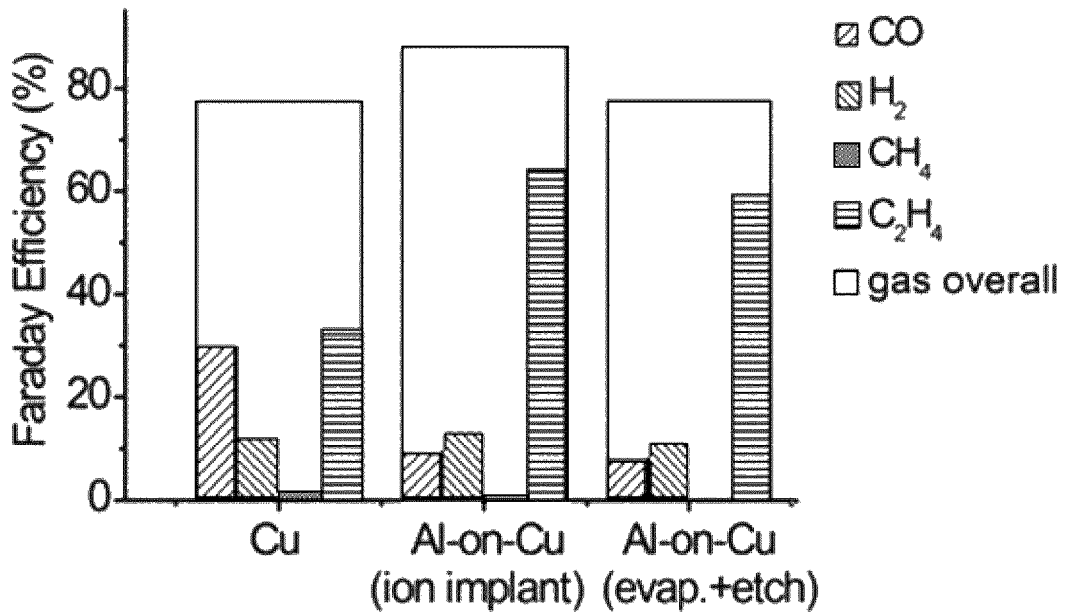
FIG. 5: a, Faradaic efficiencies of $CO_2$ reduction to CO, $H_2$, $CH_4$ and $C_2H_4$ with Cu, Al-on-Cu (ion implant) and Al-on-Cu (evap.+etch); b, $C_2H_4$ partial current density versus potential with Cu, Al-on-Cu (ion implant) and Al-on-Cu (evap.+etch); c, SEM images of Al-on-Cu (ion implant) before and after 5 hours $CO_2$ RR reaction; d, SEM images of Al-on-Cu (evap.+etch) before and after 5 hours $CO_2$ RR reaction.
Figure 5B:
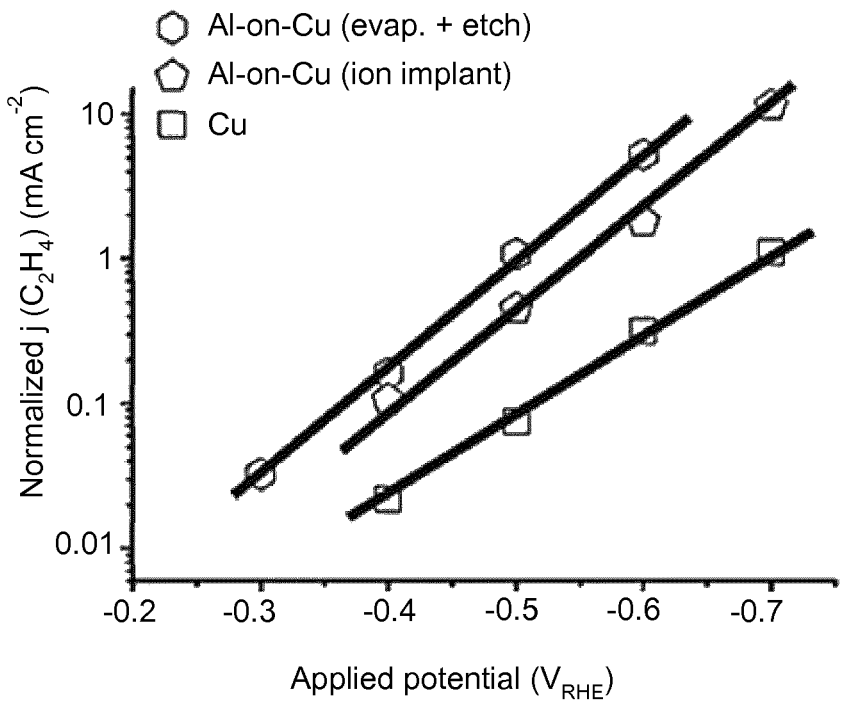
Figure 5C:
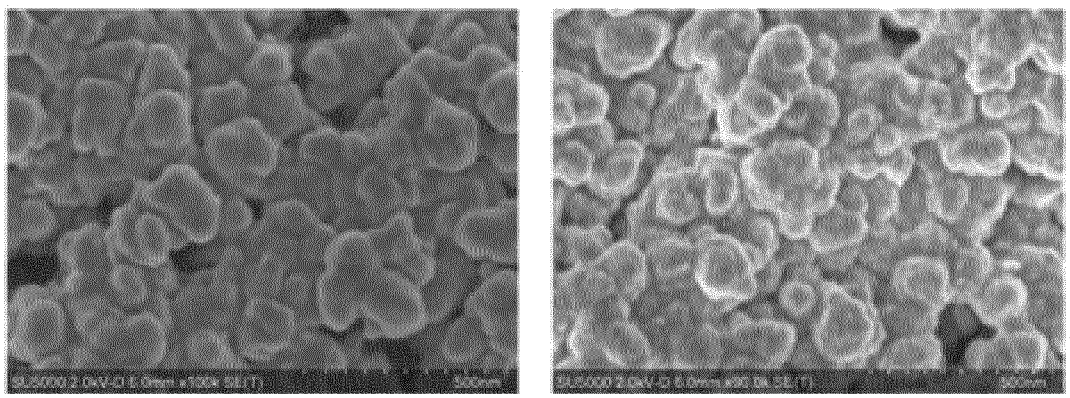
Figure 5D:
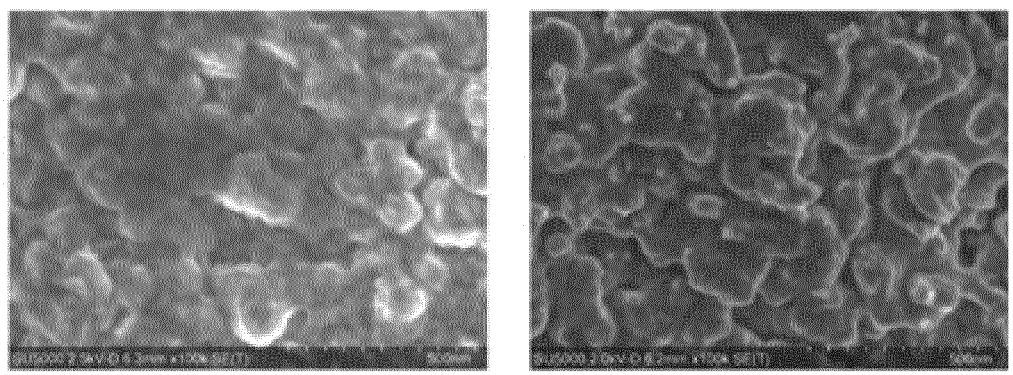
Figure 6A:
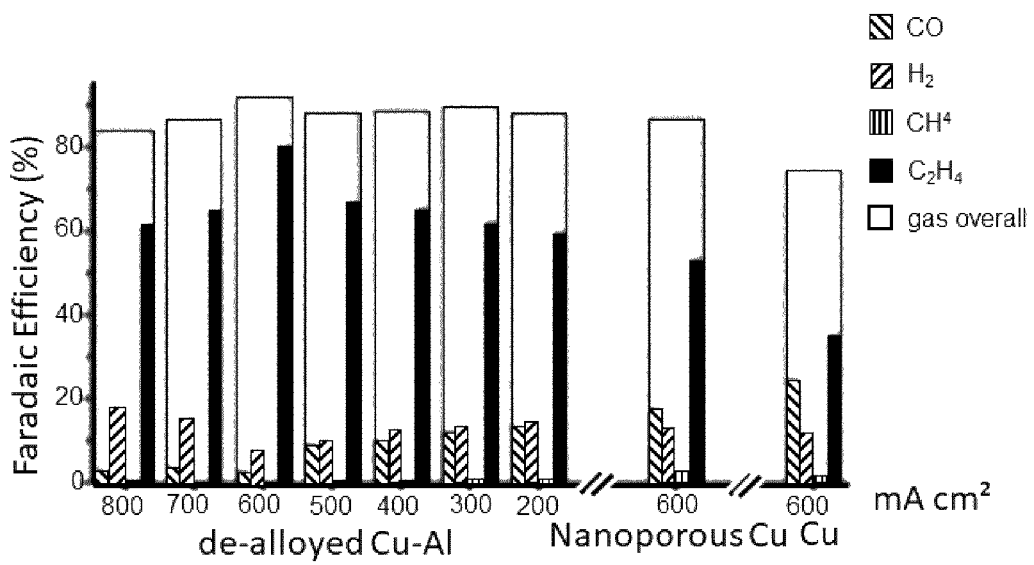
FIG. 6: a, Faradaic efficiencies of $CO_2$ reduction to CO, $H_2$, $CH_4$ and $C_2H_4$ with de-alloyed Cu—Al at different current densities and with porous Cu and Cu at 600 mA cm$^{-2}$; b, Faradaic efficiency of $CO_2$ reduction to CO, $H_2$, $CH_4$, $C_2H_4$, $C_2H_5OH$, formic, n-propanol with de-alloyed Cu—Al; c, $CO_2$ reduction activity of de-alloyed Cu—Al at 600 mA cm$^{-2}$; d, SEM, TEM and EDX images of de-alloyed Cu—Al before and after 5 hours $CO_2$ RR reaction.
Figure 6B:
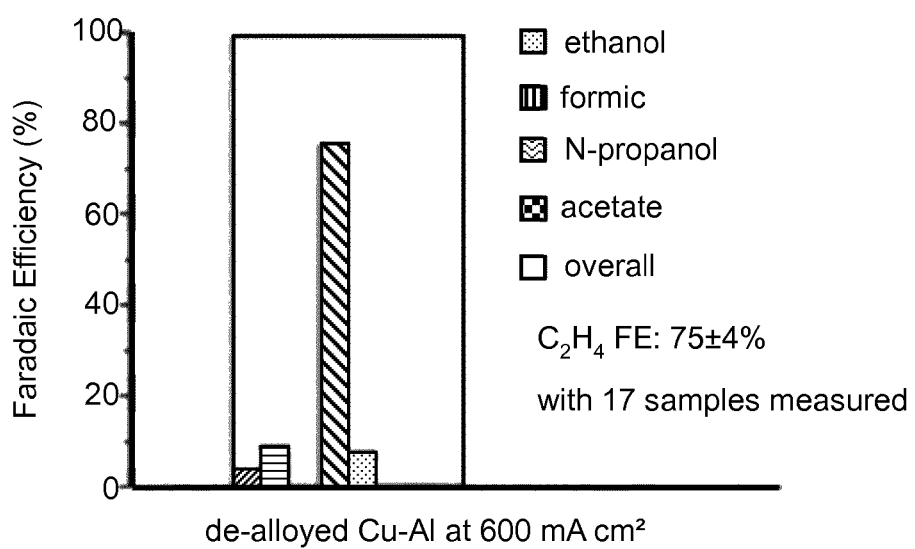
Figure 6C:
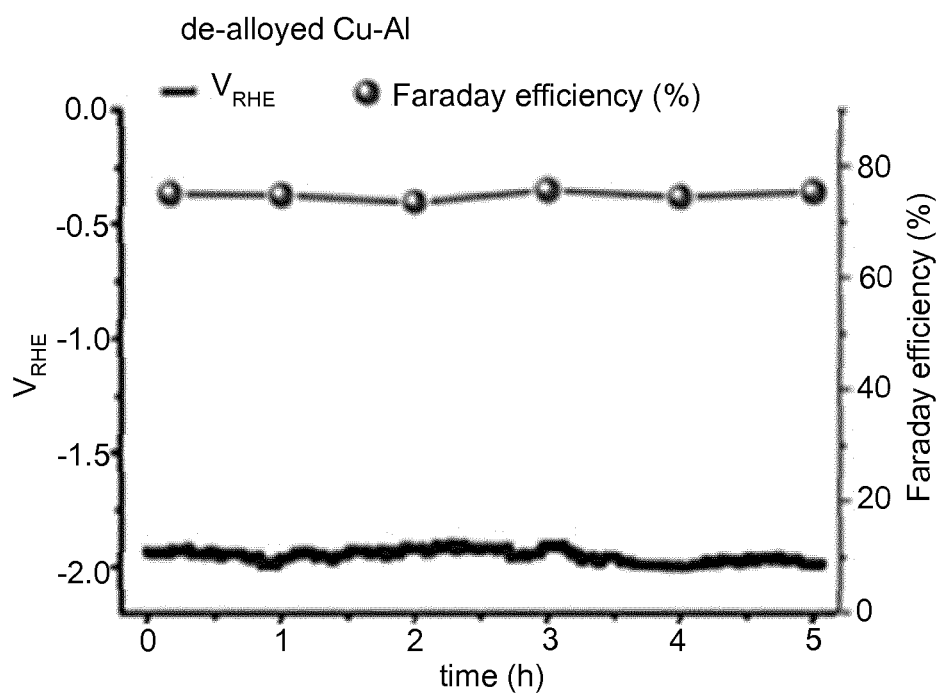
Figure 6D:
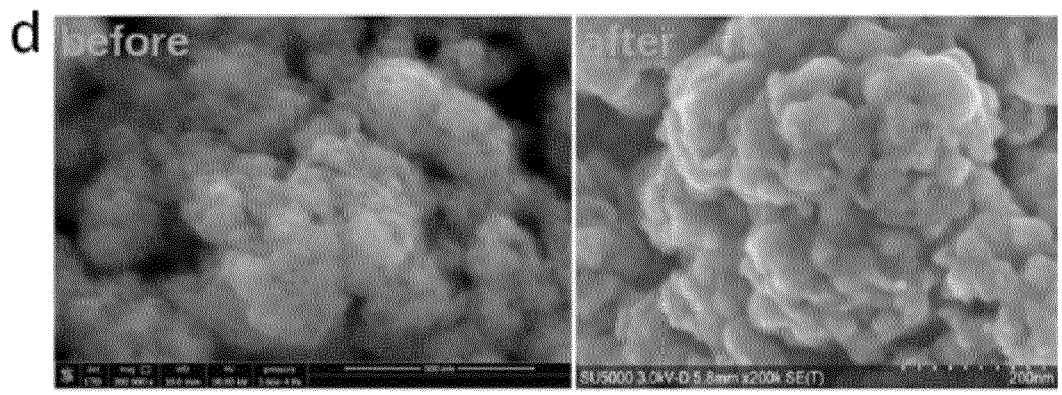

The best Cu—Al catalysts exhibited stable potentials between −1.8 and −2.1 V vs. RHE and a $C_2H_4$ FE of 75% over 5 hours of continuous operation at 600 mA $cm^{-2}$ (FIG. 4e).

To acquire local coordination information during $CO_2$ electroreduction, the invention performed in situ synchrotron X-ray absorption near-edge structure (XANES) analysis under these same testing conditions. Cu—O bonding was observable via both ex-situ and in situ XANES analyses with the de-alloyed Cu—Al catalyst before, during and after the reaction. The intensity of the in situ Cu—O peak is smaller than that of the ex situ ones, indicating Cu—O in the de-alloyed Cu—Al catalyst was partially reduced to Cu during the reaction. In contrast, no obvious Cu—O bonding was observed for the pure Cu during the ex-situ and in situ analyses under the same testing conditions (see FIG. 7). It is proposed that a mixture of Cu—Cu and Cu—O was formed in the de-alloyed Cu—Al catalysts during the reaction. This may contribute to the favourable coordination environment that accelerates C—C dimerization, as predicted via DFT.

The invention designed control catalysts-nanoporous Cu with a very limited amount of Al on the surface and having similar nanoporosity to that of the de-alloyed Cu—Al catalyst-to clarify the role of morphology (FIG. 36). AES analysis revealed that surface Al was decreased from 10% to 2-3% (FIG. 37). Considering the penetration depth of 1-3 nm in the AES, the surface Al concentration on nanoporous Cu should be lower than 2-3%. The $C_2H_4$ FE was decreased to 53% at the same current of 600 mA $cm^{-2}$ (FIG. 4a and FIG. 38). Linear sweep voltammetry (LSV) curves for evaporated Cu, nanoporous Cu and de-alloyed Cu showed no obvious reduction peaks (FIG. 4c), indicating that all catalysts were stable and not reduced to other species at negative potentials. Tafel analysis of evaporated Cu and nanoporous Cu gave slopes of 180 mV $dec^{-1}$ and 175 mV $dec^{-1}$ for $C_2H_4$ production, respectively, which were both larger than that of 120 mV $dec^{-1}$ with the de-alloyed Cu—Al (FIG. 4d). It can be concluded from the invention that incorporating Al on the Cu surface is crucial to promote $C_2H_4$ production.

The invention thus developed a new de-alloyed Cu—Al catalyst for highly selective $CO_2$ electroreduction to $C_2H_4$. The findings suggest avenues to multi-metal catalysts that outperform single-component catalysts by utilizing an intermediate-binding-optimization strategy for multi-carbon production via $CO_2$ electroreduction.

Methods

DFT calculations. The DFT calculations were performed using a VASP package in the Generalized Gradient Framework formulated by Perdew et al., including the PBE flavour of DFT and the projector augmented wave (PAW) method to account for core-valence interactions. The cutoff of kinetic energy for plane wave expansions was set to 400 eV and the reciprocal space was sampled by the F-centred Monkhorst-Pack scheme with a grid of 2 by 2 by 1. The Cu (111) and (100) surface slabs were constructed with three Cu layers using ASE (Atomic Simulation Environment) using the PBE-optimized lattice parameter with a vacuum layer of at least 15 Å.

Zero-point energies (ZPE), enthalpy and entropy contributions to free energies at room temperature (298.15 K) were calculated from vibrational modes of surface species using numerical six-point derivatives in VASP and ASE. Note that very low-frequency modes were obtained in some cases because the explicit water molecules are not properly constrained by the hydrogen bonding network presented in water bulk. Such low-frequency modes can cause unphysically large entropy contributions, so they were reset to a threshold value of 60 $cm^{-1}$ and excluded frequencies smaller than the threshold, corresponding to the acoustic translational mode of the six-member rings in water bulk.

For the surface reaction (i.e., A*→B*), the change in Gibbs free energy at temperature T and 1 atmospheric pressure is given by:

$$\Delta G_{A^* \to B^*}(T, P^0) = \Delta E_{rxn} + \Delta H^0(T) - T\Delta S^0(T, P^0)$$

where $\Delta E_{rxn}$ is the calculated reaction energy of A*→B*. $\Delta H^0(T)$ and $\Delta S^0$ (T, $P^0$) are the enthalpy and entropy differences between the initial and final states. In addition, $\Delta H^0(T)$ gives the zero-point energy and the temperature dependence of enthalpy change at a standard pressure of 1 atm for adsorption of molecule A (here, it is room temperature of 298.15 K), which is given by:

$$\Delta H^0(T) = H_{trans}^A + H_{rot}^A + H_{vib}^A - H_{vib}^{A*}$$

$$\Delta S^0(T) = S_{trans}^A + S_{rot}^A + S_{vib}^A - S_{vib}^{A*}$$

where $H_{trans}^A$, $H_{rot}^A$, $H_{vib}^A$ and $H_{vib}^{A*}$ is the enthalpy at the temperature T and a standard pressure of 1 atm for the translational, rotational, vibrational modes of the A. $S_{trans}^A$, $S_{rot}^A$, $S_{vib}^A$ and $S_{vib}^{A*}$ are entropy contributions from the 3-D translational, 2-D rotational, vibrational modes.

EXAMPLES

Example 1: Preparation of Evaporated Cu on Gas Diffusion Layers (GDLs)

Cu was evaporated on the GDL (Fuel Cell Store, Sigracet 39 BC) by a thermal evaporation process. GDL is made of an air-brushed polytetrafluoroethylene (PTFE) on carbon nanoparticles layer as a conductive and hydrophobic layer atop a carbon fibre layer as a conductive and supporting layer. 0.5 g Cu foils were placed in a crucible inside the evaporation chamber (Edwards AUTO 360 Thermal Evaporator). A thin Cu layer (~500 nm) was deposited at an evaporation rate of approximately 1-2 nm s$^{-1}$ under a base pressure of 10$^{-6}$ Torr. GDLs were kept rotating at a slow speed of 50 rpm during evaporation.

Example 2: Preparation of Ion-Implanted Al-on-Cu on GDLs

Evaporated Cu on GDL samples were used as substrates and placed in ion implantation chamber (50 keV Aluminum Implantation at Western University). A 99.999% purity aluminium (Al) rod is installed in a copper target in the caesium (Cs) sputter source. A 100 keV Al$_2^-$ molecules are produced in the sputter source injector, selected by the injector magnet and injected into the Tandetron accelerator. Al$_2^-$ is preferred because it has six times the flux of Al$^-$. For ion implants below 100 keV, the Tandetron terminal pump and stripper gas are turned off. The Tandetron is used as a large lens to focus a negative beam to target in the implant chamber. The high energy magnet steers the Al$_2^-$ down the beamline with the implant chamber. As the beam travels down the beamline it passes through NEC Electrostatic Raster/Scanner which sweeps the beam in the X direction at 517 Hz and 64 Hz in the Y direction over an aperture which defines the implant area on the implant stage. The Al$_2^-$ molecule breaks into Al each having an energy of 50 keV after the collisions with the sample. The implant stage has 4 sides. Each side can be rotated to face the beam for implantation. The implant stage in the Implant Chamber is suspended in a Faraday cage to suppress the secondary electrons. The ion charge is collected from the implant stage and fed to an Ortec 439 current integrator. The charge is converted into pulses which are counted by a computer to determine the dose. To avoid substantial ion-beam induced damage and over-heating to the samples, the inventors ion implanted 2 w % Al (a concentration compared to overall Cu) into Cu which corresponded to 6×10$^{15}$ ions cm$^{-2}$. It took 112 minutes to finish this experiment. Auger electron spectroscopic analysis determined that the Al/(Al+Cu) molar concentration on the surface is ~4.5%. The inventors implanted 5 wt % and 10 wt % Al into Cu and it took 180 and 360 minutes, respectively. Surface Al concentrations are determined to be 5% and 5.5%, indicating making more Al on Cu surface is difficult by the ion implantation method. This may be due to the ion-beam-induced damage and heating effect. Al may gradually migrate into the bulk at a large implantation dose.

Example 3: Preparation of Evaporated-Etched Al-on-Cu on GDLs

Evaporated-etched Al-on-Cu was synthesized via a two-step process of evaporation and etching. First, 0.3 g Al foils were placed in a crucible inside the evaporation chamber. A thin Al layer (~100 nm) was deposited on evaporated Cu-on-GDL samples at an evaporation rate of approximately 1-2 nm s$^{-1}$ under a base pressure of 10$^{-6}$ Torr. The evaporated Al-on-Cu sample was then immersed in a 5 wt % hydrochloric acid solution to remove the excessive Al. The solution was kept stirring at a low speed of 250 rpm during the 5 minutes etching. Deionized water was used to wash off remained hydrochloric acid and other residual ions from the sample surface. An airbrush was used to dry the samples.

Example 4: Preparation of De-Alloyed Cu—Al and Nanoporous Cu on GDLs

De-alloyed Cu—Al was synthesized via an evaporation and etching process. First, 0.5 g Cu foils and 0.25 g Al foils were placed in a crucible inside the deposition chamber. They were melted under a base pressure of 10$^{-6}$ Torr for 2 minutes to form greyish Cu—Al alloys. Then, a thin layer of Cu—Al alloy (~500 nm) was deposited on GDLs at an evaporation rate of approximately 1-2 nm s$^{-1}$ under a base pressure of 10$^{-6}$ Torr. After cooling down to room temperature naturally, the evaporated Cu—Al alloy on GDL samples were transferred to a 5 wt % hydrochloric acid solution to fabricate de-alloyed Cu—Al catalyst at a mild stirring speed of 250 rpm. Deionized water was used to wash off remained hydrochloric acid and other residual ions from the sample surface. An airbrush was used to carefully dry the samples.

Nanoporous Cu samples were prepared by immersing de-alloyed Cu—Al catalysts into 10 mM CuCl$_2$ solution for 10 minutes with a mild stirring speed of 50 rpm. Then, the samples were washed with deionized water and dried by an airbrush carefully.

Characterizations. The morphologies of the prepared samples were investigated using scanning electron microscope (SEM) on a Hitachi SU 5000 VPSEM, transmission electron microscope (TEM) on a Hitachi HF-3300 instrument with an acceleration voltage of 200 kV and high-angle annular dark-field scanning transmission electron microscopy (HAADF-STEM) in a Cs-corrected STEM (JEOL, JEM-ARM200F) at an accelerating voltage of 200 kV. Compositions of the prepared samples were studied using Energy-dispersive X-ray spectroscopy (EDX) on a Bruker Quantax EDX in SEM and TEM, respectively, and electron energy loss spectroscopy (EELS) elemental analysis by GIF Quantum 965. Al concentrations on surfaces of the prepared samples were measured using Auger electron spectroscopy (AES) on a 710 Scanning Auger Nanoprobe instrument (Ulvac-PHI, Chigasaki, Japan). The beam settings used for the acquisition are 10 keV and 10 nA. AES analyses were performed at different locations on the surface for each sample to trace the Al concentrations and homogeneity. The inventors found that ion implantation gave rather uniform distributions of Al on the surfaces. In contrast, Al concentrations on those chemical etched samples may vary ±5-10% especially for those samples with high Al concentrations, indicating that the chemical etching condition using HCl solutions might be further optimized.

Ex situ and in situ X-ray absorption spectra at Cu K-edge on catalysts and standard references were collected at the beamline of 1W1B from Beijing synchrotron radiation facility, China. The electron storage ring was operated at 2.5 GeV with an average current of 200 mA. A Si (111) double crystal was used as a monochromator and the data of absorption were collected in fluorescence mode. The energy of the absorption spectra was calibrated by measuring the X-ray absorption near edge spectroscopy (XANES) of a Cu metal foil. The obtained data were processed by established methods with the ATHENA software package. The normalized Extended X-ray absorption fine-structure spectroscopy (EXAFS) was converted from energy to k-space and weighted by $k^3$. These data were then Fourier transformed to R-space.

For in situ measurements, a self-built flow cell consisting of two chambers for $CO_2$ diffusion (chamber I) and holding the reaction liquid (chamber II) was used. The sample is sandwiched between the two chambers with pressed the Teflon spacers (sample size: 1.2×1.2 cm$^2$; thickness: ~500 nm). $CO_2$ gas is introduced into the chamber I with the gas controller and diffuses and passes through the samples and finally reaches the liquid to participate in the reaction. The thickness of the liquid can be controlled from 1000 to 200 μm. After the liquid cell filled with 1.0 M aqueous KOH, 30 mL KOH solution with the same concentration is flowed into the liquid cell at 0.5 mL/min by using an automatic pump syringe. The measurement of the Cu K-edge is started simultaneously with the stop of the flowing.

Example 5: Electrochemical Reduction of $CO_2$

All $CO_2$ electrolysis experiments were performed using a three-electrode set-up in a flow-cell configuration connected to an electrochemical workstation (Autolab PGSTAT302N). An Ag/AgCl (in saturated KCl solution) and a platinum wire were used as reference and counter electrodes, respectively. 1M KOH was used as the electrolyte. To quantify FEs for each product, $CO_2$ electrolysis was performed in a chronopotentiometry mode. For Tafel analysis, $CO_2$ electrolysis was performed in a Chronoamperometry mode. For linear sweep voltammogram (LSV) analyses, the LSV was cycled until it was stable.

The cathodic chamber was separated from the gas chamber by a 1.5 cm×1.5 cm gas diffusion electrode (GDE). GDEs were made of catalysts on GDLs as discussed in detail above. A plastic plate with a 1 cm×1 cm window is placed between the GDE and cathode chamber. The cathodic chamber was separated from the anodic chamber by an anion exchange membrane (Fumasep FAA-3-PK-130). Rubber spacers were placed in between different chambers to avoid mixture of electrolytes or gaseous products.

$CO_2$ gas was delivered into the gas chamber at a rate of 56 standard cubic centimetres per minute (s.c.c.m.) and was routed into a gas chromatograph (Perkin Elmer Clarus 680) to quantify the gaseous products. The liquid products were quantified by NMR (600 MHz Agilent DD2 spectrometer), in which electrolyte was mixed with D2O (deuterated water) and dimethyl sulfoxide (DMSO, Sigma, 99.99%) was used as an internal standard.

Faradaic efficiencies (FEs) for different products can be calculated as follows: FE=F×m×n/Q=F×m×n/(I×t), where F is the Faraday constant, m is the electron numbers needed for one $CO_2$ molecule reduction to the desired product and n is the amount of the desired product (in moles).

Figures 20B, 21A, 21B:
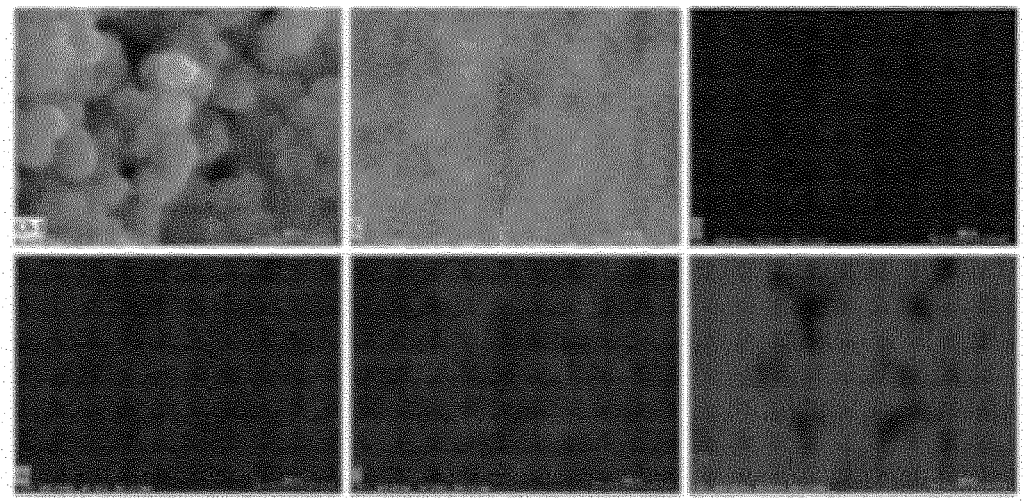
FIG. 20: EDX analysis of an evaporated-etched Al-on-Cu sample after 5 hours $CO_2$ electroreduction. a, EDX mapping. b, Elemental concentrations. Potassium was observed on the surface after the reaction.
FIG. 21: EDX analysis of a pure Cu catalyst after half-hour $CO_2$ electroreduction in 1 M KOH with 1 mM Al(OH)$_4^-$. a, EDX mapping. b, Elemental concentrations. Fluorine was from the PTFE/carbon layer in the gas diffusion electrode. Al was electrodeposited on Cu at an applied current density of 600 mA cm$^{-2}$. Therefore, dissolving Al into solution was avoided.

Example 6: The Stability of Al for $CO_2$ Electroreduction Under Our Testing Condition To further test the electrochemical stability of Al, the invention performed a control experiment of electroreducing $CO_2$ using a pure Cu catalyst in 1 M KOH solution in the presence of 1 mM $Al(OH)_4^-$ anions. Energy-dispersive X-ray spectroscopy (EDX) analysis showed ~4% Al after 30 minutes of $CO_2$ electroreduction at 600 mA cm$^{-2}$ (FIG. 21). AES analysis confirmed over 80% Al on the surface, indicating electrodeposition of Al (FIG. 22). Thus, the reverse reaction of dissolving Al into the solution to form $Al(OH)_4^-$ anions was avoided. However, $C_2H_4$ production activity suffered at the expense of dramatically increased $H_2$ production (FIG. 23), highlighting the importance of realizing a homogeneous distribution of Al on Cu surface. As another control, a pure Cu electrode was immersed in the same solution of 1 M KOH and 1 mM $Al(OH)_4^-$ for half hour without applying electrical bias. Al concentration was below EDX detection limit (FIG. 24).

Example 7: In Situ and Ex Situ X-Ray Absorption Studies

Figure 7:
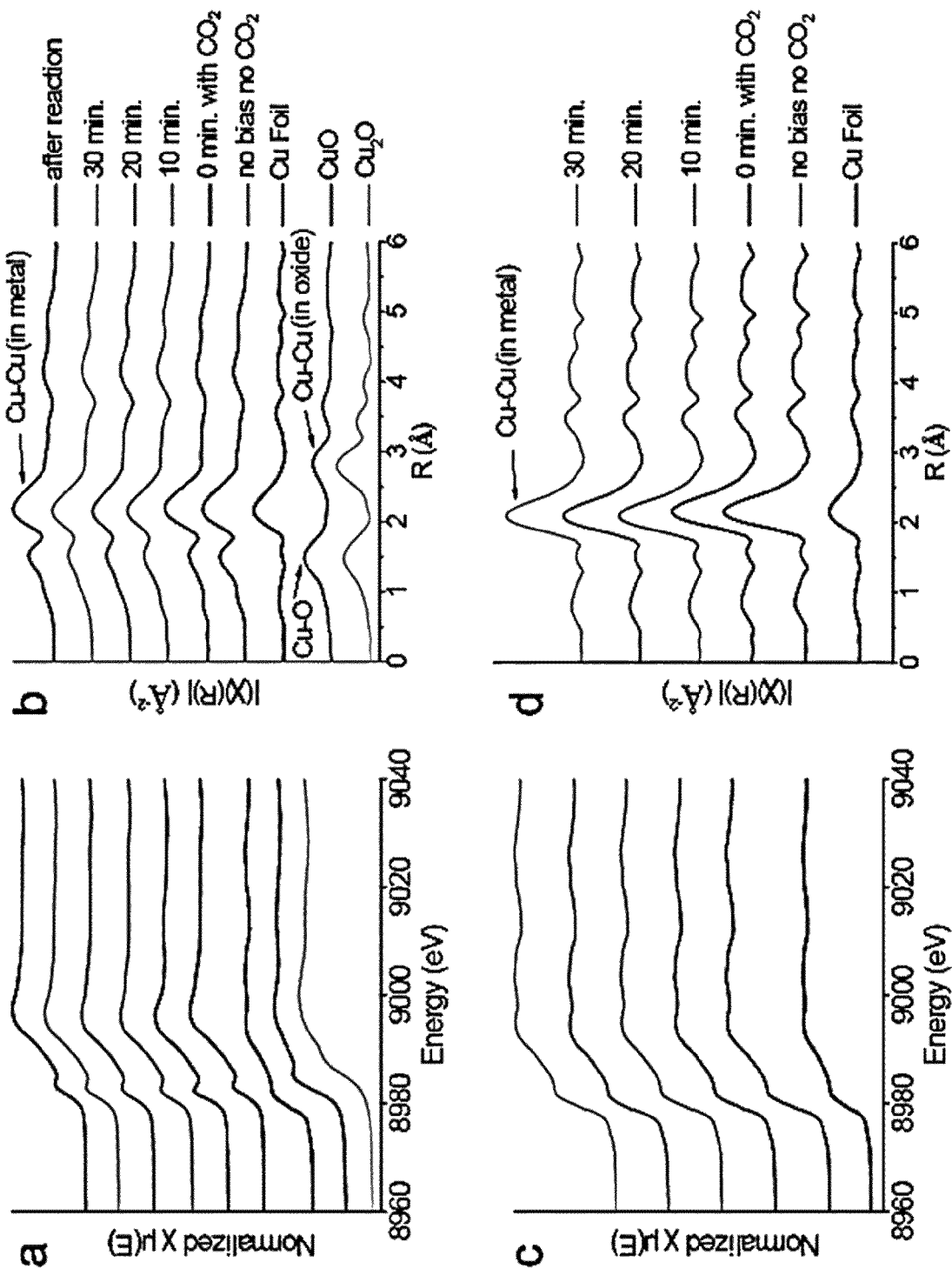
FIG. 7: a-b, In situ X-ray absorption near-edge structure (XANES) spectra of de-alloyed Cu—Al catalyst before, during and after $CO_2$ electroreduction tests and ex-situ XANES spectra of Cu foil, $Cu_2O$, CuO. c-d, In situ X-ray absorption near-edge structure (XANES) spectra of pure Cu catalyst before and during $CO_2$ electroreduction tests and ex-situ XANES spectra of Cu foil.

A large amount of Cu—O bonding was visible continuously in the ex situ and in situ XANES analyses with the de-alloyed Cu—Al catalyst before, during and after the reaction (FIG. 7). In situ Fourier transform extended X-ray absorption fine structure (FT EXAFS) spectra of the de-alloyed Cu—Al catalysts, together with ex-situ reference spectra of Cu foil, $Cu_2O$ and CuO, gave precise coordination information. The invention observed a prominent peak at ~2.2 Å from Cu—Cu contribution, which agrees with the prominent peak of Cu—Cu in Cu foils, and a weak peak at ~1.5 Å, which agrees with the prominent peak of Cu—O in $Cu_2O$ and CuO. Moreover, the Cu—O peak intensity remained almost the same during in situ synchrotron measurement. It is smaller than that obtained with the same sample without $CO_2$ electroreduction (FIG. 7), indicating Cu—O in de-alloyed Cu—Al catalysts was partially reduced to Cu. A stable balance of Cu—Cu and Cu—O in the de-alloyed catalyst was established within a short time right after starting $CO_2$ electroreduction. As a control, the invention measured in situ XANES with a pure Cu on GDL under the same condition. No obvious oxidation state of Cu was observed (FIG. 7).

Data, findings and information from the present invention are also presented in the Figures and in the following tables:

TABLE 1

Zero-point energy and specific heat of different reactants, intermediates and products on the Al incorporated Cu (111) surface.

| Structure | E_ZPE (eV) | Cv_trans (0->T) (eV) | Cv_rot (0->T) (eV) | Cv_vib (0->T) (eV) | H (eV) |
|---|---|---|---|---|---|
| Intial | 2.17E+00 | 3.90E-02 | 3.90E-02 | 3.30E-01 | 2.61E+00 |
| Final$_a$ | 2.62E+00 | 3.90E-02 | 3.90E-02 | 4.30E-01 | 3.16E+00 |
| Final$_b$ | 2.15E+00 | 3.90E-02 | 3.90E-02 | 3.77E-01 | 2.63E+00 |

TABLE 2

Entropy and Gibbs free energy of different reactants, intermediates and products on the Al incorporated Cu (111) surface.

| Structure | S_trans (eV/K) | S_rot (eV/K) | S_vib (eV/K) | S (eV/K) | TS (eV) |
|---|---|---|---|---|---|
| Intial | 2.19E−03 | 2.04E−03 | 2.08E−03 | 6.32E−03 | 1.88E+00 |
| Final$_a$ | 2.19E−03 | 2.00E−03 | 2.78E−03 | 6.97E−03 | 2.08E+00 |
| Final$_b$ | 2.19E−03 | 2.03E−03 | 6.68E−03 | 6.68E−03 | 1.99E+00 |

TABLE 3

Zero-point energy and specific heat of different reactants, intermediates and products on the Al incorporated Cu (100) surface.

| Structure | E_ZPE (eV) | Cv_trans (0−>T) (eV) | Cv_rot (0−>T) (eV) | Cv_vib (0−>T) (eV) | H (eV) |
|---|---|---|---|---|---|
| Intial | 2.15E+00 | 3.90E−02 | 3.90E−02 | 1.88E−01 | 2.44E+00 |
| Final$_a$ | 2.43E+00 | 3.90E−02 | 3.90E−02 | 1.82E−01 | 2.71E+00 |
| Final$_b$ | 1.97E+00 | 3.90E−02 | 3.90E−02 | 1.76E−01 | 2.25E+00 |

TABLE 4

Entropy and Gibbs free energy of different reactants, intermediates and products on the Al incorporated Cu (100) surface.

| Structure | S_trans (eV/K) | S_rot (eV/K) | S_vib (eV/K) | S (eV/K) | TS (eV) |
|---|---|---|---|---|---|
| Intial | 2.17E−03 | 1.87E−03 | 1.17E−03 | 5.21E−03 | 1.55E+00 |
| Final$_a$ | 2.17E−03 | 1.87E−03 | 1.11E−03 | 5.14E−03 | 1.53E+00 |
| Final$_b$ | 2.17E−03 | 1.87E−03 | 1.08E−03 | 5.12E−03 | 1.53E+00 |

The following is a list of references the entire contents of which are hereby incorporated herein by reference. It is also noted that the entire contents of all documents mentioned herein are incorporated herein by reference.

Jain, A. et al. APL *Materials* 1, 1-11 (2013).
Hjorth Larsen, A. et al. *J. Phys. Condens. Matter* 29, 273002 (2017).
Ong, S. P. et al. *Comp. Mater. Sci.* 68, 314-319 (2013).
Kresse, G. & Hafner, J. *Phys. Rev. B* 47, 558-561 (1993).
Kresse, G. & Hafner, J. *Phys. Rev. B* 49, 14251-14269 (1994).
Kresse, G. & Furthmüller, J. *Comp. Mater. Sci.* 6, 15-50 (1996).
Kresse, G. & Furthmüller, J. *Phys. Rev. B* 54, 11169-11186 (1996).
Bernhardsson, E. & Freider, E. *Luigi, a Python package that builds complex pipelines of batch jobs* (2012).
Jain, A. et al. *Concurr Comp-Pract E* 22, 685-701 (2010).
Olson, R. S. et al. In *Proc. of the European Conference on the Applications of Evolutionary Computation. Springer International Publishing* 123-137 (2016).
Hammer, B., Hansen, L. B. & Nørskov, J. *Phys. Rev. B* 59, 7413-7421 (1999).
Nørskov, J. K., Studt, F., Abild-Pedersen, F. & Bligaard, T. *Angew. Chem. In. Ed.* 54, 10404-10405 (2015).
Liu, X. et al. *Nat. Commun.* 8, 15438 (2017).
Studt, F. et al. *Catal. Lett.* 143, 71-73 (2013).
Abild-Pedersen, F. & Andersson, M. P. *Surf. Sci.* 601, 1747-1753 (2007).
Wellendorff, J. et al. *Phys. Rev. B* 85, 32-34 (2012).
Tran, K. & Ulissi, Z. Active learning across intermetallics to guide discovery of electrocatalysts for $CO_2$ reduction and H2 evolution. *Submitted* (2018).
Pedregosa, F. et al. *J. Mach. Learn. Res.* 12, 2825-2830 (2012).
van der Maaten, L. 15, 3221-3245 (2014).
Blöchl, P. E. Projector augmented-wave method. *Phys. Rev. B* 50, 17953 (1994).
Kresse, G. & Joubert, D. From ultrasoft pseudopotentials to the projector augmented-wave method. *Phys. Rev. B* 59, 1758 (1999).
Kresse, G. & Furthmüller, J. Efficient iterative schemes for ab initio total-energy calculations using a plane-wave basis set. *Phy. Rev. B* 54, 11169 (1996).
Perdew, J. P., Burke, K. & Ernzerhof, M. Generalized gradient approximation made simple. *Phys. Rev. Lett.* 77, 3865 (1996).
Larsen, A. H. et al. The atomic simulation environment—a Python library for working with atoms. *J. Phys. Condens. Matter* 29, 273002 (2017).
Monkhorst, H. J. & Pack, J. D. Special points for Brillouin-zone integrations. *Phys. Rev. B* 13, 5188 (1976).
Xiao, H. et al. Atomistic mechanisms underlying selectivities in $C_1$ and $C_2$ products from electrochemical reduction of CO on Cu(111). *J. Am. Chem. Soc.* 139, 130-136 (2017).
Lin, S. et al. Covalent organic frameworks comprising cobalt porphyrins for catalytic $CO_2$ reduction in water. *Science* 349, 1208-1213 (2015).
Schreier, M. et al. Solar conversion of $CO_2$ to CO using Earth-abundant electrocatalysts prepared by atomic layer modification of CuO. *Nat. Energy* 2, 17087 (2017).
Dinh, C. et al. Sustained high-selectivity $CO_2$ electroreduction to ethylene via hydroxide-mediated catalysis at an abrupt reaction interface. *submitted* (2018).
Li, C. et al. Electroreduction of carbon monoxide to liquid fuel on oxide-derived nanocrystalline copper. *Nature* 508, 504-507 (2014).
Qi, L. et al. A selective and efficient electrocatalyst for carbon dioxide reduction. *Nat. Commun.* 5, 3242 (2014).
Gao, S. et al. Partially oxidized atomic cobalt layers for carbon dioxide electroreduction to liquid fuel. *Nature* 529, 68-71 (2016).
Li, Y. C. et al. Electrolysis of $CO_2$ to syngas in bipolar membrane-based electrochemical cells. *ACS Energy Lett.* 1, 1149-1153 (2016).
Jeanty, P. et al. Upscaling and continuous operation of electrochemical $CO_2$ to CO conversion in aqueous solutions on silver gas diffusion electrodes. *J. $CO_2$ Util.* 24, 454-462 (2018).
Hori, Y. et al. Selective formation of C2 compounds from electrochemical reduction of $CO_2$ at a series of copper single crystal electrodes. *J. Phys. Chem. B* 106, 15-17 (2002).
Yano, H. et al. Selective electrochemical reduction of $CO_2$ to ethylene at a three-phase interface on copper(I) halide-confined Cu-mesh electrodes in acidic solutions of potassium halides. *J. Electroanal. Chem.* 565, 287-293 (2004).
Peterson, A. A. et al. How copper catalyzes the electroreduction of carbon dioxide into hydrocarbon fuels. *Energy Environ. Sci.* 3, 1311-1315 (2010).
Kortlever, R. et al. Catalysts and reaction pathways for the electrochemical reduction of carbon dioxide. *J. Phys. Chem. Lett.* 6, 4073-4082 (2015).
Mistry, H. et al. Highly selective plasma-activated copper catalysts for carbon dioxide reduction to ethylene. *Nat. Commun.* 7, 12123 (2016).
Li, Y. et al. Structure-sensitive $CO_2$ electroreduction to hydrocarbons on ultrathin 5-fold twinned copper nanowires. *Nano Lett.* 17, 1312-1317 (2017).

Lum, Y. et al. Optimizing C—C coupling on oxide-derived copper catalysts for electrochemical $CO_2$ reduction. *J. Phys. Chem. C* 121, 14191-14203 (2017).

De Luna, P. et al. Catalyst electro-redeposition controls morphology and oxidation state for selective carbon dioxide reduction. *Nat. Catalysis* 1, 103-110 (2018).

Liu, X. et al. Understanding trends in electrochemical carbon dioxide reduction rates. *Nat. Commun.* 8, 15438 (2017).

Tran, K. et al. Active learning across intermetallics to guide discovery of electrocatalysts for $CO_2$ reduction and $H_2$ evolution. *Submitted* (2018)

van der Maaten, L. Accelerating t-SNE using tree-based algorithms. *J. Mach. Learn. Res.* 15, 3221-3245 (2014).

Davis, L. E. et al. Handbook of Auger electron spectroscopy. *Physical Electronics Industries; 2nd edition* (1976).

Persson, K. A. et al. Prediction of solid-aqueous equilibria: Scheme to combine first-principles calculations of solids with experimental aqueous states. *Phys. Rev. B* 85, 235438 (2012).

Montoya, J. H. et al. A high-throughput framework for determining adsorption energies on solid surfaces. *npj Computational Materials* 3, 14 (2017).

Xiao, H. et al. Atomistic mechanisms underlying selectivities in C1 and C2 products from electrochemical reduction of CO on Cu (111). *J. Am. Chem. Soc.* 139, 130-136 (2016).

Xiao, H. et al. Cu metal embedded in oxidized matrix catalyst to promote $CO_2$ activation and CO dimerization for electrochemical reduction of $CO_2$. *Proc. Natl. Acad. Sci.* 114, 6685-6688 (2017).

The invention claimed is:

1. An electrocatalyst for reduction of $CO_2$ to produce multi-carbon compounds, wherein the electrocatalyst comprises a multi-metal material comprising a primary metal being copper and at least one enhancer metal being aluminum, so the electrocatalyst comprises a multi-metal Cu—Al material being formed, as a catalytic layer and comprises a surface region having a thickness between 1 nm and 3 nm as determined by Auger electron spectroscopy, and in that at least the surface region is nanoporous and comprises an Al content of 3 wt % to 30 wt % and a Cu content of 70 wt % to 97 wt %.

2. The electrocatalyst according to claim 1, wherein the multi-metal Cu—Al material is a de-alloyed material.

3. The electrocatalyst according to claim 1, wherein the multi-metal Cu—Al material:
   comprises from 1 wt % to 50 wt % of Al based on the total weight of the multi-metal Cu—Al material, preferably from 3 wt % to 30 wt %; and/or
   comprises from 50 wt % to 99 wt % Cu based on the total weight of the multi-metal Cu—Al material, preferably from 70 wt % to 97 wt % Cu.

4. The electrocatalyst according to claim 1, wherein the electrocatalyst comprises a gas diffusion membrane.

5. The electrocatalyst according claim 1, wherein the catalytic layer has a thickness between 10 nm and 5000 nm, as determined by cross-sectional scanning electron microscopy.

6. The electrocatalyst according to claim 1, wherein:
   the multi-metal Cu—Al material comprises Al-terminated pores; or
   the Al is ion-implanted into the Cu.

7. The electrocatalyst of claim 1, wherein at least the surface region has pores that have pore diameters ranging from 1 nm to 100 nm, as determined by HRTEM and HAADF analysis, or from 5 nm to 20 nm.

8. The electrocatalyst of claim 1, wherein at least the surface region has a homogeneous distribution of Al and Cu; and/or at least the surface region consists of Cu and Al.

9. The electrocatalyst of claim 1, wherein the Cu in at least the surface region is Cu (111).

10. The electrocatalyst of claim 1, wherein the Cu in at least the surface region is Cu (100).

11. A process for electrochemical production of a multi-carbon compound from $CO_2$, comprising:
    contacting $CO_2$ gas and an electrolyte with an electrode comprising the electrocatalyst according to claim 1, such that the $CO_2$ contacts the electrocatalyst;
    applying a voltage to provide a current density to cause the $CO_2$ gas contacting the electrocatalyst to be electrochemically converted into the multi-carbon compound; and
    recovering the multi-carbon compound.

12. The process of claim 11, wherein the current density provided in the current collection structure is predetermined for selective electrochemical conversion of the $CO_2$ into a target multi-carbon compound.

13. The process of claim 11, wherein the target multi-carbon compound is ethylene or an alcohol; and/or in that the electrolyte comprises an alkaline compound.

14. The process of claim 11, wherein the electrolyte comprises an alkaline solutions.

15. The process of claim 11, conducted in a three-electrode flow-cell.

16. A system for $CO_2$ electro reduction to produce multi-carbon hydrocarbons, comprising:
    an electrolytic cell configured to receive a liquid electrolyte and $CO_2$ gas;
    an anode;
    a cathode comprising an electrocatalyst as defined in claim 1; and
    a voltage source to provide a current density to cause the $CO_2$ gas contacting the electrocatalyst to be electrochemically converted into the multi-carbon hydrocarbon.

17. A method of manufacturing an electrocatalyst for reduction of $CO_2$ to produce multi-carbon compounds, the method comprising:
    a multi-metal material comprising Cu and Al; and
    subjecting the multi-metal material to chemical etching to remove a portion of the Al from a surface region of the multi-metal material to produce a de-alloyed Cu—Al material.

18. The method of claim 17, wherein the chemical etching comprises immersing the multi-metal material comprising Cu and Al into an acidic solution to remove Al.

19. The method of claim 17, wherein the step of producing a multi-metal material comprising Cu and Al comprises co-evaporation of Al and Cu to form a Cu—Al alloy; with preference the multi-metal material comprising Cu and Al form a layer having a thickness ranging from 200 to 1000 nm, as determined by cross-sectional scanning electron microscopy.

20. A method of manufacturing an electrocatalyst for reduction of $CO_2$ to produce multi-carbon compounds, the method comprising ion-implanting Al into Cu, wherein the electrocatalyst comprises a multi-metal material comprising a primary metal being copper and at least one enhancer metal being aluminum, so the electrocatalyst comprises a multi-metal Cu—Al material being formed as a catalytic layer and comprises a surface region having a thickness between 1 nm and 3 nm, as determined by Auger electron spectroscopy, and in that at least the surface region is nanoporous and comprises an Al content of 3 wt % to 30 wt % and a Cu content of 70 wt % to 97 wt %.

* * * * *